(12) United States Patent
Cornuejols et al.

(10) Patent No.: US 7,020,774 B1
(45) Date of Patent: Mar. 28, 2006

(54) COMMUNICATIONS METHOD AND DEVICE

(76) Inventors: Georges Marc Cornuejols, 1148 Westmoreland Rd., Alexandria, VA (US) 22308; Emmanuelle Maurecette Cornuéjols, 1148 Westmoreland Rd., Alexandria, VA (US) 22308

( * ) Notice: Subject to any disclaimer, the term of this patent is extended or adjusted under 35 U.S.C. 154(b) by 860 days.

(21) Appl. No.: 09/719,567

(22) PCT Filed: Aug. 30, 2000

(86) PCT No.: PCT/IB00/01312

§ 371 (c)(1),
(2), (4) Date: Dec. 29, 2000

(87) PCT Pub. No.: WO01/16784

PCT Pub. Date: Mar. 8, 2001

(30) Foreign Application Priority Data

| Aug. 30, 1999 | (FR) | 99 11250 |
| Sep. 6, 1999 | (FR) | 99 12108 |
| Oct. 5, 1999 | (FR) | 99 13401 |

(51) Int. Cl.
*H04L 9/00* (2006.01)

(52) U.S. Cl. ............... 713/176; 713/175; 713/200; 713/201; 713/156; 713/168; 713/178; 705/67; 705/75; 705/76

(58) Field of Classification Search ........ 713/175–176, 713/200–201, 50, 156, 168, 178, 150, 180, 713/187; 705/67, 75, 76, 78, 79, 53, 51, 705/26, 44, 404–405
See application file for complete search history.

(56) References Cited

U.S. PATENT DOCUMENTS

| 5,592,375 A | 1/1997 | Salmon et al. .............. 705/7 |
| 5,715,314 A | 2/1998 | Payne et al. .............. 705/78 |
| 5,825,881 A | 10/1998 | Colvin, Sr. .............. 705/78 |
| 5,826,241 A | 10/1998 | Stein et al. .............. 705/76 |
| 5,883,810 A | 3/1999 | Franklin et al. .......... 700/232 |
| 5,909,023 A | 6/1999 | Ono et al. .............. 235/380 |
| 5,960,411 A | 9/1999 | Hartman et al. .......... 705/26 |
| 6,061,792 A * | 5/2000 | Simon .................. 713/176 |

(Continued)

FOREIGN PATENT DOCUMENTS

EP 0 845 733 A2 6/1998

(Continued)

OTHER PUBLICATIONS

Hayashi et al.; "Temporally-Threaded Workspace: A Model for Providing Activity-Based Perspectives on Document Spaces"; ACM Conference on Hypertext and Hypermedia; New York, NY; ACM, Jun. 20, 1998; pp. 87-96; XP000868462.

(Continued)

*Primary Examiner*—Gregory Morse
*Assistant Examiner*—Tongoc Tran
(74) *Attorney, Agent, or Firm*—Young & Thompson

(57) ABSTRACT

The present invention relates to a communication method that includes an operation of receiving a succession of pages originating from a first site of a computer network. That method further includes an operation of memory storage of information representative of the succession of pages, outside the first site and an operation of associating a certificate of integrity with the memory-stored information representative of the succession of pages. The certificate of integrity is stored in memory in association with the information representative of the succession of pages. The certificate of integrity makes it possible to detect any alteration to the memory-stored information representative of the succession of pages, subsequent to its being stored in memory.

25 Claims, 20 Drawing Sheets

U.S. PATENT DOCUMENTS

| | | | |
|---|---|---|---|
| 6,105,012 A * | 8/2000 | Chang et al. | 705/64 |
| 6,167,378 A * | 12/2000 | Webber, Jr. | 705/8 |
| 6,185,683 B1 * | 2/2001 | Ginter et al. | 713/176 |
| 6,282,658 B1 * | 8/2001 | French et al. | 713/201 |
| 2001/0011350 A1 * | 8/2001 | Zabetian | 713/176 |
| 2002/0162006 A1 * | 10/2002 | Takahashi et al. | 713/182 |

FOREIGN PATENT DOCUMENTS

| | | |
|---|---|---|
| EP | 0 927 945 A2 | 7/1999 |
| EP | 0 969 430 A1 | 5/2000 |
| WO | WO 95/16971 | 6/1995 |
| WO | WO 96/27155 | 9/1996 |
| WO | WO 98/21679 | 5/1998 |

OTHER PUBLICATIONS

Herda; "Non-repudiation: Constituting evidence and proof in digital cooperation"; Computer Standards and Interfaces; Elsevier Sequoia, Lausanne; CH; vol. 17, No. 1, 1995; pp. 69-79; XP004046750.

Sung-Woo Tak et al. "Modeling and Design of Notarial system supporting Secure Transactions in Electronic Commerce based on the Internet", Proceedings; International Conference on Information Networking; Jan. 21, 1998; pp. 257-260; XP002118185.

* cited by examiner

| Merchant site | User | Protection site | Third-party merchant | Third-party financial | Third-party confidence |
|---|---|---|---|---|---|
| 702 | 704 | | | | |
| 706 | 708 | | | | |
| | 710 | 712 | | | |
| | 714 | 716 | | | |
| | 720 | 718 | | | |
| | 722 | | 724 | | |
| | 726 | | 728 | | |
| | 730 | 732 | | | |
| | 734 | 736 | | | |
| | 740 | 738 | | | |
| | 742 | 744 | | | |
| | 748 | 746 | | | |
| | 750 | 752 | | | |
| | 756 | 754 | | | |
| | 758 | 760 | | | |
| | 764 | 762 | | | |
| | 766 | | | 768 | |
| | 772 | | | 770 | |
| | 774 | | | | |
| | 776 | | | | 778 |
| | 780 | | | | 782 |
| | | 784 | | | |

Fig. 7

COMMUNICATIONS METHOD AND DEVICE

BACKGROUND OF THE INVENTION

The present invention relates to a communications method and a communications device. The present invention applies, in particular, to communications via a data-communications network, for example the Internet.

The present invention relates to a communications method and a communications device. More particularly, the present invention applies to protecting the security of data, on-line transactions or communications. Even more particularly, the present invention applies to protecting the security of transmissions of confidential information and purchases made via a communications network, for example the Internet.

The user of such a communications network, for example the Internet, feels a certain amount of disquiet when he ventures onto this network. He cannot keep organized track of the data pages which he receives, he cannot easily identify the bodies, physical or legal, with whom he has to deal, and he feels unsafe in the course of his on-line purchasing.

The users of such a network are poorly protected against abuses on the part of third parties, for example by other users of the network or data sites which deliver content on the network.

The present invention intends to remedy these drawbacks.

SUMMARY OF THE INVENTION

According to a first aspect, the present invention envisages a security-protection method characterized in that it includes:

an operation of memory storage of characteristics of data known as "confidential", an operation of opening a communication on a communications network, an operation of comparing characteristics of data to be transmitted on the said network with the said characteristics stored in memory and when a characteristic of data to be transmitted corresponds to a characteristic of confidential data, an operation of delaying the transmission of the said data to be transmitted.

According to particular features of the method according to the first aspect of the present invention, the said comparison operation is carried out as a background task with respect to the communications operation.

According to particular features of the method according to the first aspect of the present invention the characteristics of the confidential data are insufficient to determine the confidential data protected.

According to a second aspect, the present invention envisages a memory-management method, characterized in that it includes:

at least one operation of communication via a communications network, at least one operation of memory storage of various types of data originating from the said network in the course of the said communications operation, an operation of determining the necessity of deleting certain memory-stored data, and when it is necessary to delete memory-stored data, a delete operation in the course of which the memory-stored data is deleted as a function of its memory-storage date and of its type, the data of at least one predetermined type being kept for a longer time than the data of at least one other type.

According to particular features of the method according to the second aspect of the present invention, the necessity-determining operation includes an operation of comparison of a memory space with a predetermined memory space value.

According to particular features of the method according to the second aspect of the present invention, the method includes a comparison of a page already stored in memory and of a page visited in the course of the operation of communicating on a communications network and, in the course of the memory-storage operation, only the pages not yet stored in memory are stored in memory.

According to a third aspect, the present invention envisages a communications method characterized in that it includes:

an operation of opening a first communications session with a first site of a communications network, an operation of opening a second communications session with a second site of the said communications network, an operation of transmitting, to the said second site, information relating to the first session, and an operation of receiving information, relating to the first session, originating from the said second site.

According to particular features of the method according to the third aspect of the present invention, the said operation of transmitting to the said second site includes an operation of automatically transmitting an identifier of the said first site.

According to other particular features of the method according to the third aspect of the present invention, the communications method includes an operation of memory storage of at least one characteristic of an item of confidential information, and the said operation of opening a second communications session includes an operation of detecting a characteristic of an item of confidential information in data to be transmitted to the said first site.

According to other particular features of the method according to the third aspect of the present invention, the communications method includes an operation of transmitting, to the said first site, information based on received information originating from the said second site.

According to other particular features of the method according to the third aspect of the present invention, the received information originating from the second site includes a root or code generating a means-of-payment identifier.

According to other particular features of the method according to the third aspect of the present invention, the communications method includes an operation of transmitting the said means-of-payment identifier to the said first site.

According to other particular features of the method according to the third aspect of the present invention, the operation of transmitting to the said second site information relating to the first session includes an operation of transmitting an identifier of a product or service capable of being supplied via the said first site.

According to other particular features of the method according to the third aspect of the present invention, the communications method includes an operation of automatic memory storage of data received from the first site in the course of the said first session.

According to other particular features of the method according to the third aspect of the present invention, the communications method includes an operation of requesting information making it possible to determine a single-use means-of-payment identifier.

The third aspect of the present invention also envisages a communications method characterized in that it includes:

an operation of opening a communications session called "second" session with a terminal, an operation of receiving information, originating from the said terminal, relating to a communications session known as "first" communication session in which the said terminal participates and an operation of supplying, to the said terminal, information relating to the first session.

According to particular features of the method according to the third aspect of the present invention, the information relating to the first session includes a generator code or root making it possible to define a single-use means-of-payment identifier.

According to other particular features of the method according to the third aspect of the present invention, the communications method includes an operation of receiving the said identifier, an operation of verifying the validity of the said identifier, an operation of triggering payment and an operation of invalidating the said identifier.

According to a fourth aspect, the present invention envisages an on-line payment method characterized in that it includes:

an operation of opening a first communications session with a first site, via a communications network, an operation of receiving a root of a single-use means-of-payment identifier, from the said first site, an operation of determining a single-use means-of-payment identifier, an operation of supplying the said identifier to a second site via the said communications network, in the course of a second communications session, and a payment operation using the said single-use means of payment.

In relation to the fourth aspect, the present invention envisages a payment method characterized in that it includes:

an operation of generating a root of a single-use means-of-payment identifier, an operation of transmitting the said root to a user, via a communications network, an operation of receiving a single-use means-of-payment identifier from a third party, an operation of verifying correspondence between the said identifier and the said root, and, when there is correspondence:

an operation of paying the said third party, debiting the said user, and an operation of invalidating the said single-use means of payment following the first payment operation using the said means of payment.

According to particular features of the method according to the fourth aspect of the present invention, this method includes an operation of authenticating the user.

According to particular features of the method according to the fourth aspect of the present invention, this authentication operation includes an operation of recognizing an identifier of a permanent-use means of payment.

According to particular features of the method according to the fourth aspect of the present invention, the single-use means-of-payment identifier is a payment-card identifier, for example with 20 figures lying between 0 and 9.

According to particular features of the method according to the fourth aspect of the present invention, the operation of opening the second session precedes the operation of opening the first session.

According to particular features of the method according to the fourth aspect of the present invention, the payment operation includes an operation of verifying an identifier of the second site.

According to a fifth aspect, the present invention envisages a communications method characterized in that it includes:

an operation of opening a first communications session between a terminal and a site of a communications network, an operation of selecting a date, an operation of storing the said date in memory and, at the said date, an operation of automatic opening of a second communications session between the said terminal and the said site.

According to particular features of the method according to the fifth aspect of the present invention, this method includes an operation of interrogating a user of the said terminal and the said second session depends on at least one response given by the said user.

According to a sixth aspect, the present invention envisages a method of storing communications in memory characterized in that it includes an operation of memory storage of contents of pages accessible via a communications network and an operation of re-reading the memory-stored contents including an operation of selecting re-read speed and, when a slow re-read speed is selected, a first operation of displaying memory-stored content for a first duration and, when a high re-read speed is selected, a second operation of displaying memory-stored content for a second duration less than the first duration.

According to particular features of the method according to the sixth aspect of the present invention, when a slow re-read function is selected, in the course of the first display operation, a first portion of memory-stored content is displayed and, in the course of the second display operation, a second portion of memory-stored content is displayed, the second portion being different from the first portion.

According to particular features of the method according to the sixth aspect of the present invention, the second portion includes at least one page address accessible on the communications network.

According to particular features of the method according to the sixth aspect of the present invention, the second portion includes at least one memory-storage date.

According to particular features of the method according to the sixth aspect of the present invention, the second portion includes a page header content accessible on the communications network.

According to particular features of the method according to the sixth aspect of the present invention, the method includes an operation of displaying parts of accessible pages and the first portion includes an operation of re-displaying parts of pages already displayed, in the order of their first display in the course of the display operation.

According to particular features of the method according to the sixth aspect of the present invention, in the course of the memory-storage operation, the user selects the pages to be stored in memory.

According to particular features of the method according to the sixth aspect of the present invention, the method includes an operation of authenticating the user, before the re-reading operation.

According to particular features of the method according to the sixth aspect of the present invention, the first portion includes the second portion.

According to particular features of the method according to the sixth aspect of the present invention, the first re-read operation is automatic, each element of the information stored in memory and displayed not remaining displayed for more than a predetermined duration.

According to particular features of the method according to the sixth aspect of the present invention, the method includes an operation of selecting keys displayed in a tool bar on the visual-display screen where the content portions are displayed.

According to particular features of the method according to the sixth aspect of the present invention, the method includes an operation of stopping re-reading and, following the operation of stopping re-reading, an operation of displaying the whole of the content stored in memory relating to the page being displayed at the moment when stopping re-reading was selected.

According to particular features of the method according to the sixth aspect of the present invention, the method includes an operation of selecting re-read order, in the course of which the user selects a page-scrolling order identical to the memory-storage order or a page-scrolling order which is the reverse of the memory-storage order.

According to a seventh aspect, the present invention envisages a communications memory-storage method characterized in that it includes an operation of receiving pages originating from a communications network, an operation of displaying received pages, an operation of selecting a group of pages, an operation of storing in memory the content of the said pages relating to the group selected, an operation of selecting a group of pages and an operation of re-displaying memory-stored pages relating to the selected group.

According to an eighth aspect, the present invention envisages a method of transmitting a page on a communications network characterized in that it includes:

a first operation of requesting transmission of a first content of the said page corresponding to a first quantity of information to be transmitted and, in the event of failure of the transmission due to a predetermined transmission duration being exceeded, an operation of automatically determining a second content of the said page, the second content corresponding to a quantity of information to be transmitted less than the first quantity and an operation of requesting transmission of the said second content of the said page.

According to particular features of the method according to the eighth aspect of the present invention, the second content is a part of the first content.

According to particular features of the method according to the eighth aspect of the present invention, the second content corresponds to text files.

According to particular features of the method according to the eighth aspect of the present invention, the first content corresponds to files representing images and/or sounds.

It will be observed that the method can be implemented at any point of the communications network, and, in particular, in the computer terminal or in a computer system of a provider of access to the said network. It will be observed that the security-protection means may also be located on the communications network, at any point and, in particular, in the computer terminal or in a computer system of a provider of access to the said network.

The present invention also envisages a data site, a server, a computer, characterized in that they implement the method briefly set out above. The present invention also envisages an information medium, such as a diskette, a hard disk, a compact disc or a computer memory, which holds program instructions for:

opening a communications session between a computer terminal and a data site, via a communications network, automatically detecting a preparation for payment by transmission, in the course of the said session, via the said terminal, of a means-of-payment identifier, and when payment preparation is detected, automatically security-protecting the said payment outside the said data site, at least by backing up the amount of the payment outside the said data site.

The present invention envisages, according to a ninth aspect, a communications method characterized in that it includes:

an operation of receiving a succession of pages originating from a first site of a computer network, an operation of memory storage of information representative of the said succession of pages, outside the said first site, and an operation of associating a certificate of integrity with the memory-stored information representative of the said succession of pages, the said certificate of integrity being stored in memory in association with the information representative of the said succession of pages, the said certificate of integrity making it possible to detect any alteration to the memory-stored information representative of the said succession of pages, subsequent to its being stored in memory.

According to particular features, the method according to the ninth aspect of the present invention includes a time-stamping operation attributing a date to at least one of the reception and memory-storage operations; the said date is stored in memory in association with the information representative of the said succession of pages and the certificate of integrity makes it possible to detect an alteration to the said date subsequent to its being stored in memory.

According to particular features, the method according to the ninth aspect of the present invention includes an operation of determining an address of the said first site on the said network, the said address being stored in memory in association with the information representative of the said succession of pages, and the certificate of integrity makes it possible to detect an alteration to the said address subsequent to its being stored in memory.

According to particular features, the method according to the ninth aspect of the present invention includes an operation of determining a display duration for each page of the said succession, the said duration being stored in memory in association with the information representative of the said succession of pages, and the certificate of integrity makes it possible to detect an alteration to the said duration subsequent to its being stored in memory.

According to particular features of the method according to the ninth aspect of the present invention, for each site of a plurality of sites of the said network, the method includes an operation of determining addresses of pages of the said site, the said memory-storage operation including memory storage of the said pages, the said pages being stored in memory in association with the information representative of the said succession of pages, and the certificate of integrity makes it possible to detect an alteration to the said pages subsequent to their being stored in memory.

According to particular features, the method according to the ninth aspect of the present invention includes an operation of displaying the pages received in the course of the receiving operation, and in the course of the memory-storage operation the parts of the pages received which are displayed in the course of the display operation are stored in memory.

According to particular features, the method according to the ninth aspect of the present invention includes an operation of displaying the pages received in the course of the receiving operation, and, in the course of the memory-storage operation, indicators of the parts of the received pages which are displayed in the course of the display operation are stored in memory.

According to particular features, the method according to the ninth aspect of the present invention includes an operation of displaying pages received in the course of the receiving operation, and, in the course of the memory-storage operation, the parts of the received pages which are not displayed in the course of the display operation are not stored in memory.

According to particular features, in the method according to the ninth aspect of the present invention, the information stored in memory in the course of the memory-storage operation includes the information, in text format, of the said succession of pages.

According to particular features, the method according to the ninth aspect of the present invention includes an operation of communicating with a second site of the said network and of transmitting, to the said second site, information dependent on the first site.

According to particular features, the method according to the ninth aspect of the present invention includes an operation of communicating with a second site of the said network and of receiving information originating from the said second site, the information stored in memory being representative of the said information originating from the second site.

According to particular features, the method according to the ninth aspect of the present invention includes an operation of communicating with a second site of the said network and of transmitting to the said second site information representative of the said pages, the memory-storage operation being carried out by the said second site.

According to particular features, the method according to the ninth aspect of the present invention includes an operation of communicating with a second site of the said network, the receiving operation being carried out via the said second site.

According to particular features, the method according to the ninth aspect of the present invention includes an operation of detecting information characteristic of a transaction with the said first site, and an operation of deleting the memory-stored information representative of the said succession of pages of the said first site, the said delete operation depending on the said detection.

According to particular features, the method according to the ninth aspect of the present invention includes an operation of detecting information characteristic of a transaction with the said first site, the said memory-storage operation depending on the said detection.

According to particular features, the method according to the ninth aspect of the present invention includes an operation of detecting information characteristic of a transaction with the said first site, by determining a preparation for communication to the first site of information corresponding to information known as "information to be protected" kept in a memory.

The present invention envisages, according to a tenth aspect, a communications method characterized in that it includes:

an operation of receiving a succession of pages originating from a first site of a computer network, an operation of displaying parts of pages of the said succession of pages, an operation of memory storage of information representative of the said parts of displayed pages, outside the said first site, the said information being identified in memory as displayed and an operation of memory storage of information of parts of pages not displayed, originating from the said first site, outside the said first site, the said information being identified in memory as not displayed.

The tenth aspect of the invention exhibits, according to particular features, all or some of the features of the ninth aspect.

The present invention envisages, according to an eleventh aspect, a communications method characterized in that it includes:

an operation of receiving, via a computer terminal, a succession of pages originating from a first site of a computer network, an operation of displaying, by the computer terminal, parts of pages of the said succession, and an operation of memory storage, at a second data site independent of the said terminal, of information representative of the said parts of pages displayed.

The eleventh aspect of the invention exhibits, according to particular features, all or some of the features of the ninth aspect.

The present invention envisages, according to a twelfth aspect, a communications method characterized in that it includes:

an operation of receiving, by a computer terminal, a succession of pages originating from a first data site, an automatic operation of receiving, by the computer terminal, originating from a second information site, contextual information depending on an identifier of the said first site, a triggering operation, and an operation of displaying the said contextual information.

The present invention envisages, according to a thirteenth aspect, a communications method characterized in that it includes:

an operation of receiving, via a computer terminal, a succession of pages originating from a first site, an operation of detecting an electronic signature, an operation of memory storage of information representative of at least one page of the said succession of pages, outside the said first site, depending on the said detection.

According to particular features of the method according to the thirteenth aspect of the present invention, in the course of the memory-storage operation, the information stored in memory is representative of a plurality of pages of the said succession.

According to particular features of the method according to the thirteenth aspect of the present invention, in the course of the memory-storage operation, the information stored in memory is representative of at least one page at which the said electronic signature is requested.

According to particular features of the method according to the thirteenth aspect of the present invention, in the course of the memory-storage operation, information stored in memory is representative of each page of the said succession.

According to particular features, the method according to the thirteenth aspect of the present invention includes an operation of determining a start of a contractual document and an operation of determining the end of a contractual document, and, in the course of the memory-storage operation, the information stored in memory is representative of each page accessed between the start of document and the end of document.

According to particular features, the method according to the thirteenth aspect of the present invention includes an operation of associating a certificate of integrity with the memory-stored information representative of the said succession of pages, the said certificate of integrity being stored in memory in association with the information representative of at least one page of the said succession of pages, the said certificate of integrity making it possible to detect any alteration to the information stored in memory, subsequent to its being stored in memory.

According to particular features, the said signature includes a certificate of integrity stored in memory in association with the information representative of at least one page of the said succession of pages, the said certificate of integrity making it possible to detect any alteration to the information stored in memory, subsequent to its being stored in memory.

According to a fourteenth aspect, the present invention envisages a communications method characterized in that it includes:

an operation of receiving, via a computer terminal, a succession of pages originating from a first site, an operation of detecting an electronic signature, an operation of editing a plurality of pages of the said succession, the said electronic signature depending on the said plurality of pages.

According to particular features, the method according to the fourteenth aspect of the present invention includes an operation of conjoint displaying of information representative of the said plurality of pages.

According to particular features, the method according to the fourteenth aspect of the present invention includes an operation of transmitting information representative of the said memory-storage operation in association with an electronic-signature transmission operation.

According to a fifteenth aspect, the present invention envisages a memory-management method characterized in that it includes:

an operation of determining at least one item of data called "data to be protected", at least two operations of communicating via a communications network, and, for each communications operation:

an operation of determining a preparation for transmission of data to be protected in the course of the said communications operation, an operation of memory storage of data received in the course of said communications operation, and of an indicator for determination or not determination of preparation for transmission of data to be protected, an operation of determining the necessity to delete certain memory-stored data, and when it is necessary to delete memory-stored data, a delete operation in the course of which the memory-stored data is treated differently on the basis of the memory-storage date and of the value of the said indicator.

According to a sixteenth aspect, the present invention envisages a memory-management method characterized in that it includes:

an operation of determining at least two levels of protection for data called "data to be protected", at least two operations of communicating via a communications network, and, for each communications operation:

an operation of determining the preparation for transmission of data to be protected in the course of the said communications operation, an operation of memory storage of data received in the course of said communications operation, and of an indicator of a level of protection of data to be protected, preparation for transmission of which has been determined, an operation of determining the necessity to delete certain memory-stored data, and when it is necessary to delete memory-stored data, a delete operation in the course of which the memory-stored data is treated differently on the basis of the memory-storage date and of the value of the said indicator.

According to particular features of the method according to the sixteenth aspect of the present invention, the necessity-determining operation includes an operation of comparing a memory space with a predetermined memory-space value.

According to a seventeenth aspect, the present invention envisages a memory-management method characterized in that it includes:

an operation of determining at least one item of data called "data to be protected", at least two operations of communicating via a communications network, and, for each communications operation:

an operation of determining the preparation for transmission of data to be protected in the course of the said communications operation, an operation of memory storage of data received in the course of said communications operation, the said memory-storage operation depending on the said determination or non-determination of preparation for transmission of data to be protected.

According to particular features of the method according to the seventeenth aspect of the present invention, the memory-storage operation includes an operation of encrypting memory-stored data.

According to an eighteenth aspect, the present invention envisages a memory-management method characterized in that it includes:

an operation of determining at least one item of data called "data to be protected", at least two operations of communicating via a communications network, and, for each communications operation:

an operation of determining a transmission of data to be protected in the course of the said communications operation, an operation of memory storage of data representative of data received in the course of said communications operation, the said memory-storage operation depending on the said determination or non-determination of transmission of data to be protected, and an operation of transmitting, to the said network, information representative of the said memory-storage operation.

According to particular features of the method according to the eighteenth aspect of the present invention, the said operation of transmitting information representative of the said operation is carried out by electronic mail.

According to a nineteenth aspect, the present invention envisages a memory-management method characterized in that it includes:

an operation of determining at least two levels of protection of data known as "data to be protected", at least two operations of communicating, via a communications network, and, for each communications operation:

an operation of determining preparation for transmission of data to be protected in the course of the said communications operation, an operation of memory storage of data received in the course of said communications operations, the said memory storage depending on the level of protection of data to be protected which is determined in the course of the said determination operation, According to particular features of the method according to the nineteenth aspect of the present invention, the memory-storage operation employs different data formats, in connection with the result of the said determination operation.

A twentieth aspect of the present invention envisages a data-protection method characterized in that it includes:

an operation of selecting software context for protection of data called "data to be protected", in the course of which a user determines in which case, among at least two of the following cases, data to be protected have to be protected;

outside communications on an international communications network, for electronic-mail communications on an international communications network, and/or for Internet web site visits;

an operation of detection of use, by a user, of data to be protected, in one of the selected software contexts; and an operation of memory storage of information representative of the said use.

A twenty-first aspect of the present invention envisages a data-storage method characterized in that it includes:

an operation of communicating, via a communications network, in the course of which data is exchanged between a terminal and the said network, an operation of memory storage of data originating from the said communications network in the course of the said communications operation, in the course of the said memory-storage operation, an operation of determining the necessity to keep the said memory-stored data, on the basis of the data sent on the said network by the said terminal in the course of the said communications operation, and an operation of keeping the said memory-stored data depending on the result of the said operation for determining the necessity to keep the said memory-stored data.

A twenty-second aspect of the present invention envisages a method for contextual information characterized in that it includes:

a first communications operation, via a communications network, in the course of which first data is exchanged between a terminal and a first remote server, a second communications operation, via the said communications network, in the course of which second data depending on the first remote server is exchanged with a second remote server, in the course of the said communications operation, an operation of determining the necessity to display the said second data, on the basis of the first data sent by the terminal in the course of the said first communications operation, and an operation of displaying the said second data depending on the result of the said operation for determining the necessity to display the said second data.

According to particular features of the method according to the twenty-second aspect of the present invention, the said second data is representative of pages supplied by the said first remote server.

According to particular features, the method according to the twenty-second aspect of the present invention includes an operation of memory storage of all or part of the said first data and of all or part of the said second data.

A twenty-third aspect of the present invention envisages a method of keeping data remotely characterized in that it includes:

a first communications operation, via a communications network, in the course of which first data is exchanged between a terminal and a first remote server, a second communications operation, via the said communications network, in the course of which second data depending on the first data is received by a second remote server, in the course of the said first communications operation, an operation of determining the necessity to keep the said second data, on the basis of the first data sent by the terminal in the course of the said first communications operation, and an operation of keeping the said second data depending on the result of the said operation for determining the necessity to keep the said second data.

According to particular features of the method according to the twenty-third aspect of the present invention, the said second data is page addresses supplied by the said first server and, in the course of the keeping operation, at least one type of data, for example the text data, situated at the said addresses is kept.

According to particular features of the method according to the twenty-third aspect of the present invention, the said second data includes an identifier of the first remote server, of the terminal, of the date of the first communications operation.

According to particular features of the method according to the twenty-third aspect of the present invention, the said second data is representative of the first data which is displayed on the said terminal.

A twenty-fourth aspect of the present invention envisages a method of keeping data remotely characterized in that it includes:

a first communications operation, via a communications network, in the course of which first data is exchanged between a terminal and a first remote server, a second communications operation, via the said communications network, in the course of which second data depending on the first data is received by a second remote server, in the course of the said first memory-storage operation, an operation of determining the necessity to keep the said first and second data, on the basis of the first data sent by the terminal in the course of the said first communications operation, and an operation of keeping the said first data by the said terminal and the said second data by the said second server, depending on the result of the said operation for determining the necessity to keep the said first and second data According to particular features of the method according to the twenty-fourth aspect of the present invention, the said first data and the said second data are not kept in the same formats.

According to a twenty-fifth aspect, the present invention envisages a method of recording data exchanged between a terminal and a remote site, characterized in that it includes the displaying of a witness on the said terminal, the said witness varying between at least two visible states when a recording is in progress and at least one of the two visible states not being displayed when the recording is not in progress.

According to a twenty-sixth aspect, the present invention envisages a method of keeping data relating to a communication on a communications network, characterized in that it includes:

an operation of placing the said data in memory, associated with a date when it was placed in memory, an operation of determining the necessity to compress the said data, depending on the date when it was placed in memory, and when the said determination operation indicates that it is necessary to compress the said data, an operation of compressing the said data and of memory storage of secondary data representative of the said primary data.

According to particular features of the method according to the twenty-sixth aspect of the present invention, the said compression operation includes an operation of optical character recognition.

According to particular features of the method according to the twenty-sixth aspect of the present invention, the said compression operation includes the selection of data formats and the elimination of data which does not have a selected format.

According to particular features, the said compression operation includes the selection of at most two images per page of data received from an Internet web site.

According to a twenty-seventh aspect, the present invention envisages a communications method characterized in that it includes an operation of communicating information between at least two persons and an operation of adding information to the said communications, on the basis of at least one of the following criteria:

the identity of one of the said persons, and/or the content of the said information communicated.

According to particular features of the method according to the twenty-seventh aspect of the present invention, the said added information includes a limitation of the legal scope of the said communication.

BRIEF DESCRIPTION OF THE DRAWINGS

Other advantages, aims and features of the present invention will emerge from the description which will follow, given for explanatory and not in any way limiting purposes, with regard to the attached drawings in which:

FIG. 7 represents a flowchart of an implementation of the third aspect of the method envisaged by the present invention.

DETAILED DESCRIPTION OF THE PREFERRED EMBODIMENTS

For certain aspects of the present invention, the method is preferably implemented as a background task in order not to disturb the operation to which the user is accustomed, until a trigger event occurs, either deliberately on the part of the user, or by detection of confidential information to be protected.

For each of the aspects of the present invention, at least one part of a software suite which implements it preferably resides in the user's terminal or in a server of a provider of access to the network in question.

Each of the aspects of the present invention participates in the definition of a method and of a device for assistance to a user of a communications network. In the remainder of the description, the term "assistance software" makes reference to a particular example of implementation of certain aspects of the method and of the device envisaged by the present invention.

Figure 1:
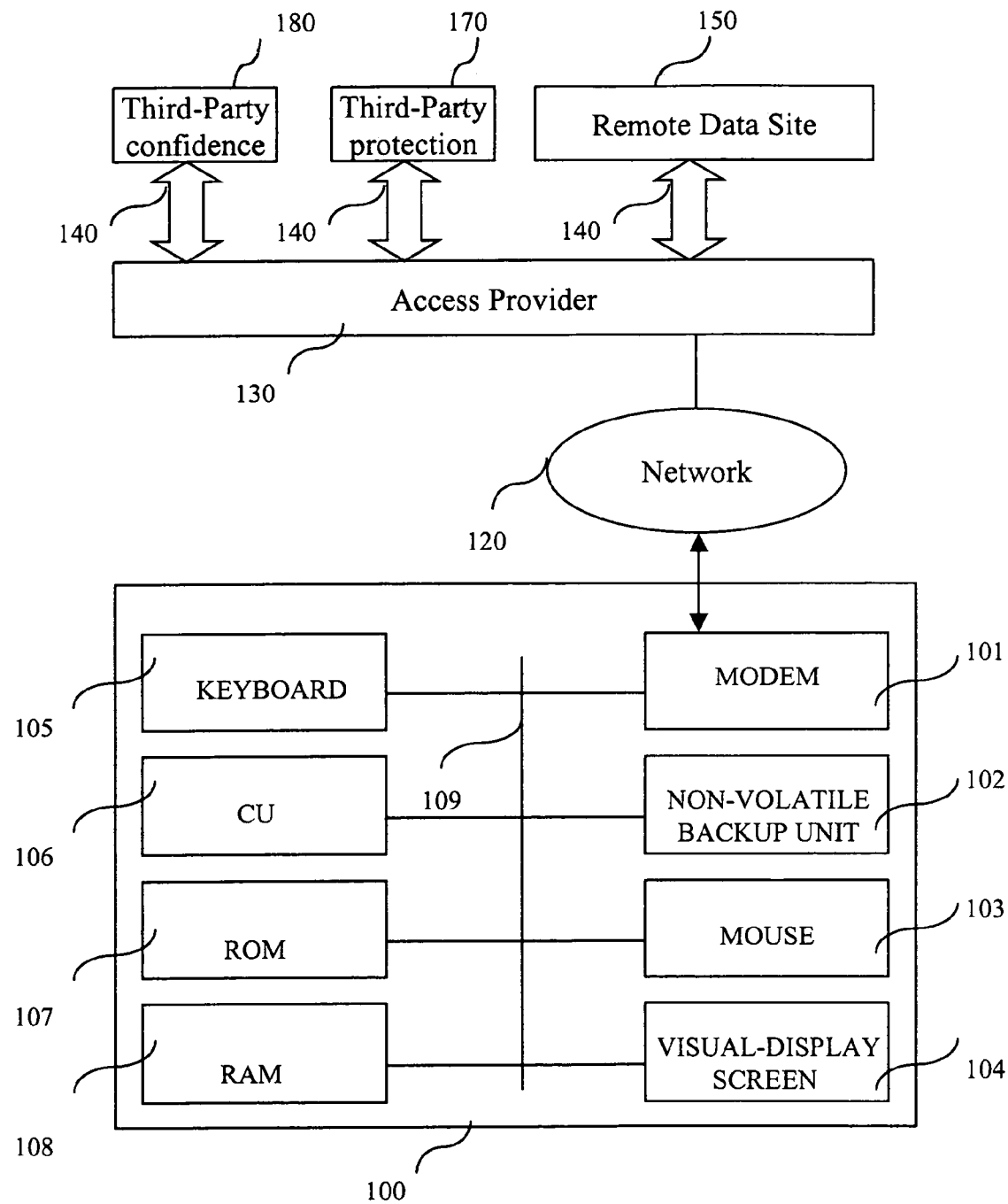
FIG. 1 represents an embodiment of a device suitable for implementing the method envisaged by the present invention.

In FIG. 1 are represented a computer terminal 100 connected, via a network 120, a server of an access provider 130 and a network 140, to a remote data site 150. In the first embodiment illustrated in FIG. 1, the terminal 100 includes, linked together by an address and data bus 109, an interface for communication on a network 101, a non-volatile backup unit 102, a pointing device 103, a visual-display screen 104, a keyboard 105, a central processing unit 106, a non-volatile central memory 107 and a random-access memory 108.

The network 120 is, for example, the switched telephone network. The server of the access provider 130 is, for example, the server of the provider of access to the Internet network known by the name of AOL (trademark) or WANADOO (trademark). The network 140 is, for example, the data communications network known by the name of Internet. The remote data site 150 is implemented by a data server or a computer programmed for this purpose according to known techniques.

In the first embodiment illustrated in FIG. 1, the terminal 100 is a personal computer known by the name of PC (acronym for Personal Computer), or a network computer, known by the name of NC (acronym for Network Computer). The interface for communication on a network 101 is, in the first embodiment described and represented, a modulator/demodulator or MODEM. The non-volatile backup unit 102 is, for example, in the first embodiment described and represented, a hard disk or a compact disc reader/recorder. The pointing device 103 is, in the first embodiment described and represented, a computer mouse. The visual-display screen 104 is of known type, for example with a cathode-ray tube, and is compatible with the standard known to the person skilled in the art under the name of SVGA.

The keyboard 105 includes at least some keys which, alone or in combination, make it possible to select alphanumeric characters. The central processing unit 106 is, in the first embodiment described and represented, a processor, for example of the Intel Pentium trademark. The non-volatile central memory 107 holds the program instructions for the processor 106 which allows it to start up when it starts to be supplied with electricity. The random-access memory 108 is, in the first embodiment described and represented, a cache memory suitable for holding information representative of at least one page received from a site such as the remote data site 150.

For implementing certain aspects of the present invention, the terminal 100 is linked, via the network 140, to a third-party site for assistance or protection 170 and/or to a third-party confidence site 180. The third-party protection site 170 and/or the third-party confidence site 180 each possess a server which keeps Internet pages. In a variant, at least one of these sites 170 and 180 is coincident with that of the access provider 130.

In a general way, according to the first aspect of the present invention, when the user puts a computer system into operation, the assistance software which implements certain of the aspects of the present invention is initialized and runs as a background task. Next, as long as the user is using this computer system, the assistance software monitors the supply of information to be protected. This information is defined by its form (see, for example, the flowchart illustrated in FIG. 2) or by its particular value (see, for example, the flowchart illustrated in FIG. 3). When information to be protected is detected in the background task, an operation for protecting this information is carried out.

Figure 2:
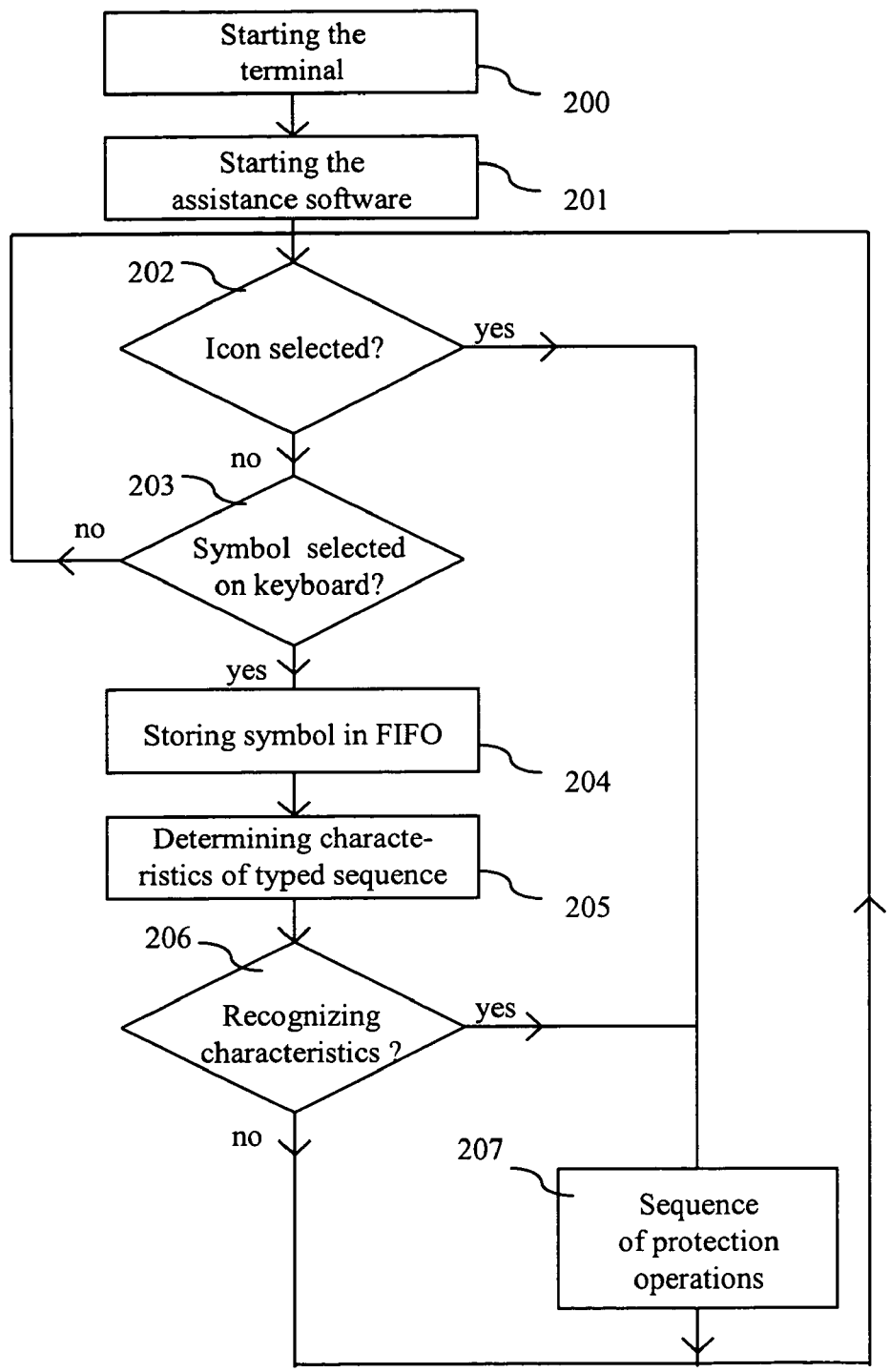
FIG. 2 represents a flowchart of a first implementation of the first aspect of the method envisaged by the present invention.

FIG. 2 represents a flowchart of a first implementation of the first aspect of the method envisaged by the present invention. Following an operation 200 for starting up the terminal 100, in the course of an operation 201, the assistance software is automatically started.

In the course of the use of the terminal 100, and in a known way, the user makes selections by using the mouse 103 or selects symbols using the keyboard 105.

In the course of a test 202, the central processing unit 106 determines whether or not an icon specific to the implementation of the first aspect of the method envisaged by the present invention has been selected by the user. This specific icon may be an icon, such as the icon 1070 illustrated in FIG. 10 and represented on the visual-display screen 104, or an icon which represents a memory of personal information, known by the expression of "wallet", in the software (or "browser") for navigation on the Internet.

When the result of the test 202 is negative, in the course of an operation 203, the central processing unit 106 determines whether a symbol has been selected by the keyboard 105. When the result of the test 203 is negative, the test 202 is reiterated. When the result of the test 203 is positive, in the course of an operation 204, the symbol selected is placed in memory into a "first in first out" register (known to the person skilled in the art by the acronym FIFO), which possesses dimensions at least equal to the largest of the sequences of symbols distribution of which is protected. In the course of an operation 205, characteristics for recognition of the sequence input are determined. These recognition characteristics are information which characterizes the sequence kept in the first in-first out register and which is intended to be compelled with characteristics for recognition of protected sequences.

For example, recognition takes place by comparison of the content of the FIFO memory with sequences of symbols to be protected or segments of these sequences, and the characteristics are then the sequence itself or one or more of its segments.

According to another example, if the information protected is a social-security number or a payment-card number, characteristics may consist of the number of figures input consecutively and of the likelihood that certain of these figures represent a month, a year, an indication of sex, information which is redundant with respect to the other figures or any other function, possibly a one-way function, which provides at least one characteristic.

For example, a credit-card number possesses 16 figures, which have a relationship to one another, and an expiry date in the form of two figures for the month and two figures for the year, it being impossible for the year to be more than a few years after the date of issue of the credit-card. This supplies several characteristics of a credit-card number, without it being necessary to identify this number.

For example, a French social-security number possesses the following characteristics (except for very rare exceptions):
  it includes 13 figures
  the first figure is equal either to 1, or to 2,
  the fourth figure is either 0 or 1,
  the fifth is 1 or 2 when the fourth figure is 1.

In the course of a test 206, the central processing unit 106 determines whether the characteristics determined in the course of operation 205 correspond to characteristics of information to be protected.

When the result of the test 206 is negative, test 202 is reiterated. When the result of the test 202 or the result of the test 206 is positive, in the course of an operation 207, the information to be protected, at least one characteristic of which has been recognized, is protected.

To that end, in the course of operation 207, the user is interrogated on the data acquisition in progress by the display of a message in the window represented on the visual-display screen 104, "Are you inputting XXX", where XXX is replaced by a protected information name, for example "payment-card number, social-security number, confidential code, etc., and the user has to choose and select either "yes" or "no".

Then, when the user has chosen "no", the operation 207 is completed and, when the user has chosen "yes", at least one of the protection operations set out in the implementation of the other aspects of the present invention is implemented (deleting of symbols from the information to be protected, for example by simulation of inputting the delete key "back space", placing in memory the succession of operations carried out since the operation 201, making contact with a third-party protection site 170, authentication of the user as a person authorized to divulge the information to be protected, time stamping, display of legal information, for example).

Following the operation 207, test 202 is reiterated and the operations 202 to 206 proceed as background tasks until the terminal is shut down in a known way.

Figure 3:
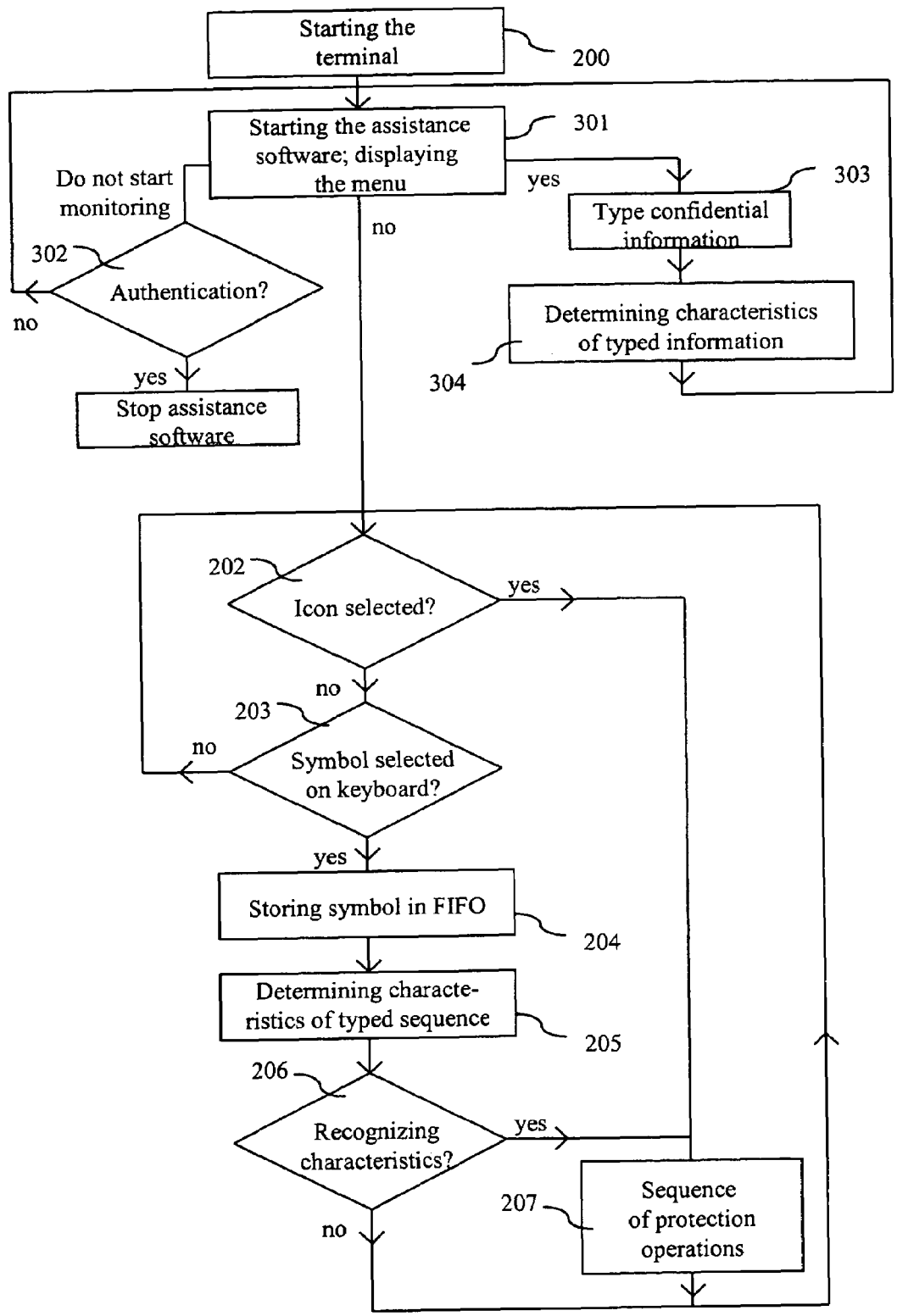
FIG. 3 represents a flowchart of a second implementation of the first aspect of the method envisaged by the present invention.

FIG. 3 represents a flowchart of a second implementation of the first aspect of the method envisaged by the present invention. This second embodiment includes the same operations as the first embodiment, with the exception of operation 201 which is replaced by operations 301 to 304 and the operation 205 which is replaced by an operation 305.

In the course of operation 301, the assistance software is automatically put into operation and causes the display, on the visual-display screen 104, in a dialogue window, of a question for inputting new information to be protected (for example "do you want to input new confidential information to be protected?") and displaying three possible responses which the user can select via the mouse 103, "yes", "no", "do not start monitoring". When "do not start monitoring" is implemented, an authentication operation 302 is carried out. If the user is authenticated, the operation of the assistance software is stopped. If the user is not authenticated, operation 301 is reiterated. When "no" is selected, test 202 is carried out. When "yes" is selected, in the course of an operation 303, the user is invited to input an identifier of the information to be protected (for example by selecting "wallet", "payment card", "social security number", "name", "driving license number", "identity card number", "date of birth", "address", "Internet access code", "bank account access code", "other", etc.), then, a part of the information to be protected, for example the first eight figures of the payment cards to be protected, the first six figures of his social-security number, the day and the month of his birth, the first letters of the street where he lives, the first figures of his postcode, etc.

Then, in the course of an operation 304, characteristics for recognizing the information to be protected are determined in the same way as in the course of operation 305, and these characteristics are placed into non-volatile memory 102. Following operation 304, operation 301 is reiterated.

It will be observed that these characteristics may consist of the whole of the information to be protected, in particular when the information to be protected is selected as "other". The characteristics may also consist of a predetermined number of first figures of the protected number or of any other function, possibly one-way, which supplies at least one characteristic. The reader may draw on the methods for producing redundancy for transmission-error correction (known by the acronym FEC, standing for Forward Error Correction), for example the verification sums known by the name of "checksum".

In the case of the information kept in the "wallet" register, the user supplies the name of the browser which he is using, or runs it and selects "wallet", in such a way that the memory address to be protected or the means of accessing it are determined automatically by the assistance software.

In the course of operation 305, characteristics for recognizing the sequence of symbols in memory are determined in the same way as in the course of operation 304.

It will be observed here that only two data-input means are employed in FIGS. 2 and 3. However, other data-input means, such as a microphone associated with speech-recognition software, a scanner associated with optical character recognition software, or a camera, can be employed in accordance with the first aspect of the present invention.

It will also be observed that the information to be protected may take forms other than a sequence of symbols, such as an image of the back of the eye, a voice signature, a signature input by using the mouse, a printout read by an optical or thermal sensor, etc.

In a variant, not represented, operations 201 to 207 are implemented automatically only when communication is implemented. Hence, when children access a data site, for example via the Internet, confidential information is protected.

In general, according to the second aspect of the present invention, contents of data files received on a communications network are placed in memory and this memory space is managed in such a way as to warn that it is saturating the total memory space available for the other applications. Memory storage and deleting of the content received on the network is organized hierarchically.

In general, according to the eighth aspect of the present invention, when the transmission of a set of information fails because of a limitation in the available pass band or of the maximum transmission duration authorized for a set, a request for transmission of a subset of the said set strictly including less information than the set, is automatically sent. The set preferably corresponds to several files and the subset includes one or more of the said files.

Figure 4:
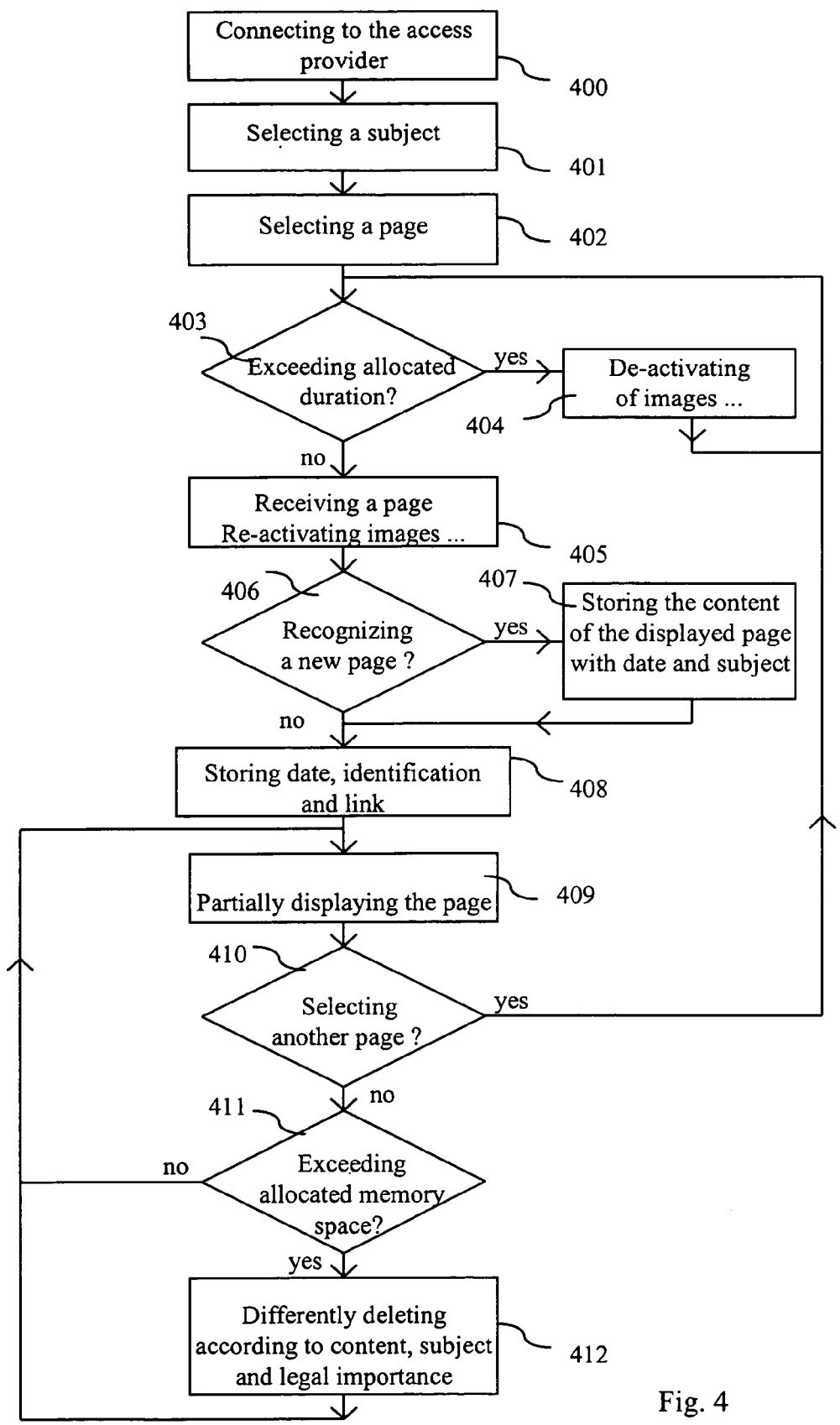
FIG. 4 represents a flowchart of an implementation of the second and eighth aspect of the method envisaged by the present invention.

FIG. 4 represents a flowchart for implementation of the second aspect of the method envisaged by the present invention, in which a memory space is managed.

In the course of an operation 400, the user causes a communications session to be opened between the terminal 100 and the access provider 130, via the network 120, in a known way. In the course of an operation 401, the assistance software causes the display of a selection window and of a menu including one or more subjects which the user has already chosen and/or an option of defining a new subject. The user chooses one of the subjects displayed and/or identifies a new subject. For example, these subjects may be "stock market", "sport", "motor cars", "audio-visual equipment", "others" etc. As soon as the user has selected a subject, the selection window is deleted from the visual display screen 104.

Then, in the course of an operation 402, the user, in a known way or starting from one of the pages already related to the subject which he has selected (to this end, when the user has chosen a subject, he may select and see displayed a list of the last pages visited in connection with the chosen subject, in the same way as the browser software offers a list of sites known as "favorites". The user can then click on a displayed address), selects an Internet page which he wishes to view and a request is transmitted, via the access provider 130, to a site which holds the information relating to the selected page.

The site in question transmits this information to the terminal 100, via the network 120. In general, transmission is carried out with a pass band limited as a function of the traffic present on the network. It then happens that the access provider stops the transmission when the predetermined duration is exceeded. For example, when, at the end of a period of 20 seconds, the information relating to the structure of the page has not been transmitted, the access provider transmits a transmission-failure message. In the course of the test 403, the central processing unit 106 determines whether such a message has been received. When the result of the test 403 is positive, that is to say in the case of a failure to transmit the page, in the course of an operation 404, the transmission of a part of the content of the page is de-activated, the request for transmission of the page is re-transmitted and the test 403 is reiterated.

For example, if, for the same page, several transmission failures occur in succession, the following contents are successively de-activated:

animated image files (for example MPEG files),
static image files (for example JPEG files),
sound files (for example WAVE files),
graphics files.

According to another example, with the content of the page being described to the MPEG-7 format, the de-activated files are graded as a function of their content.

According to a third example, at each iteration of operation 404, the de-activated files include the file of largest dimensions, with the exception of the file which gives the structure of the page and/or of the text file.

When the result of the test 403 is negative, in the course of operation 405, at least a part of the content of the selected page is received and the de-activations carried out in the course of operation 404 are cancelled for the next page to be received.

In the course of the test 406, the central processing unit 106 determines whether the page received is different from all the pages held in memory of the terminal 100. To that end, the central processing unit 106 compares the address of the page as well as the dimensions of each file at this page with the address of all the pages held in memory and the dimensions of the memory-stored files which are relative to the said address, if it is recognized.

When the page is not recognized as being stored in memory, the result of the test 407 is positive and, in the course of an operation 407, the central processing unit 106 causes memory storage of all the files associated with the received page, relating to the address of the page, on the hard disk 102.

When the result of the test 406 is negative, that is to say if the page received is recognized as already being stored in memory, or as a result of operation 407, in the course of an operation 408, the central processing unit 106 stores in memory, relating to the said memory-stored page, the date, the subject selected in the course of operation 401, as well as a link with the page previously selected in the course of the same communications session with the site which holds the information relating to the selected page, if the operation 408 is not being carried out for the first time in the course of this session.

In the course of an operation 409, at least a part of the received page is displayed, according to known techniques, and the user can shift this page, put an end to the communications session, and more generally use all the functions of his browser software.

In the course of a test 410, the central processing unit 106 determines whether or not another page is being selected by the user. When the result of the test 410 is positive, a transmission request is sent to the site which holds the information relating to the new page selected, with validation of the transmission of all the files attached to the said page, and test 403 is carried out.

When the result of the test 410 is negative, in the course of a test 411, the central processing unit 106 determines whether or not the memory allocated by the user for holding the content of pages received via the communications network 120 has been exceeded.

It will be observed here that, in the course of the installation of the assistance software, the user allocates a memory space on the hard disk 102 for memory storage of page contents.

When the result of the test 411 is negative, operation 409 is reiterated. When the result of the test 411 is positive, in the course of operation 412, the oldest files kept in the memory space allocated to holding the pages received are sorted on the basis of predetermined criteria and certain files which do not meet the said criteria are deleted.

By way of example, the user can attribute to certain pages an automatic deletion prohibition (see, for example, operation 519, in FIG. 5B), and the files which are endowed with this prohibition are not automatically deleted. In the event that all the files stored in memory are endowed with this prohibition, the user is warned that he has to:

either allocate supplementary memory space to the function of memory storage of pages received via the communications network 120 (he can then carry out operation 412 again), or choose to delete files relating to memory-stored pages (he is then invited to carry out manual deletion) (see, for example, operation 517, FIG. 5B), or authorize compression of the said files with a compression ratio greater than that which is used for the memory-stored files (in this latter case, in the course of operation 412, the image files and/or the sound files, of the first pages stored in memory are decompressed then recompressed with a higher compression ratio, until the allotted memory space is complied with).

By way of a second example, not exclusive of the first example, the files are deleted on the basis of the type, the animated image files, fixed image files, then sound, then graphics, then text files being deleted after different periods.

For example, the animated image files are kept for half as long as the fixed image files which are kept for half as long as the sound files, which are kept for half as long as the graphics files which are kept for half as long as the text files which are kept for half as long as the links between the pages which are kept for half as long as the page addresses.

By way of a third example, not exclusive of the first two, the information relating to the pages stored in memory for the longest time is deleted first.

By way of a fourth example, not exclusive of the first three, the information relating to the various subjects is kept for different durations.

By way of a fifth example, not exclusive of the first four, the information relating to the pages of a site where a transaction has been carried out is kept longer than the others, and, for example, for least a period equal to a legal guarantee plus a maximum delivery period (for example, if the guarantee period is 12 months, the information will be kept for a duration of at least 15 months).

Following operation 412, operation 409 is reiterated.

Figure 5A:
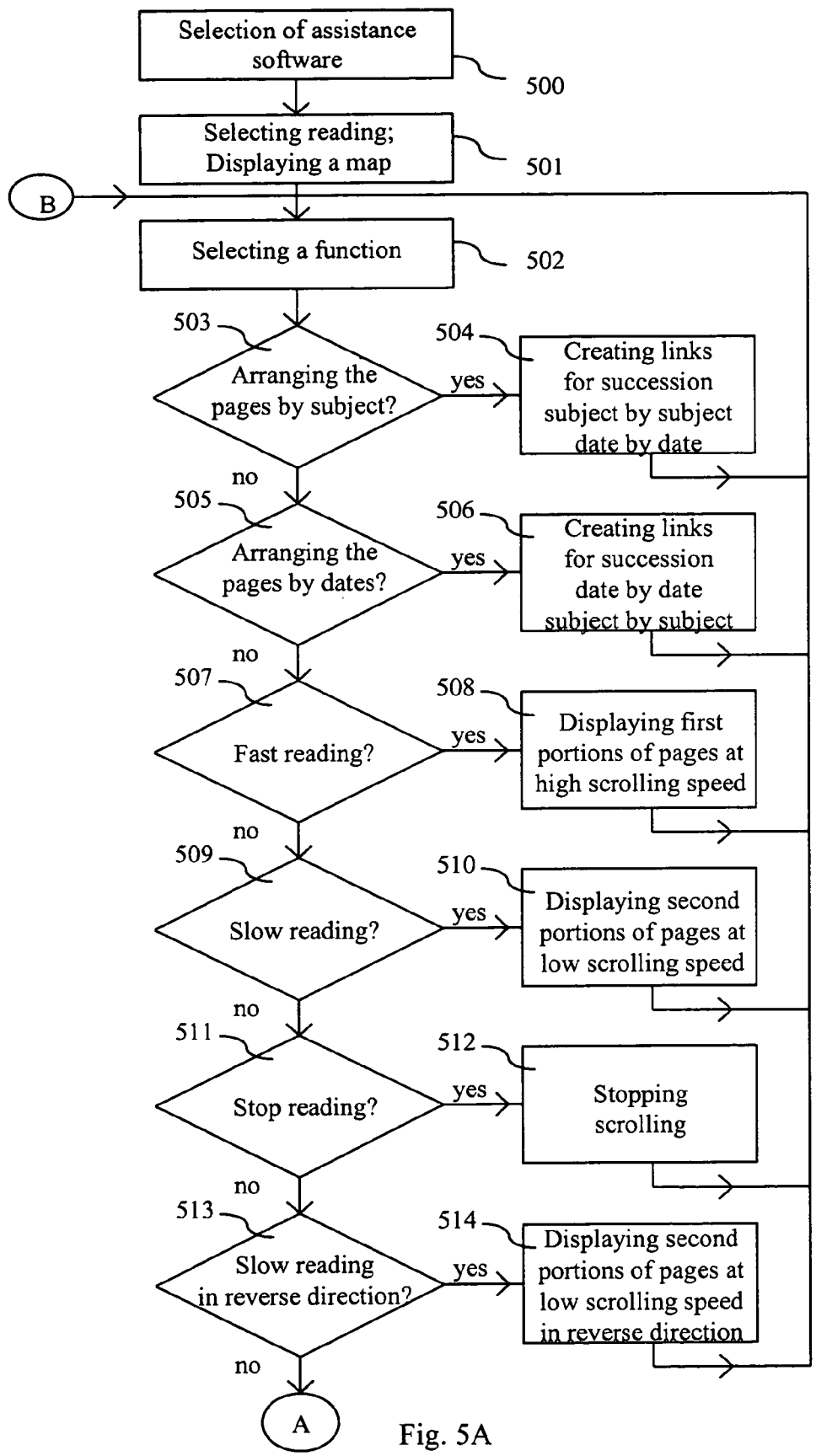
FIGS. 5A and 5B represent a flowchart of an implementation of the sixth aspect of the method envisaged by the present invention.
Figure 5B:
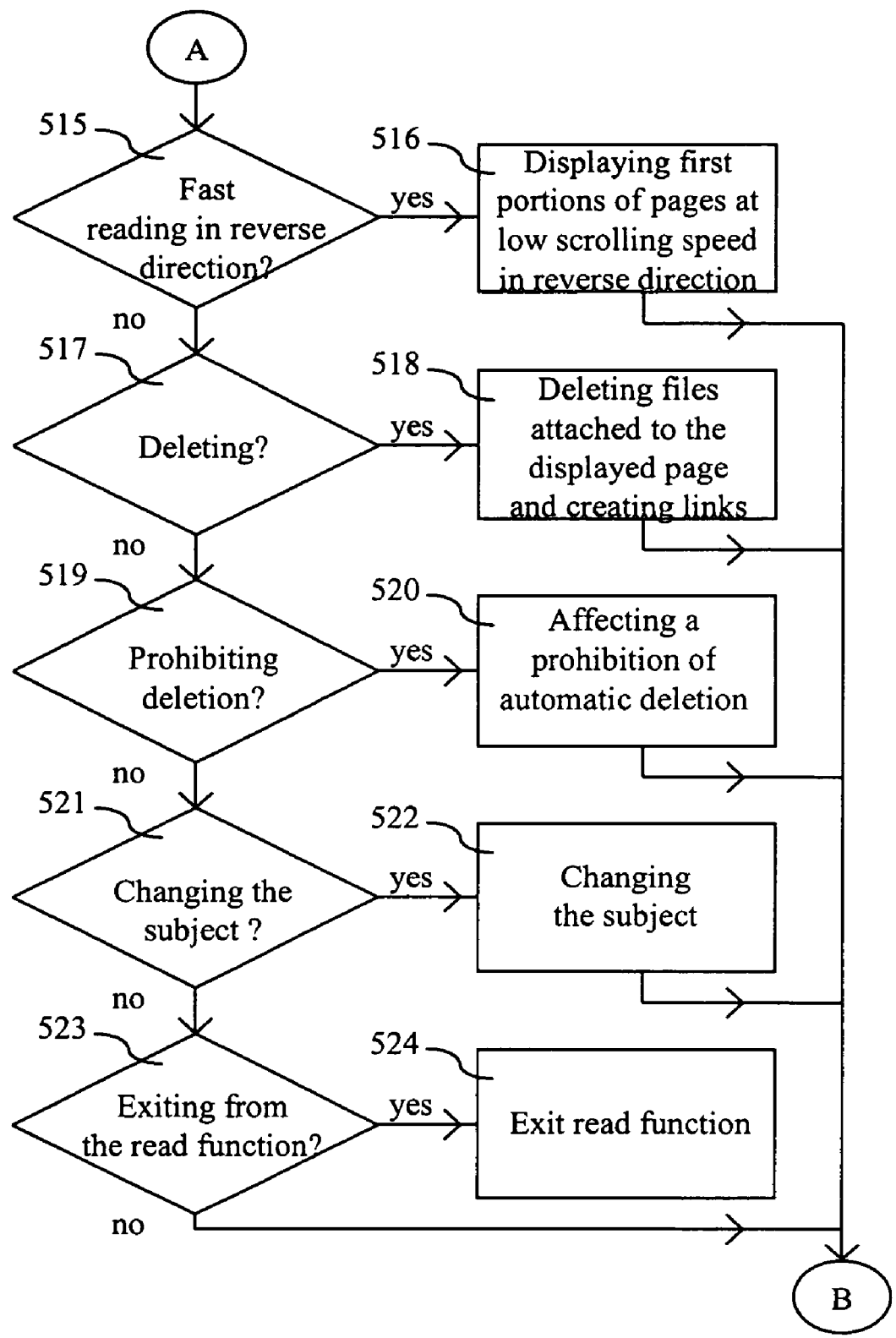

FIGS. 5A and 5B represent a flowchart for implementation of the sixth aspect of the present invention. Following the assistance software being put into operation, either automatically upon the terminal 100 being put into operation, or by selection of a specific icon (not represented) in the course of operation 500, in the course of operation 501 the user can select a function of rereading of pages received in the course of communications on a communications network and stored in memory on the hard disk 102.

Figure 6:
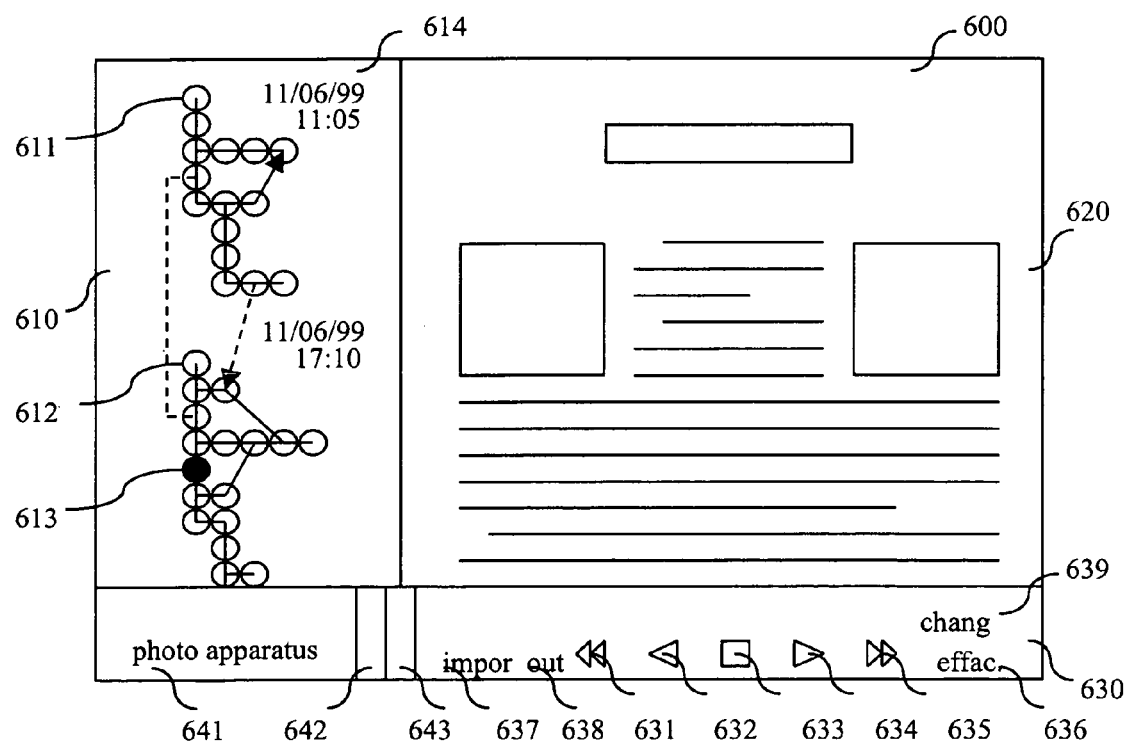
FIG. 6 represents a visual-display screen in the course of a re-reading operation of the flowchart illustrated in FIG. 5.

In the course of an operation 502, the user selects a function related to the re-reading, for example by using icons illustrated in FIG. 6.

In the course of the test 503, the central processing unit 106 determines whether or not the function selected in the course of operation 502 is that of arranging the pages stored in memory by subject. When the result of the test 503 is positive, in the course of an operation 504, the central processing unit 106 displays a list of the existing subjects and, when the user has chosen a subject, organizes the information held in memory in connection with the subject selected, date by date, in reverse chronological order. Following operation 504, operation 502 is reiterated.

When test 503 is negative, in the course of a test 505, the central processing unit 106 determines whether or not the function selected in the course of operation 502 is that of sequencing the pages stored in memory by date. When the result of the test 505 is positive, in the course of an operation 506, the central processing unit 106 organizes the information kept in memory, data by date, in inverse chronological order. Following operation 506, operation 502 is reiterated.

When the test 505 is negative, in the course of a test 507, the central processing unit 106 whether or not the function selected in the course of operation 502 is that of carrying out rapid re-reading of the pages stored in memory. When the result of the test 507 is positive, in the course of an operation 508, the central processing unit 106 displays first page portions, and each page during a first predetermined period, in the order defined by the sequencing, or, by default, date by date, in chronological order. The first page portions preferably include at least the address of the page and, preferably, the top part of the page including at least the texts of this upper part of the page. When the operation 506 is launched, operation 502 can be reiterated.

When test 507 is negative, in the course of a test 509, the central processing unit 106 determines whether or not the function selected in the course of operation 502 is that of carrying out slow re-reading of the pages stored in memory. When the result of the test 509 is positive, in the course of an operation 510, the central processing unit 106 displays second page portions, and each page for a second predetermined duration longer than the first predetermined duration, in the order defined by the sequencing, or, by default, the files endowed with automatic delete prohibition (see operation 519) before the others and, in each group, date by date, in chronological order. The second page portions preferably include at least the first portions. The second portions may include the texts from the whole page, with the page scrolling, from top to bottom, in order to display these texts. They may also include the graphics, the static images, the sounds and the animated images. When operation 510 is launched, operation 502 can be reiterated.

When the test 509 is negative, in the course of a test 511, the central processing unit 106 determines whether or not the function selected in the course of operation 502 is that of stopping re-reading. When the result of test 511 is positive, in the course of an operation 512, the central processing unit 106 stops the scrolling on the current page and causes display and distribution of the content of each file associated with the said page, including the sound and animated-image files. Following operation 512, operation 502 is reiterated.

When test 511 is negative, in the course of a test 513, the central processing unit 106 determines whether or not the function selected in the course of operation 502 is that of carrying out slow re-reading in the reverse direction. When the result of test 513 is positive, the same operations as in the course of operation 510 are carried out, but in reverse order. When the operation 514 is launched, operation 502 can be reiterated.

When the test 513 is negative, in the course of a test 515, the central processing unit 106 determines whether or not the function selected in the course of operation 502 is that of carrying out rapid re-reading in the reverse direction. When the result of the test 515 is positive, the same operations as in the course of operation 508 are carried out but in the reverse direction. When operation 516 is launched, operation 502 can be reiterated.

When test 515 is negative, in the course of a test 517, the central processing unit 106 determines whether or not the function selected in the course of operation 502 is that of deleting information. When the result of the test 517 is positive, the page being displayed remains displayed throughout the operation 518. A list of the files attached to the page being displayed is displayed in a window superimposed on the page being displayed and the user selects the files which he wishes to delete.

These files are then deleted from the hard disk 102. When the delete operation is carried out, the function previously selected before that of deletion is repeated and operation 502 can be reiterated.

When test 517 is negative, in the course of a test 519, the central processing unit 106 determines whether or not the function selected in the course of operation 502 is that of giving the page being displayed automatic delete prohibition. When the result of the test 519 is positive, in the course of an operation 520, the address of the page being displayed is associated with a flag which indicates that the files relating to this page cannot be deleted automatically, for example in the course of an automatic memory-management operation. When operation 520 is carried out, operation 502 can be reiterated.

When test 519 is negative, in the course of a test 521, the central processing unit 106 determines whether or not the function selected in the course of operation 502 is that of changing the reference subject of the page being displayed. When the result of the test 521 is positive, in the course of an operation 522, the page being displayed remains displayed throughout the duration of operation 522 and, in a window superimposed on the page being displayed, the various subjects referenced as well as an option of creating a new subject are offered to the user. The user then selects the new subject to which the page being displayed has to be related and the subject associated with the page is altered in memory on the hard disk 102. When operation 522 is carried out, operation 502 can be reiterated.

When the test 521 is negative, in the course of a test 523, the central processing unit 106 determines whether or not the function selected in the course of operation 502 is that of exiting from the re-read function. When the result of the test 523 is positive, the re-read function is stopped and the dialogue window displayed on the visual-display screen 104 allows the user to select other functions. When the result of the test 523 is negative, the operation being carried out, if it is one of operations 508, 510, 514 or 516, and operation 502 can be reiterated.

FIG. 6 represents a visual display screen 600 in the course of a re-reading operation of the flowchart illustrated in FIG. 5. This screen 600 corresponds, for example, to what is displayed by the visual-display screen 104 in the course of one of operations 508, 510, 514 and 516, when operation 502 can be reiterated.

On the screen 600, a main area 620 represents a part of a page re-read from memory on the hard disk 102. A graphics area 610 represents pages held in memory on the hard disk 102 and their links. Here the pages received on the date Nov. 6, 1999, in the course of a communications session opened at 11 hours and 5 minutes are represented in the upper part of the graphics area 610, and the first pages received on Nov. 6, 1999, in the course of a communications session opened at 17 hours and ten minutes, are represented in the bottom part of the graphics area 610. Each page is represented in the graphics area 610 in the form of a circle, and two circles which touch and the centers of which are linked by a solid straight line correspond to two pages which have been visited successively.

For example, a succession of circles 1 to 5 represented as follows

where the circles 1 and 2, 2 and 3, 3 and 4 and 3 and 5 are touching respectively in pairs, and the centers of which are linked by a solid straight line, two by two, indicate that the user has visited pages 1, 2, 3, 4, 3 and 5 successively. If a link is indicated by a straight line between two circles which are not touching, that indicates that the two pages represented possess identical addresses.

The black circle indicates the page being displayed. The links drawn out in broken lines relate to the pages which are represented in two different communications sessions, that is to say which were received in the course of two different sessions. When one of these straight lines (solid or broken) includes an arrow, that indicates that the page was received with more information in the course of the occurrence indicated by the point of the arrow than in the course of each other occurrence.

The bottom function selection area 630 includes geometric shapes, some of which are well known to users of a video recorder or a tape recorder, and written information.

The leftmost rectangle, referenced 641, indicates the subject being re-read, here "photo apparatus". The rectangles 642 and 643 indicate that there are two other subjects which the user may choose. The double triangle turned to left 631 corresponds to the rapid re-reading in reverse direction of the selected sequencing and makes it possible to select operation 516. The triangle turned to left 632 corresponds to the slow re-reading in the reverse direction of the selected sequencing and makes it possible to select operation 514. The square 633 corresponds to the stopping of re-reading and makes it possible to select operation 512. The triangle turned to right 634 corresponds to the slow re-reading in the selected sequencing order and makes it possible to select the operation 510. The double triangle turned to right 635 corresponds to rapid re-reading in the order of the selected sequencing and makes it possible to select operation 508.

The word "effac" allows the user to start operation 518. The word "impor" 637 allows the user to start operation 520. The word "out" 638 allows the user to exit from the re-reading function. The word "chang" 639 allows the user to select operation 522.

It will be observed that the user can select the next page to be displayed directly from the diagram displayed in area 610, by using the mouse 103.

In general, according to the third aspect of the present invention, in the course of a communications session between the terminal 100 and a site 150, a second communications session is opened between the terminal 100 and a protection site 170 and information relating to the site 150 is transmitted automatically to the protection site 170. Information relating to the first communications session is preferably transmitted back automatically to the terminal 100 by the protection site 170.

FIG. 7 represents a flowchart for implementing the third aspect of the method envisaged by the present invention.

In the course of an operation 702, the site 150 and, in the course of an operation 704, the terminal 100 open a communications session between them. In the course of an operation 706, the site 150 and, in the course of an operation 708, the terminal 100 initiate communication of protected information, and, in the case illustrated in FIG. 7, a transaction necessitating on-line payment by transmitting an identifier of a means of payment.

In the course of an operation 710, the terminal 100 and, in the course of an operation 712, the assistance or protection third party 170 open a second communications session. In the course of an operation 714, the terminal 100 transmits, to the protection site 170, an identifier of the site 150, for example in the form of an identifier of the page being displayed, and, more particularly, the address of the said page. In the course of an operation 716, the protection site receives the said identifier.

In the course of an operation 718 the protection third party transmits to the terminal 100 information relating to the first session. For example:

the country where the site 150 is based, the law applicable to the communication of the protected information, identified by the country of residence of the site 150, the period of legal guarantee of a purchase from the site 150, the degree of risk of a fraudulent transaction with the site 150, evaluated on the basis of statistics available, for example, from a site such as "fraud.org".

a degree of satisfaction of other customers of the site 150, evaluated on the basis of information transmitted by the customers or by a site such as "bizrate.com", a level of punctuality of deliveries made, evaluated on the basis of information transmitted by the previous clients or by other "rating" sites, advertising relating to the products promoted by the site 150, an offer to make contact with sites competing with the site 150, an offer of automatic detection of encryption of the first session, the date of establishment of the site 150, obtained from the site "internic.com", an offer of advice relating to the transaction in progress, a certification of information originating from the site 150, a certification of the site 150, for example is performed by the site "verisign.com", possibly supplemented by operations recommended by that site, a certified date of the first session intended to be combined with information to be stored in memory, a substitute means-of-payment identifier in order to protect the user's usual means of payment, are information relating to the first session.

The information relating to the first session which is transmitted by the protection site 170 preferably includes information relating to the site 150 and/or to the technical characteristics of the first session.

However, in complement, information such as:

an offer to make contact with a search engine for best prices, a questionnaire to be filled in, the responses to which are intended to be kept in memory, advice as to general prudence, for example drawing on that offered by the site "fraud.org", may be transmitted by the protection third party 170.

The terminal 100 receives and processes this information in the course of operation 720.

In FIG. 7 the case has been represented in which the user chooses to visit another site, called "third party merchant", a competitor of the site 150, for example on the basis of the result of a search carried out by a best-price search engine.

In the course of operation 722, the terminal 100 and, in the course of operation 724, the third-party merchant site open a third communications session. In the course of operation 726, the terminal 100 and, in the course of operation 728, the third-party merchant site initiate communication of protected information and, in the case illustrated in FIG. 7, a transaction requiring on-line payment by transmission of a means-of-payment identifier.

In the course of an operation 730, the terminal 100 and, in the course of an operation 732, the assistance or protection third party 170, open a fourth communications session. In the course of an operation 734, the terminal 100 transmits, to the protection site 170, an identifier of the third-party merchant site, for example in the form of an identifier of the page being displayed, and, more particularly, the address of the said page. In the course of an operation 736, the protection site receives the said identifier.

In the course of an operation 738, the protection third party transmits to the terminal 100 information relating to the third session. In the course of operation 740, the terminal 100 receives and processes the said information relating to the third session.

By way of example, in FIG. 7, a large number of exchanges of information have been represented between the terminal 100 and the protection site 170, in the course of operations 738 to 764. However, in accordance with the third aspect of the present invention, at least one item of information relating to the third session is transmitted in the course of operation 738.

In the example illustrated in FIG. 7, complementing the transmission of information relating to the third session carried out by the protection site 170 to the terminal 100 in the course of operation 738, in the course of an operation 742 the terminal 100 requires transmission of the degree of risk, of the degree of punctuality and the degree of satisfaction. The protection site 170 receives this request in the course of operation 744 and transmits these degrees in the course of operation 746. The terminal 100 receives these degrees and displays them to the user in the course of an operation 748.

Figure 16:
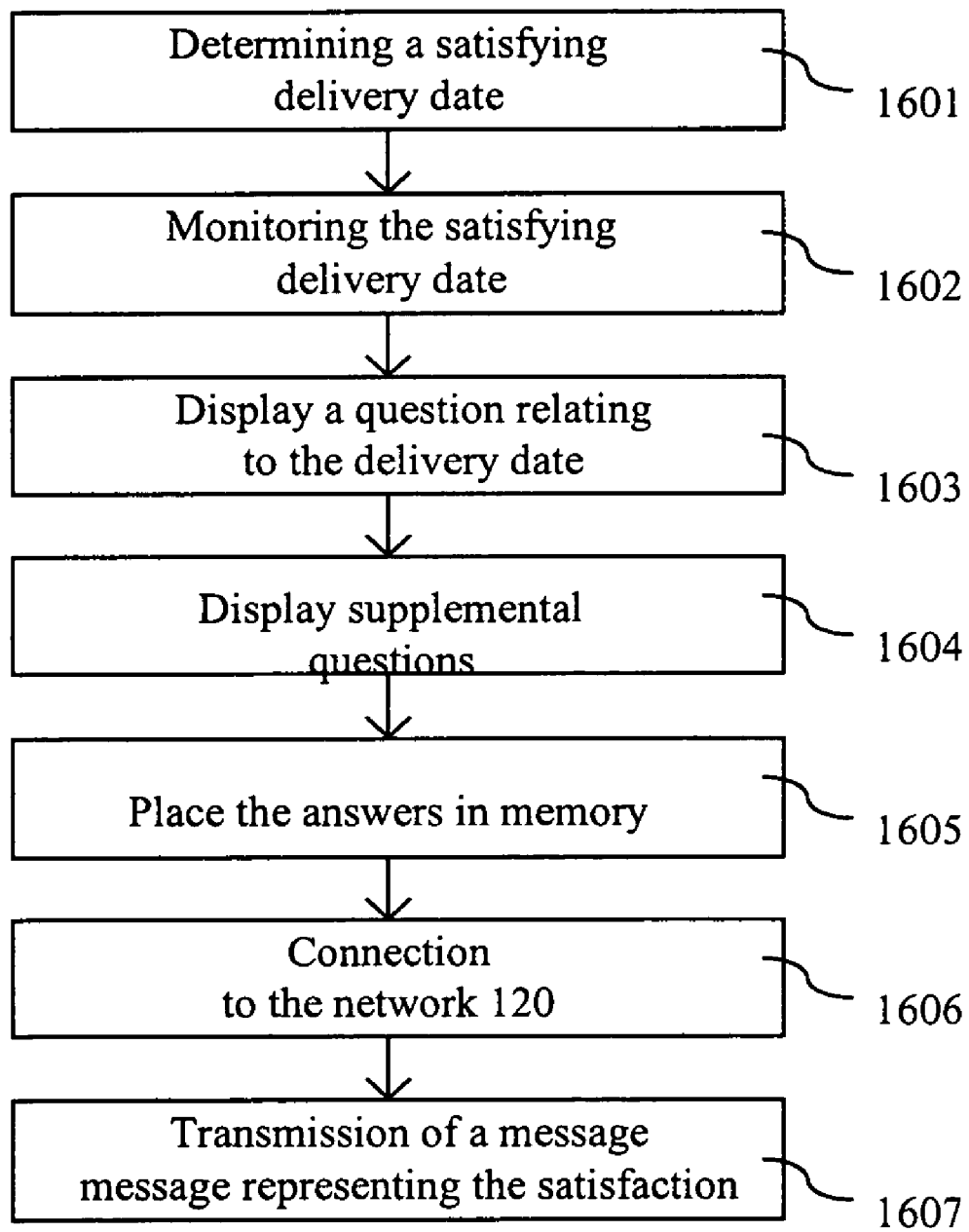
FIG. 16 represents a flowchart of the operation of the device illustrated in FIG. 1, in an implementation of the fifth aspect of the present invention.

As indicated above, each of these degrees can be based on official satisfaction and fraud statistics (for example country by country or state by state, by means of payment used, by type of transaction in progress, by site, etc.) or available on a network such as the Internet network, and/or on information supplied by visitors to the protection site 170 (see FIG. 16).

In the course of an operation 750, the terminal 100 requires transmission of a legal questionnaire. The protection site 170 receives this request in the course of operation 752 and transmits this questionnaire in the course of operation 754. The terminal 100 receives this questionnaire and displays it to the user in the course of an operation 756. The questionnaire may include questions to which it is necessary to respond either automatically, by using the assistance software, or manually, by inputting at the keyboard 105 with a view to keeping a legal trace of the traction. For example, this information may include an identifier of the site 170, an identifier of the user, a transaction date, a purpose of the transaction and a transaction amount. The questionnaire may also include questions the responses to which are optional but which serve to make the user aware of the consequences of the transaction or of the lack of knowledge which he has of the third-party merchant site.

The terminal 100 transmits the responses to the questionnaire, and, if appropriate, attached pages which originate from the third session, to the protection site 170 with a request for sequestration, in the course of an operation 758. The protection site 170 receives this information in the course of an operation 760 and encrypts it, adding to it a certified date and a certificate of integrity, and sends it back to the terminal 100, in the course of an operation 762. The terminal 100 receives this encrypted information and the certificate of integrity in the course of an operation 764 and places them in memory on the hard disk 102, and, if appropriate, endowing them with automatic-deletion prohibition (see operation 519). In a variant, the protection site 170 stores a duplicate of this information or the certificate of integrity which makes it possible to detect whether the information held in memory is subsequently altered.

In the course of operation 766, the terminal 100 transmits a single-use means-of-payment request to a financial site proposed by the protection site 170. The financial site receives this request in the course of an operation 768.

The financial site, in the course of an operation 770, supplies the terminal 100 with information intended to participate in determining a single-use means-of-payment identifier.

The identifier of a single-use payment card consists, for example, of the first eight figures of a real payment card and of eight figures supplied by the financial site. It will be observed that the date of expiry of the said card may form part of the information supplied by the financial site and correspond to a code.

According to another variant, the assistance software installed on the terminal 100 allows coding of the user's payment card number, by means of a key supplied by the financial site, in such a way that the coded number is subsequently decoded by a financial organization, for example the same financial site, and enables a payment to be made.

When the user is already referenced within the financial site, that is to say that a permanent account number is attributed to him, the financial site first of all carries out authentication of the user. Then the third-party financial site does not transmit a whole payment-card number, in order to avoid the possibility of this number being pirated, that is to say used by a third party. In contrast, preferably, the financial site supplies a root which makes it possible to determine an identifier of a payment means by the user or the terminal 100 but does not make it possible, with the root alone, to constitute a means-of-payment identifier. This characteristic is the opposite of the method of operation described in the U.S. Pat. No. 5,883,810 which is entirely incorporated here by reference. The root supplied by the financial site and/or the determination of the identifier of the single-use means of payment depend, preferably, on identifiers of the financial transaction, such as its amount, the identifier of its payee and/or the identifier of the financial site.

The root supplied by the financial site may be generated as a transaction certificate for the transaction in progress.

The terminal 100 receives the information intended to participate in determining a single-use means-of-payment identifier in the course of operation 772. It determines the single-use means-of-payment identifier in the course of operation 774, for example by implementing a one-way calculation function of the assistance software, acting on the information received from the financial site, of a payment-card number, of an identifier of the site 150 and of a transaction amount. If appropriate, a transaction certificate is also used to determine the single-use means-of-payment identifier.

In the example illustrated in FIG. 7, in the course of operation 776, the terminal 100 and, in the course of operation 778, a third-party confidence site 180 open a fifth communications session. In the course of an operation 780, the terminal 100 transmits information to be sequestered to the third-party confidence site. This information is legal information relating to the transaction carried out with the third-party merchant site. In the course of an operation 782, the third-party confidence site 180 places this information in memory, possibly encrypted and accompanied by a certificate of integrity.

In the example illustrated in FIG. 7, in the course of an operation 784, the protection site 170 transmits a security-protection message to the third-party merchant site in order to confirm that the transaction has been security protected.

It will be observed in FIG. 7 that the protection site 170, financial site and third-party confidence site 180 have been represented as independent entities. However, in other embodiments of the method of the present invention, two or three of these sites are combined into a single entity.

It will be observed that the site known as financial site can serve only as intermediary between the parties to the transaction (the user and the third-party merchant site) and have the payment made by another financial body, after having supplied it with an identifier of the user or of a real or virtual means of payment. In particular, the site known as financial site can use the root which it has transmitted and, if appropriate, information which it has received on the part of the terminal 100, in order to determine a permanent payment-card number.

For example, if the key transmitted is a series of figures which have to be added to the figures of the permanent payment-card number in order to supply, modulo 10, the figures of the single-use means-of-payment identifier, the key kept by the financial site can serve it for determining the permanent payment-card number.

It will be observed that all the communications employed in accordance with the present invention are preferably protected by encryption, according to known or future techniques.

Figure 8:
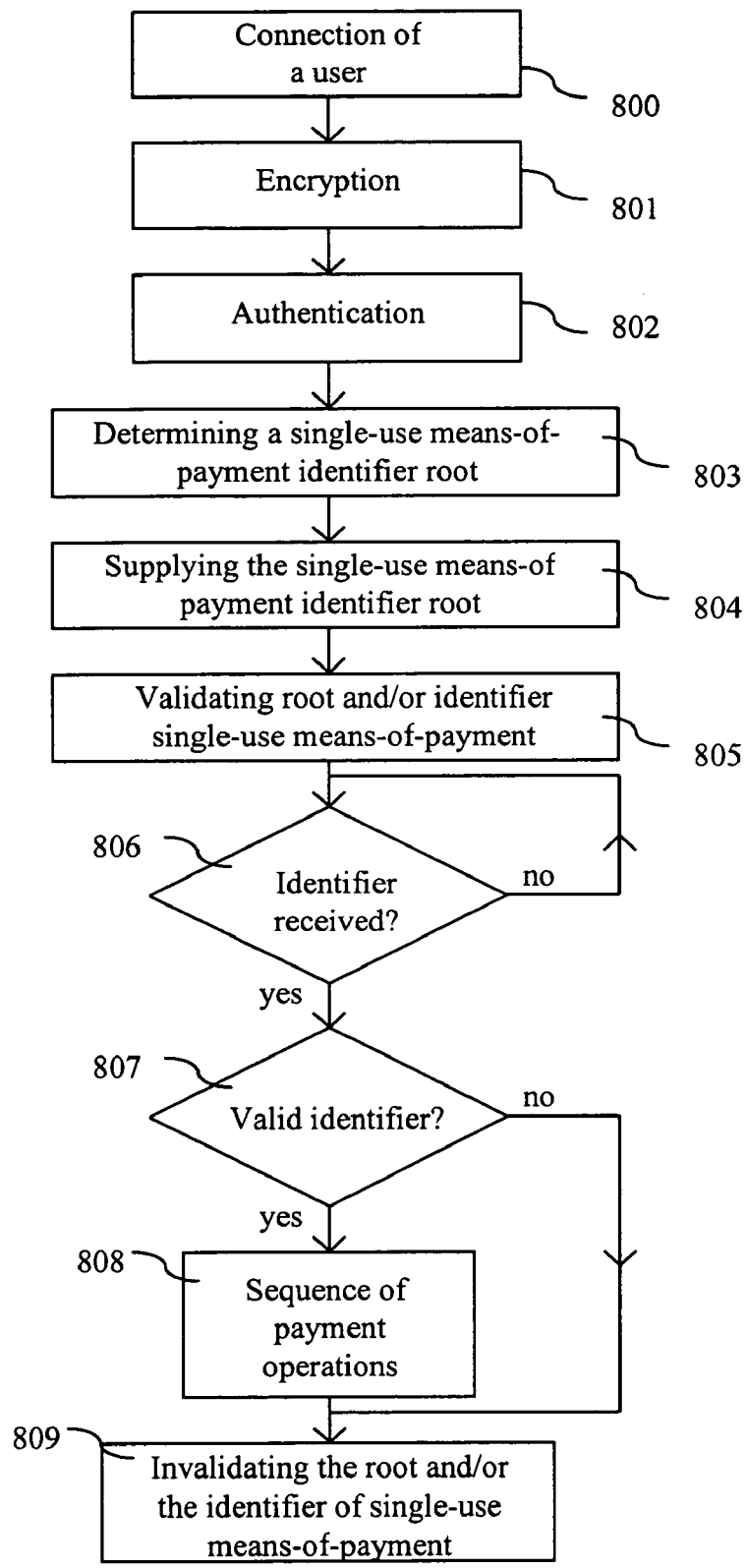
FIG. 8 represents functions implemented in various computer systems linked to a communications network in the course of a first example of a succession of operations implemented in accordance with the fourth aspect of the method envisaged by the present invention.

FIG. 8 represents functions implemented in various computer systems linked to a communications network in the course of a first example of a succession of operations implemented in accordance with the fourth aspect of the method envisaged by the present invention, in the case in which the user is referenced with the financial site. It will be observed in FIG. 8 that, in the course of an operation 800, the terminal 100 is connected to the financial site and that a communications session is in place. In the course of an operation 801, the financial site and the terminal 100 organize the encryption of the communications. Next, in the course of an operation 802, the financial site authenticates the user of the terminal 100 in a known way, for example by asking him for a confidential access code and by checking this code.

Next, in the course of an operation 803, the financial site determines the single-use means-of-payment identifier root. This root is preferably related to an identifier of the user and kept with this identifier in a memory (not represented) of the financial site. For example, this root represents the last eight figures of a payment-card number to be supplied to a merchant site such as the merchant site 150 or the third-party merchant site. According to other embodiments, the key is a coding key used by software resident in the terminal 100 in order to generate a means-of-payment identifier. In the course of an operation 804, the root is supplied to the terminal 100. In the course of an operation 805, the root is validated in memory of the financial site, in a list of valid roots. According to one variant, the financial site determines the single-use means-of-payment identifier which the terminal 100 is going to use. For example, the financial site knows the first eight numbers of a payment card and adds to them the last eight numbers which it supplies to the terminal 100 or the coding function and the roots used by the terminal 100. This identifier is then kept in a memory of valid identifiers.

The communications session with the terminal 100 is then broken off. When the merchant site wants to be paid, it supplies a means-of-payment identifier to the financial site. In the course of a test 806, the financial site determines whether or not it has received a means-of-payment identifier. When the result of the test 806 is negative, test 806 is reiterated. When the result of test 806 is positive, in the course of a test 807, the financial site determines whether or not the means-of-payment identifier is valid. To that end, for example, the financial site extracts the root which it has supplied and compares it with the roots held in the list of valid roots. According to another example, the financial site compares the identifier which it receives with the elements of a list of valid identifiers which it has determined.

When the result of test 807 is positive, in the course of an operation 808, payment is made. When the result of the test 807 is negative or when the payment operation 808 is completed, in the course of an operation 809, the root of the identifier or the identifier itself is invalidated in the memory of the financial site so that this root or this identifier cannot be used for a payment.

In a variant, the user, in the course of operation 803, supplies information relating to the transaction, such as the name of the company which is managing the merchant site, for example (supplied by the protection third party 170, for example) or the amount of the transaction and the identifier of the single-use means of payment is determined so as to be representative of this information or to be associated, in the memory of the financial site, with this identifier. In this way the transaction can be authenticated by the financial site, in the course of operation 807, prior to payment, in the course of operation 808.

Figure 9:
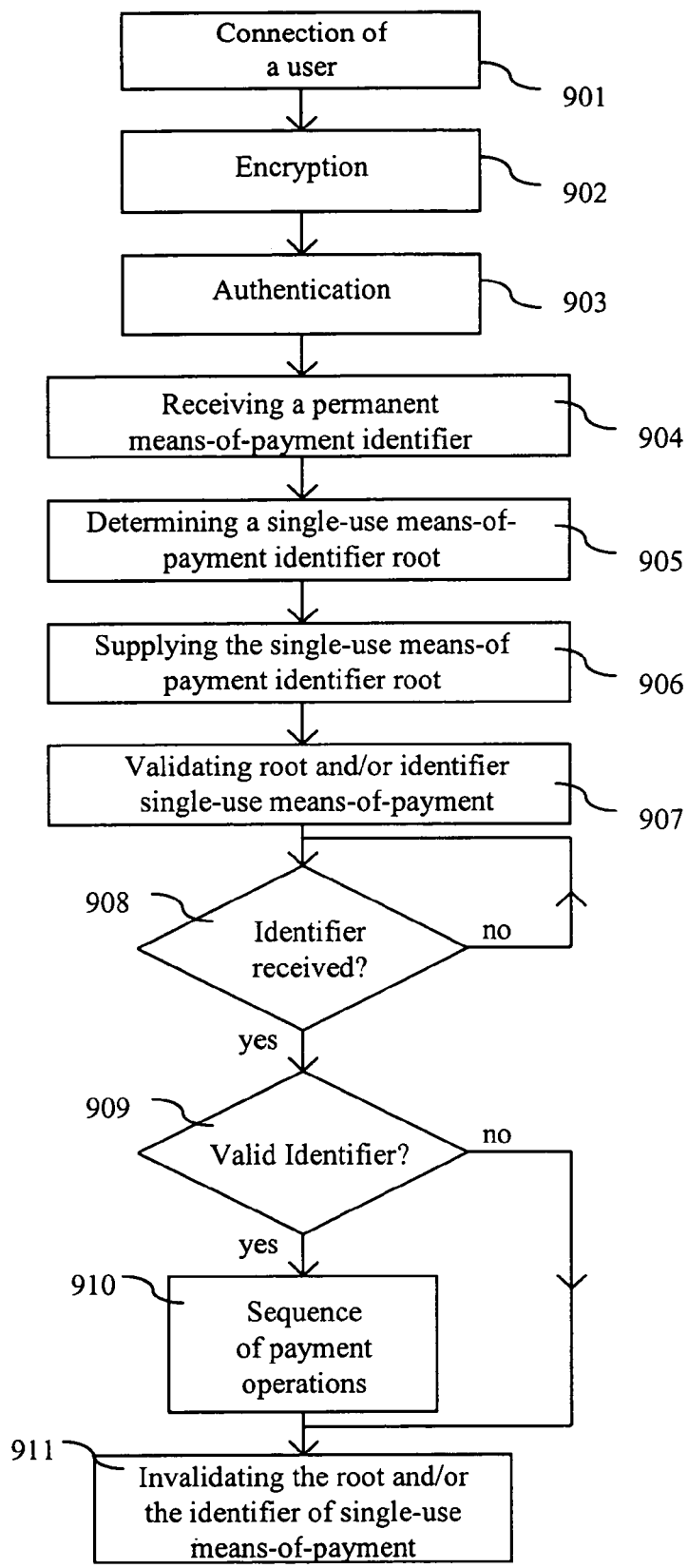
FIG. 9 represents functions implemented in various computer systems linked to a communications network in the course of a second example of a succession of operations implemented in accordance with the fourth aspect of the method envisaged by the present invention.

FIG. 9 represents functions implemented in various computer systems linked to a communications network in the course of a second example of a succession of operations implemented in accordance with the fourth aspect of the method envisaged by the present invention, in the case in which the user is not referenced with the financial site. It will be observed in FIG. 9 that the operations 901 to 903, 905 to 909 and 911 correspond respectively to the operations 800 to 807 and 809.

Following operation 903 and before operation 905, in the course of an operation 904, the terminal 100 supplies the financial site with a permanent means-of-payment identifier, such as a payment-card number.

Following the test 909, when it is positive, in the course of an operation 910, the financial site uses the means-of-payment identifier which it has received from the terminal 100 in the course of an operation 904 in order to obtain payment from the financial body which issued the permanent payment means. This payment is made either for the benefit of the merchant site which has supplied the single-use means-of-payment identifier, or for the benefit of the financial site, which, then, makes payment for the benefit of the merchant site which supplied the single-use means-of-payment identifier.

Figure 17:
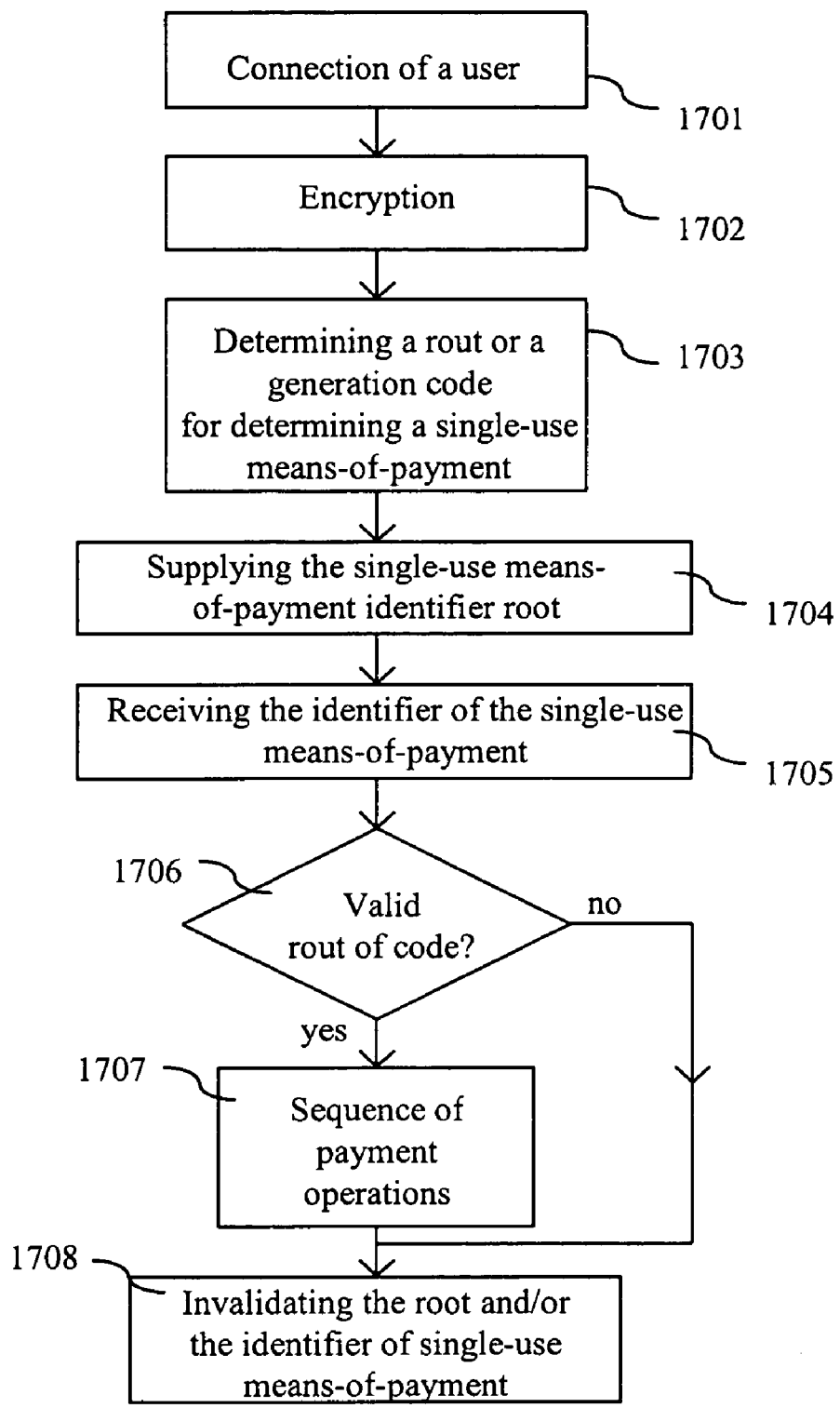
FIG. 17 represents functions implemented in various computer systems linked to a communications network in the course of a third example of a succession of operations implemented in accordance with the fourth aspect of the method envisaged by the present invention.

FIG. 17 represents functions implemented in various computer systems linked to a communications network in the course of a third example of a succession of operations implemented in accordance with the fourth aspect of the method envisaged by the present invention, in the case in which the user is not referenced with the financial site. It will be observed in FIG. 17 that the operations 1701, 1702 are identical to operations 901 and 902. Following operation 1702, in the course of operation 1703, the financial site determines a root or a calculation code and, in the course of an operation 1704, the financial site supplies this root or this code to the terminal 100 so that the latter may determine the single-use means-of-payment identifier.

This code may be predetermined, being, for example, fixed for a predetermined duration, randomly take a value from among several possible values, or depend on information relating to the transaction, such as the name, the telephone number or the address of the user or the address of the retailing site on the communications network.

It will be observed that the code is preferably employed in the terminal 100 in such a way that a permanent means-of-payment identifier can be determined by knowing the root or code and the single-use means-of-payment identifier.

Once the session between the financial site and the terminal 100 is completed, the terminal 100 uses the root or code supplied by the financial site in the course of operation 1704 in order to determine a means-of-payment identifier according to known numerical techniques.

When, in the course of an operation 1705, the financial site receives a means-of-payment identifier, it also receives information relating to the transaction. The financial site can thus determine the generator code or the root which it has supplied in the course of operation 1704, even if this code depends on information relating to the transaction.

In the course of a test 1706, the financial site determines whether this code is valid and whether the permanent-use means-of-payment identifier is valid. If the two are valid, operation 1707 is carried out. Otherwise operation 1708 is carried out.

Operations 1707 and 1708 correspond to the operations 910 and 911.

According to a variant, not represented, the expiry date relating to the single-use means-of-payment identifier makes it possible to identify a generator code or a root.

FIG. 16 represents a flowchart for operation of the device illustrated in FIG. 1, for implementing the fifth aspect of the present invention. This aspect may or may not be combined with certain other aspects of the present invention.

In the course of an operation 1601, the user of the terminal 100 determines a date at which he considers he would be satisfied to have been supplied the product or service which he has paid for on the communications network 120.

Next, the central processing unit 106, implementing the assistance software, looks out for the arrival of the selected date, in the course of an operation 1602, which may extend, as a background task, over several days. When the date arrives, in the course of an operation 1603, the central processing unit 106 causes a dialogue window to be displayed on the visual-display screen 104, asking whether the product or service has actually been supplied.

Whether the response is positive or negative, another question asks the user for the degree of satisfaction or dissatisfaction he feels regarding the supply of the product or service supplied, in the course of an operation 1604. Moreover, when the response is negative, a new date is requested from the user and the process is renewed.

The satisfaction information and any new date are placed in memory 102 by the terminal 100, in the course of an operation 1605.

When, in the course of an operation 1606, the terminal 100 is connected to the network 120, and whatever the site to which the terminal is connected, a satisfaction message including the identifier of the merchant site and the degree of satisfaction of the user, as well as the delivery timescale, is automatically transmitted to the protection site 170 in the course of an operation 1607. This message may take the form of electronic mail ("e-mail"), or any other form recognized by the protection site 170.

By virtue of this message, the protection site 170 can determine the merchant sites which it can recommend to its visitors.

Figure 10:
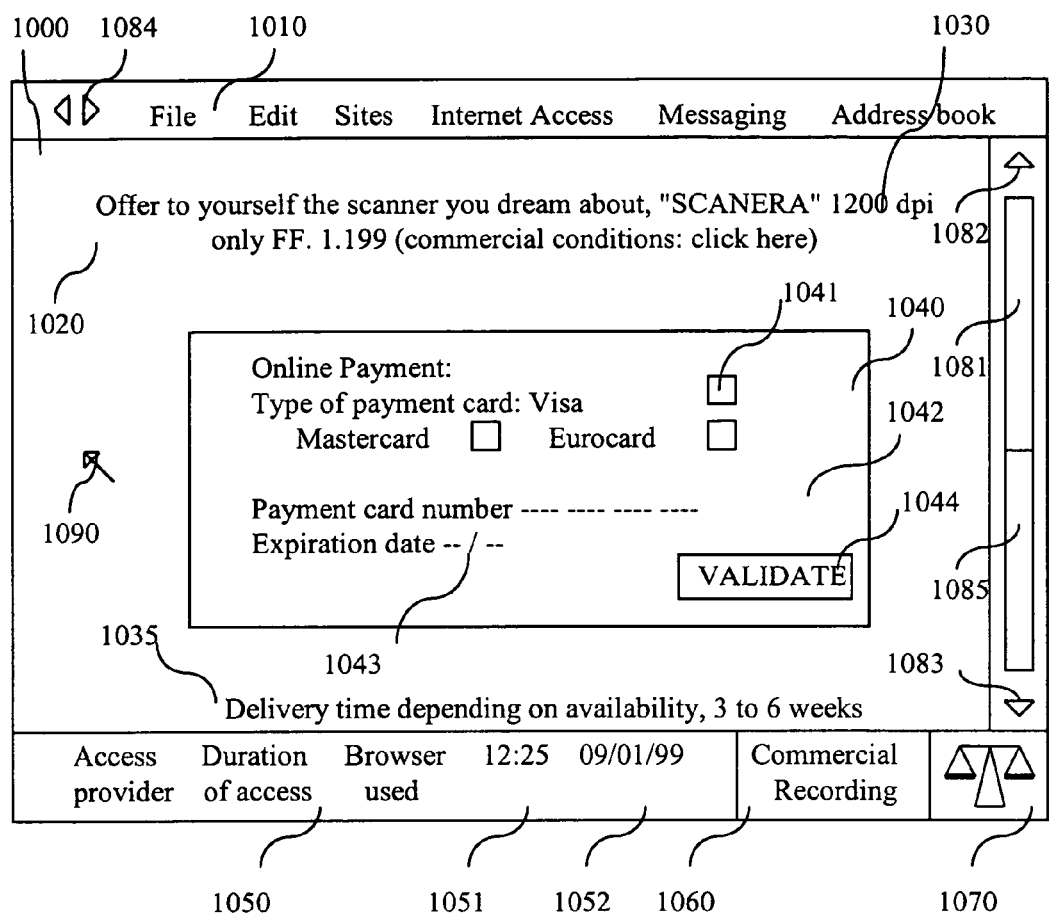
FIG. 10 represents a visual-display screen in the course of the implementation of another embodiment of the method which is the subject of the present invention.

FIG. 10 represents what is displayed by the visual-display screen 104 when the user of the terminal 100 has selected a sales offer from the remote data site 150 and when this user is ready to make on-line payment, by supplying information relating to a payment card such as the number and the expiry date of the payment card.

In a simplified way, the visual-display screen 104 then displays:

a main portion 1000 which represents a portion of a page received originating from the remote data site 150;

an upper bar 1010 which displays, and makes it possible to select, scrolling menus or functions;

a lower bar 1050 which displays general information and function-selection areas and a side bar 1080 which makes it possible to scroll the page displayed in the main portion 1000.

In the example illustrated in FIG. 10, the main portion 1000, in the course of the phase of the transaction which corresponds to the start of an on-line payment, includes:

a portion of a received page originating from the remote data site 150 including textual information on a sales offer 1020, possibly graphics or image information (not represented), and is associated with an audio sequence (not represented);

information 1030 for selection of at least one other page of the remote data site 150;

terms of business 1035;

a moveable icon 1090 representing the position selected by the mouse 103 and a central portion for on-line payment 1040.

The central portion 1040 includes, for example, boxes 1041 for selecting a type of payment card, an area 1042 for writing a payment-card number, an area 1043 for writing a month of expiry of the duration of validity of the payment card and an area 1044 for confirming the input of the information relating to the electronic on-line payment and the transaction.

The upper bar 1010 displays two lateral arrows 1084 which, when one of them is selected by the use of the mouse 103, makes it possible to return to the previously displayed page in the central portion 1000 (arrow pointing to left) or to move forward to the page displayed after the page being displayed in the central portion 1000 (arrow turned to the right) according to the conventions known in the Internet browser software. The upper bar 1010 also displays headers of scrolling menus which are well known in the browser software, such as:

"file", in order to create, open, save, print or close a file,

"edit", in order to select, cut or paste information,

"Internet access", in order to search for an Internet site or to connect to it using its address, "messaging" in order to gain access to his personal messaging service, and "favorite sites", in order to directly access Internet sites previously selected as favorite sites.

The use of the mouse 103 makes it possible to select one of the functions or one of the scrolling menus illustrated (sometimes in the form of icons) in the upper bar 1010.

The side bar 1080 includes:

an upper arrow 1082 turned upwards, selection of which causes scrolling of the page illustrated in the main portion 1000, upwards, so as to display the upper part of it, a lower arrow 1083 turned downwards, selection of which causes scrolling of the page illustrated in the main portion 1000, downwards, in order to display its upper part, a portion 1081 which, in combination with a portion 1085, represents the proportion of the page illustrated in the main portion 1000 which is displayed and a portion 1085 which, with the same proportionality factor as the portion 1081, represents the lower part of the page illustrated in the main part 1000 which is not visible.

The bottom strip 1050 displays general information, such as the name of the access provider, the duration of the connection to the access provider already expired, the browser used (for example one of the trademarks Netscape, Microsoft or AOL), and the function-selection areas. Here, two function-selection areas 1060 and 1070 trigger backing-up of at least one item of content information of at least the portions of the pages of the remote data site 150 which have been received from the remote data site 150 and displayed on the visual-display screen 104.

The area 1060 displays the back-up function, in clear, in the form of two words: "business back-up". The area 1070 displays the back-up function, in the form of an icon representing scales, the symbol of justice. According to some variants of the present invention: only the portions which have been displayed, only content or context information, such as the name of the provider and the date of the transaction, only certain words present in or representative of these portions or the sound file received and distributed, only the texts present in these pages, the texts and the images, the entire pages, the sound file, the information on movements within the pages being displayed, and/or the duration of display of each portion of the page on the visual-display screen 104, are placed in non-volatile memory, for example the memory 102, by triggering of the back-up function relating to the two function-selection areas 1060 and 1070.

Figure 11:
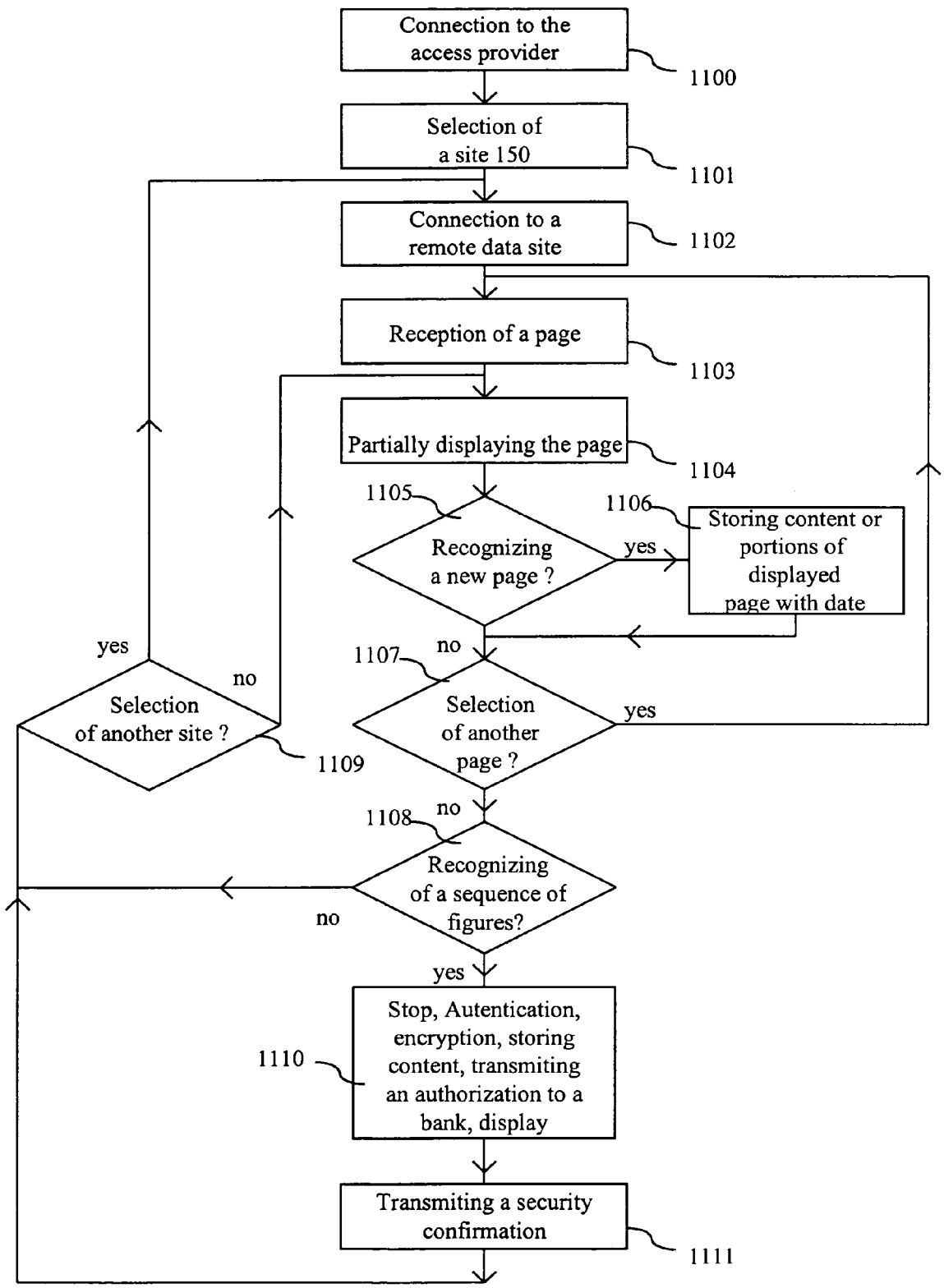
FIG. 11 represents a flowchart of the operation of the device illustrated in FIG. 1, according to the embodiment of the method which is the subject of the present invention illustrated in FIG. 10.
Figure 12:
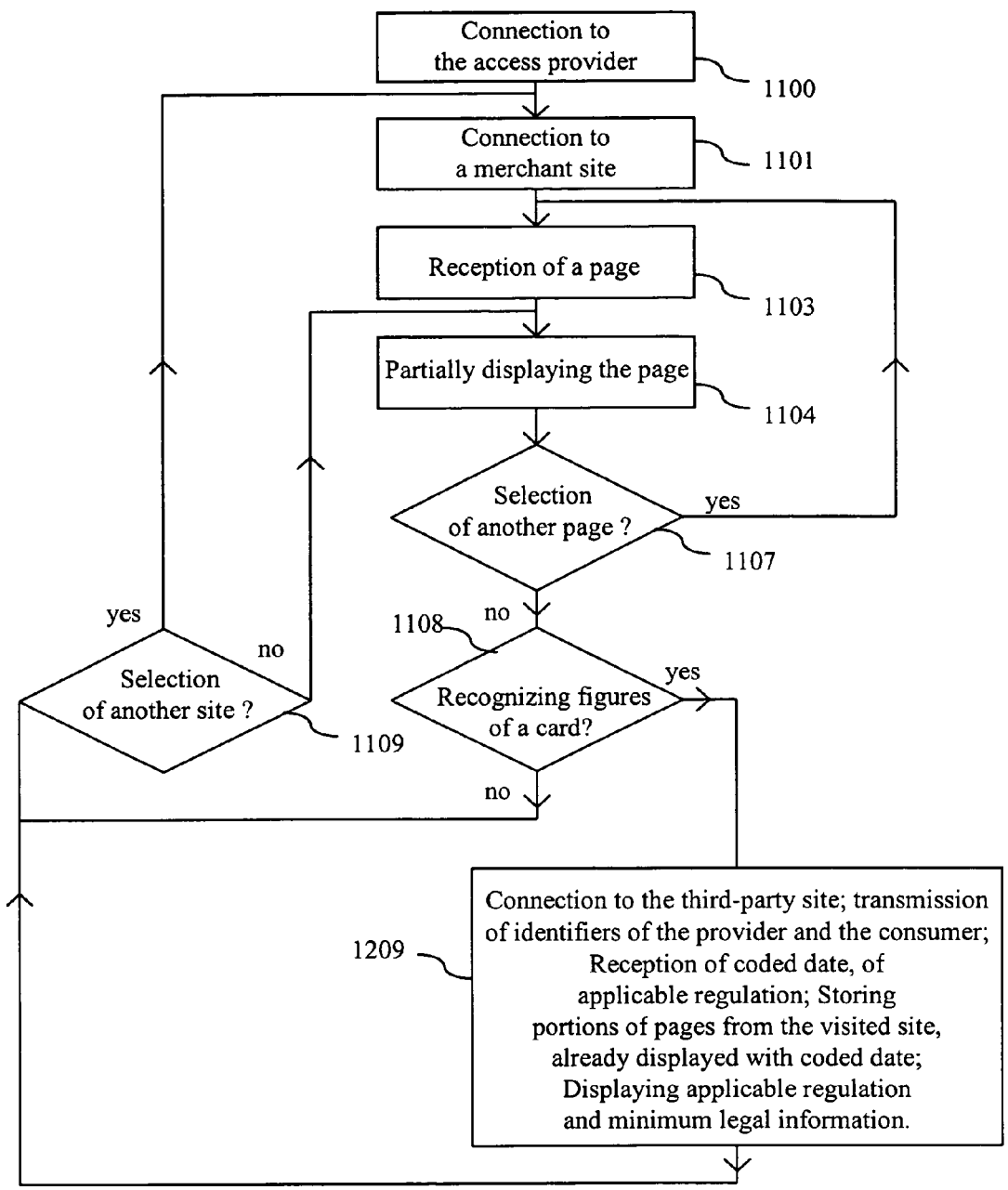
FIG. 12 represents a flowchart of the operation of the device illustrated in FIG. 1, according to another embodiment of the method which is the subject of the present invention.

This function and/or other security-protection functions are also triggered automatically by detection of preparation for payment by transmitting a payment-means identifier in the course of the communications session with the remote data site 150, via the terminal 100, as set out in regard to operation 307, with respect to FIGS. 11 and 12.

According to one aspect of the invention, and in a general way, the user first of all starts up a computer terminal and accesses a remote data site, via a communications network.

The terminal then opens the communications session with the remote data site and, from the data site, receives a transaction offer. The terminal or a computer system through which passes the data exchanged between the terminal and the remote data site in the course of the communications session determine, as a background task, whether a payment is being prepared in the course of the session and by means of the terminal, for example by recognizing an identifier of a payment card.

If such is the case, the terminal or the computer system carries out an operation of security protection against abusive use of the contractual consent of the user of the terminal. This security-protection operation includes at least one operation of backing-up the amount of the payment, for example, by carrying out at least one of the following operations:

creation of a back-up file and placing in memory at least some of the data in the "texts" format exchanged in the course of the communications session between the terminal and the data site;

compilation of an encrypted message representative of at least the amount of the transaction and, preferably, of an identifier of the provider, and transmission of this message to a confidence third party such as, for example, a data site of a bank by whom the payment has to be made; and printing of a trace of the transaction, including at least the date, the amount of the transaction and, preferably, the name of the provider and an integrity code (and, when available, the completed questionnaire mentioned above); and display of a questionnaire which the user completes, if he wishes, so as to keep track of the transaction, and saving the content of this questionnaire if it has been at least partially filled in.

Moreover, the security protection operation may include one of the following operations:

authentication of the payer, for example by displaying a request for a secret code then verification of the secret code;

display of legal data;

printing of details of the payment already made on line with the card in question.

transmission to the data site with which the transaction is in progress, of information representative of the security protection of the transaction, such as, for example, a single-use transaction certificate which has to be associated with the request for payment so that the banking organization which makes the payments relating to the card may pay the supplier.

More particularly, in the course of a mode of operation of the device illustrated in FIG. 1, the user starts up the terminal 100 and, via the modem 101 and the network 120, accesses an Internet-access provider 130.

Next, the user, via the terminal 100, selects a remote data site 150, for example by pointing with the mouse 103 to:

an identifier of a site in the "favorite sites" scrolling menu, a link with a site on the access provider's access gateway, or the "Internet access" scrolling menu, and by selecting an Internet page address or Internet site address, starting, for example, with the letters "http" or "www".

The terminal 100 then enters into communication and opens a communications session with the remote data site 150 selected, and sends it transaction security-protection information. This information is a specific sequence of symbols which indicates that any communication and/or transaction is security protected according to one embodiment of the method envisaged by the present invention. Next, the terminal 100 receives an Internet page, for example a welcome page, from the remote data site 150. The terminal 100 causes at least partial display of the received page. The user can then move this page so as to get to know it, more or less completely.

Next, the central processing unit 106 determines whether the page received is or is not already held on the hard disk 102. If not, the central processing unit 106 causes at least one item of address information of the received page and, if appropriate, content information, such as the set of data received in the "text" format for the page in question, to be stored on the hard disk 102. Next, or if the page received is already held on the hard disk 102, the central processing unit 106 determines whether the user has selected another page, for example by selecting a link with another page, such as the link 230.

If the user has selected another page, and if the selected page has not already been received in the course of the same communications session between the terminal 110 and the remote data site 150, the operation of the terminal 100 already set out above is reproduced, but each previously received page is at least partly (for example the address of the page and/or the "text" data of this page) kept in cache memory 108. Otherwise, the central processing unit 106 determines whether a predetermined number of figures (for example four figures) input successively correspond to a sequence of figures of a payment card held in memory.

It will be observed here that, for example during the installation of the software which enables the application represented here, the first four figures of the user's payment cards are requested from him and are placed in memory 102. Next, as a background task, each sequence of four figures input by the keyboard is compared with the first four figures of the payment cards held in non-volatile memory 102.

If no sequence is recognized, the central processing unit 106 determines whether another site has been selected by the user, for example as set out above or by selecting a link between the site being visited and a new site, in the main area 200. If this is the case, whatever the terminal 100 has carried out as regards the current site is reproduced as regards the new site visited. If no other site has been selected, the displaying of the page and the following operations are reiterated.

When a sequence corresponding, for example, to the first four figures of a payment card number is recognized, the central processing unit 106 carries out an operation of security protection against abusive use of the contractual consent of the user of the terminal. This security protection operation includes at least one local or remote backing-up of the amount of the payment, for example, by carrying out at least one of the operations set out below:

the central processing unit 106 causes display of a window on the screen 104, the window including a questionnaire which the user completes, if he so wishes, in order to keep track of the transaction, the questionnaire relating, for example, to the provider, to the object or the service provided, to the amount of the transaction, to the delivery timescale, to the guarantee, to the guarantee claims period, to the conditions of reimbursement in the event of dissatisfaction (in order to fill in this questionnaire, the user can minimize the dimensions of the window displaying the questionnaire and browse the pages of the remote data site 150);

the central processing unit 106 creates a back-up file in the non-volatile memory 102, and records there at least the data in the "text" format of the portions of pages of the remote data site 150 which were transmitted in the course of the communications session with the remote data site 150. Preferably, this memory storage is combined with memory storage of the date. Preferably, an integrity code is inserted into the file and, in the course of subsequent reading, guarantees that the data which was recorded has not been altered since the file was created. The reader could, for example, draw on the marking techniques known as "watermarking" to implement this integrity-code function;

the central processing unit 106 compiles an encrypted message representative at least of the amount of the transaction and, preferably, of an identifier of the provider and this message is transmitted to a confidence third-party 180, for example, the data site of the bank by whom the payment has to be made; and/or the central processing unit 106 causes printing of the date, of the name of the provider and of the amount of the transaction, with an integrity code, and, when available, the completed questionnaire mentioned above.

Moreover, the central processing unit 106 may carry out one of the following operations:

the central processing unit 106 displays a request for a secret code (for example a personal identification number known by the name of PIN) in order to verify that the user who has input the sequence corresponding to the first four figures of a payment-card number is actually authorized to use this card, then verifies that this secret code corresponds to a code held in memory on the hard disk 102;

the central processing unit 106 displays a window including legal data (see FIG. 13); and the central processing unit 106 prints details of the payments already made on line with the card in question.

The central processing unit 106 then sends the remote data site 150 information representing the security protection of the transaction. This information is, for example, identical to the information already transmitted at the start of the communications session. In a variant, this security information is a single-use transaction certificate which has to be associated with the payment request so that the banking organization which is making the payments relating to the card pays the supplier. In a variant, this information is a duplicate of the questionnaire mentioned above, including the responses supplied by the user, so that a contractual electronic document is known to the two parties. Next, the central processing unit 106, as above, determines whether or not another site has been selected and, as above, carries on with the operating sequence, depending on the result of this determination. It will be observed that the end of the communications session, that is to say disconnection from the Internet site and disconnection from the access provider are carried out in a known way, in the course of the display of the last page received from the remote data site 150, and are not detailed here.

FIG. 11 represents a flowchart implementing an embodiment of the method which is the subject of the present invention. In the course of an operation 1100, access is gained to an Internet access provider.

In the course of an operation 1101, a remote data site is selected, for example by means:

of an identifier of a site in a scrolling menu, of a link with a site on the access provider's access gateway, or of an Internet page address or Internet site address, starting, for example, with the letters "http" or "www".

A communications session is then set up with this remote data site, in the course of an operation 1102, and transaction security-protection information is transmitted to the remote data site. This information is a specific sequence of symbols which indicates that any communication and/or transaction is security protected according to one embodiment of the method envisaged by the present invention. In the course of an operation 1103, an Internet page is received from the remote data site 150 which, in the course of the first iteration of the function 1103, is a home page. In the course of operation 1104, the page received in the course of operation 1103 is at least partly displayed.

In the course of a test 1105, it is determined whether or not the page received is already stored in memory locally. If the results of the test 1105 is negative, in the course of an operation 1106, at least one item of address information for the received page, and, if appropriate, content information, such as the set of data received in the "text" format for the page in question, are stored in memory. Following operation 1106, or when the result of test 1105 is positive, in the course of a test 1107, it is determined whether the user has selected another page, for example by selecting a link with another page.

When the result of test 1107 is positive and when the page selected has not already been received in the course of an operation 1103, operation 1103 is reiterated but each previously received page is, at least partly (for example the address of the page and/or the "text" data of this page), kept locally. When the result of test 1107 is negative, in the course of a test 1108, it is determined whether a predetermined number of figures (for example four figures) input successively correspond to a sequence of figures of a payment card.

For example, before the embodiment of the method set out here is implemented, the first four figures of the user's payment card are requested from him and are kept locally. In this example, in the course of operation 1108, for each input of a sequence of at least four successive figures, each sequence of four successive figures of the sequence is compared with the sequence of four figures kept locally.

When the result of test 1108 is negative, in the course of a test 1109, it is determined whether or not another site has been selected, for example in one of the ways set out with regard to operation 1102 or by selecting a link between the site being visited and a new site, in the page displayed. When the result of test 1109 is positive, operation 1102 is reiterated. When the result of test 1109 is negative, operation 1104 is reiterated.

When the result of test 1108 is positive, in the course of an operation 1110, an operation of security protection against abusive use of the contractual consent of the user is carried out by backing-up at least the amount of the payment. For example, operation 1100 includes at least one of the security protection operations set out above.

Following operation 1110, in the course of an operation 1111, information representative of the security protection of the transaction is sent to the remote data site with which the session was opened in the course of operation 1102. This information is, for example, identical to the information transmitted in the course of operation 1101. In a variant, this security information is a single-use transaction certificate which has to be associated with the payment request so that the banking organization which is making the payments relating to the card pays the supplier. In a variant, this information is a duplicate of the questionnaire mentioned above, including the responses supplied by the user, so that a contractual electronic document is known to the two parties. Following operation 1111, test 1109 is carried out. It will be observed that disconnection from the Internet site and disconnection from the access provider are carried out in a known way in the course of operation 1104, and are therefore not detailed here.

When the embodiment of the method illustrated in FIG. 11 is implemented by the embodiment of the device illustrated in FIGS. 1 and 10, in the course of an operation 1100, the user starts up the terminal 100 and, via the modem 101 and the network 120, accesses the Internet-access provider 130.

In the course of operation 1101 the user, via the terminal 100, selects a remote data site 150, for example by pointing, with the mouse 103 to:

an identifier of a site in the scrolling "favorite sites" menu, a link with a site on the access provider's access gateway, or the scrolling "Internet access" menu, and by selecting an Internet page address or Internet site address, starting, for example, with the letters "http" or "www".

The terminal 100 then enters into communication with the selected remote data site 150, in the course of operation 1102, and sends it transaction security-protection information. This information is a specific sequence of symbols which indicates that any communication and/or transaction is security protected according to one embodiment of the method envisaged by the present invention. In the course of operation 1103, the terminal 100 receives, from the remote data site 150, an Internet page which, in the course of the first iteration of the function 1103, is a home page. In the course of operation 1104, the terminal 100 causes at least partial display of the page received in the course of operation 1103. In the course of operation 1104, the user can shift this page so as to get to know it, more or less completely, using the mouse 103 and one of the arrows 1082 and 1083.

In the course of test 1105, the central processing unit 1106 determines whether or not the page received is already held on the hard disk 102. If the result of the test 1105 is negative, in the course of an operation 1106, the central processing unit 106 causes at least address information of the received page to be stored in memory, and, if appropriate, content information, such as the set of data received in the "text" format for the page in question, on the hard disk 102.

Following operation 1106 or when the result of test 1105 is positive, in the course of test 1107, the central processing unit 106 determines whether the user has selected another page, for example by selecting a link with another page, such as the link 230.

When the result of the test 1107 is positive and when the page selected has not already been received in the course of an operation 1103, operation 1103 is reiterated but each page previously received is at least partly (for example the address of the page and/or the "text" data of this page) held in cache memory 108. When the result of test 1107 is negative, in the course of test 1108, the central processing unit 106 determines whether a predetermined number of figures (for example four figures) input successively correspond to a sequence of figures of a payment card.

When the result of test 1108 is negative, in the course of test 1109, the central processing unit 106 determines whether or not another site has been selected by the user, for example in one of the ways set out with regard to operation 1102 or by selecting a link between the site being visited and a new site, in the main area 1000. When the result of test 1109 is positive, operation 1102 is reiterated. When the result of test 1109 is negative, operation 1104 is reiterated.

When the result of test 1108 is positive, in the course of operation 1110, the central processing unit 106 carries out an operation of security protection against abusive use of the contractual consent of the user of the terminal 100 by backing-up at least the amount of the payment. This security-protection operation includes, for example, at least one of the operations set out above. For example, operation 1110 includes at least one of the following protection operations:

the central processing unit 106 creates a back-up file in the non-volatile memory 102, and records there at least the data in the "text" format of the portions of pages of the remote data site 150 which have been transmitted since the operation 1102 of connection to this remote data site 150. Preferably, this memory storage is combined with memory storage of the date. Preferably, in the course of operation 1109, an integrity code is inserted into the file and, in the course of subsequent reading, guarantees that the data which was recorded has not been altered since the file was created. The reader could, for example, draw on the marking techniques known as "watermarking" to implement this integrity-code function;

the central processing unit 106 displays a window including a questionnaire which the user completes, if he so wishes, in order to keep track of the transaction, the questionnaire relating, for example, to the provider, to the object or the service provided, to the amount of the transaction, to the delivery timescale, to the guarantee, to the guarantee claims period, to the conditions of reimbursement in the event of dissatisfaction (in order to fill in this questionnaire, the user can minimize the dimensions of the window displaying the questionnaire and browse the pages of the remote data site 150);

the central processing unit 106 compiles an encrypted message representative at least of the amount of the transaction and, preferably, of an identifier of the supplier and this message is transmitted to a confidence third-party 180, for example, the data site of the bank by whom the payment has to be made; and/or the central processing unit 106 causes printing of the date, of the name of the provider and of the amount of the transaction, with an integrity code, and, when available, the completed questionnaire mentioned above.

Moreover, this security-protection operation includes one of the following operations:

the central processing unit 106 displays a request for a secret code (for example a personal identification number known by the name of PIN) in order to verify that the user who has input the sequence recognized in the course of test 1108 is actually authorized to do so, then verifies that this secret code corresponds to a code held in memory on the hard disk 102;

the central processing unit 106 displays a window including legal data (see FIG. 13); and the central processing unit 106 prints details of the payments already made on line with the card in question.

Following operation 1110, in the course of an operation 1111, information representative of the security protection of the transaction is sent to the remote data site 150. This information is, for example, identical to the information transmitted in the course of operation 1101. In a variant, this security information is a single-use transaction certificate which has to be associated with the payment request so that the banking organization which is making the payments relating to the card pays the supplier. In a variant, this information is a duplicate of the questionnaire mentioned above, including the responses supplied by the user, so that a contractual electronic document is known to the two parties. Following operation 1111, test 1109 is carried out. It will be observed that the disconnection from the Internet site and disconnection from the access provider are carried out in a known way, in the course of operation 1104, and are not detailed here.

According to a variant, not represented, test 1108 and operations 1109 and 1110 are carried out by a computer system through which passes the data exchanged in the course of the communications session or the data sent by the terminal 100 to the remote data site 150. For example, the Internet-access provider's computer system 130 can carry out this test 1108 and these operations 1109 and 1110 on behalf of its customers.

According to another aspect of the method envisaged by the present invention, the security protection operation includes:

a connection to a third-party site, delivery, to the third-party site, of an identifier of the site with which the transaction is in progress (for example its Internet address), an identifier of the user (for example his Internet address), and the amount of the payment, a delivery, by the third-party site, of coded information which is representative of the date and, preferably, of at least one of the identifiers indicated above according to a confidential coding function, creation of a back-up file holding at least the portions in "text" mode of the portions of pages transmitted by the remote data site with which the transaction is in progress, as well as the coded information received from the third-party site. An integrity code is preferably inserted into the file and guarantees that the data which has been recorded has not been altered since the file was created, a delivery, by the third-party site, of information relating to the law applicable to the commercial transaction in progress and of the minimum legal information relating to this law, for example the legal guarantee period and the legal period for guarantee claims to the supplier, and a display of legal information.

According to one variant, at least a part of the identifier of a means of payment, for example figures of the payment card or a predetermined rule complied with by this part of the identifier, for example a sum of the figures, are transmitted to the third-party protection site 170 and serve to calculate the coded information.

Communication with the third-party protection site 170 is preferably encrypted or security protected, according to known techniques.

Figure 13:
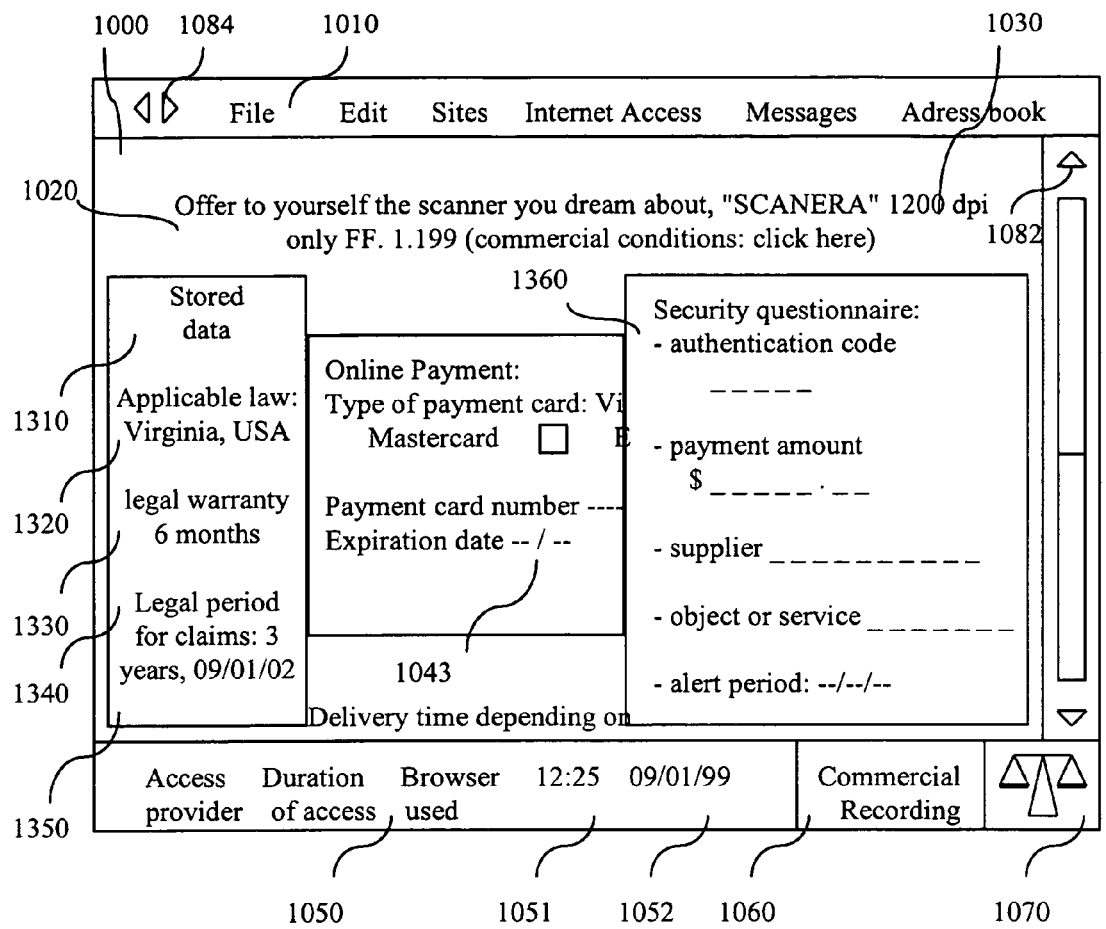
FIG. 13 represents a visual-display screen in the course of a re-reading operation of the flowchart illustrated in FIG. 12.

According to another aspect of the present invention, the device illustrated in FIG. 1 and, more particularly, the central processing unit 106 implement the operations set out above, except that the central processing unit 106 carries out a security-protection operation in the course of which:

the terminal 100 is connected, via the network 140, to the third-party protection site 170, the terminal 100 supplies the third-party protection site 170 with an identifier of the remote data site 150 (for example its Internet address), an identifier of the user (for example his Internet address), and the transaction amount, the third-party protection site 170 supplies coded information which is representative of the date and, preferably, of at least one of the identifiers indicated above according to a confidential coding function, the terminal 100 creates a back-up file in the non-volatile memory 102, and records there at least the text parts of the portions of pages from the remote data site 150 which have been transmitted since the operation 302, as well as the coded information received from the third-party protection site 170. An integrity code is preferably inserted into the file and guarantees that the data which has been recorded has not been altered since the file was created.

the third-party protection site 170 supplies the terminal 100 with information relating to the law applicable to the commercial transaction in progress, and with the minimum legal information relating to this law, for example the legal guarantee period and the legal period for guarantee claims to the supplier, and the terminal 100 causes the legal information to be displayed (see FIG. 13).

According to one variant, at least a part of an identifier of a means of payment, or a relation which it complies with, for example the result of the sum of the figures, is transmitted to the third-party protection site 170 and serves to calculate the coded information.

Communication between the terminal 100 and the third-party protection site 170 is preferably encrypted or security protected, according to known techniques.

FIG. 12 represents a flowchart of operations and tests of a second embodiment of the method which is the subject of the present invention. This flowchart includes the functions and tests 1101 to 1104 and 1107 to 1109 of the flowchart illustrated in FIG. 11. However, by comparison with the flowchart illustrated in FIG. 11, operations 1110 and 1111 are replaced by an operation 1209, in the course of which:

the terminal 100 is connected, via the network 140, to the third-party protection site 170;

the terminal 100 supplies the third-party protection site 170 with an identifier of the remote data site 150 (for example its Internet address), an identifier of the user (for example his Internet address), and an amount of the payment;

the third-party protection site 170 supplies coded information which is representative of the date and, preferably, of the identifiers indicated above according to a confidential coding function;

the terminal 100 creates a backup file in its non-volatile memory 102, and records there at least the text parts of the portions of pages from the remote data site 150 which have been transmitted since operation 1102, as well as the coded information received from the third-party protection site 170. In the course of operation 1109, an integrity code is preferably inserted into the file and guarantees that the data which was recorded has not been altered since the file was created;

the third-party protection site 170 supplies the terminal 100 with information relating to the law applicable to the business transaction in progress, and with the minimum legal information relating to this law, for example the legal guarantee period and the legal period for claims to the supplier and the terminal 100 causes the legal information to be displayed (see FIG. 13).

According to one variant, at least a part of the figures of the payment card which are held in memory 102, or a relationship between them, for example the sum, are transmitted to the third-party protection site 170 and serve to calculate the coded information.

Communication between the terminal 100 and the third-party protection site 170 is preferably encrypted or security protected, according to known techniques.

According to a variant, not represented, the third-party protection site 170 creates a back-up file in its own memory (not represented) and records there the information received from the terminal 100. An integrity code is preferably inserted into the file and guarantees that the data which has been recorded has not been altered since the file was created.

FIG. 13 represents a visual-display screen in the course of the implementation of the second embodiment of the method which is the subject of the present invention, following operation 1109.

The visual-display screen 104 presents the same elements as those illustrated in FIG. 10, on which are superimposed, in the main portion 1000, a supplementary-information window 1350 and a questionnaire window 1360. The supplementary-information window 1350 includes an indication 1310 indicating that the data relating to the transaction has been recorded, information on the law applicable to the transaction, 1320, basic legal information 1330 and 1340 including, in particular, information on the duration of the legal guarantee 1330 and information on the maximum legal period for claims relating to the transaction 1340.

The questionnaire window 1360 includes help texts allowing the user to fill in the areas intended to specify data relating to the transaction in hand. In the example described and represented, the following particulars are requested from the user:

an authentication code, which makes it possible to authenticate the user of the payment card;

a payment amount;

the name of the supplier;

the object or the service obtained in exchange for the payment;

an alert period which corresponds to a reasonable date when the user wishes to see a message on the screen 104, for example upon starting up his terminal, a message which serves for him to verify whether the supplier's obligations have actually been honored.

The responses to this questionnaire are placed in memory, locally and/or by way of a confidence third party and, if appropriate, are transmitted (except for the alert period) to the remote data site 150.

In another embodiment, some or all of these particulars are automatically extracted from the information available in the pages received from the remote data site 150.

According to a variant, not represented, the page supplied by the remote data site 150 includes, coded or uncoded, information representative of the date of the transaction or a session number and this information is stored in memory in the course of the security-protection operation.

According to other variants, the information stored in memory in the course of one of the operations 1109 or 1209 is representative of text information of at least a portion of at least one page supplied by the remote data site 150, a portion which has been displayed by the screen 104, or of one or more of the following items of information:

the text information from the other portions of the said pages, the text information from the other pages displayed by the visual-display screen 104 and supplied by the remote data site 150, non-text information (graphics and images) from the said displayed portions, non-text information from at least two pages supplied by the remote data site 150 and displayed by the visual-display screen 104, non-text information from the other pages supplied by the remote data site 150, context information, date, time, other sites previously visited, etc.

The security-protection operation may also include a display of information concerning the intellectual property relating to the transaction in progress, closure of the session, transmission of a short message on the telecommunications network, such as a telephony network, for example a mobile one, or a pager network, to a communications terminal of the user, a message summarizing the main information of the transaction in progress, a data-transfer operation (date, amount of the payment, supplier) to accounting software, personal or professional.

One embodiment of the software which implements the method which is the subject of the present invention may, in its computer code, include part of a means-of-payment identifier, so that this software is associated with the payment card. Hence, the software can be supplied by the financial organization which has supplied the payment card to the user, or the software may be sold on the communications network, while preventing an illegal copy of this software being used with another payment card. In this latter case, detection of a means of payment other than that which is associated with the software may cause a message to be displayed inviting the user to acquire a version of the software associated with the means of payment which he is attempting to use. When a commission is payable for security protecting data or with a confidence third party, the software may also give rise to payment in order to pay this commission.

The security-protection operation may also include the generation of a transaction certificate, employing a confidence third party according to known techniques. For example, detection of the payment may cause the sending, by a confidence third party, of a transaction identifier which is transmitted to one or other of the parties to the transaction in progress (for example the customer), which is then retransmitted between the parties (for example to the supplier) before being used in order to obtain the payment.

The method of the invention may also be implemented in software including a function of supplying a payment authorization and, automatically, a means-of-payment identifier. Thus, this software includes security protection in accordance with what is set out above. In this case, however, this software, in accordance with the present invention, operates as a background task with respect to the communications session between the terminal and the remote data site.

It will be observed that the information stored in memory in the course of the security-protection operation may be limited to the amount of the transaction and to a date, or to these elements and an identifier of the supplier, or to a single page received from the remote data site 150 (for example the payment page, which should legally, in due course, summarize the contractual information).

The way in which the information recorded in the course of one of the security-protection operations set out above is re-read and made available to the user, to a lawyer or to legal authorities, is well known to the person skilled in the art is therefore not detailed here. This data preferably cannot be altered without the fact being noticed.

Figure 14:
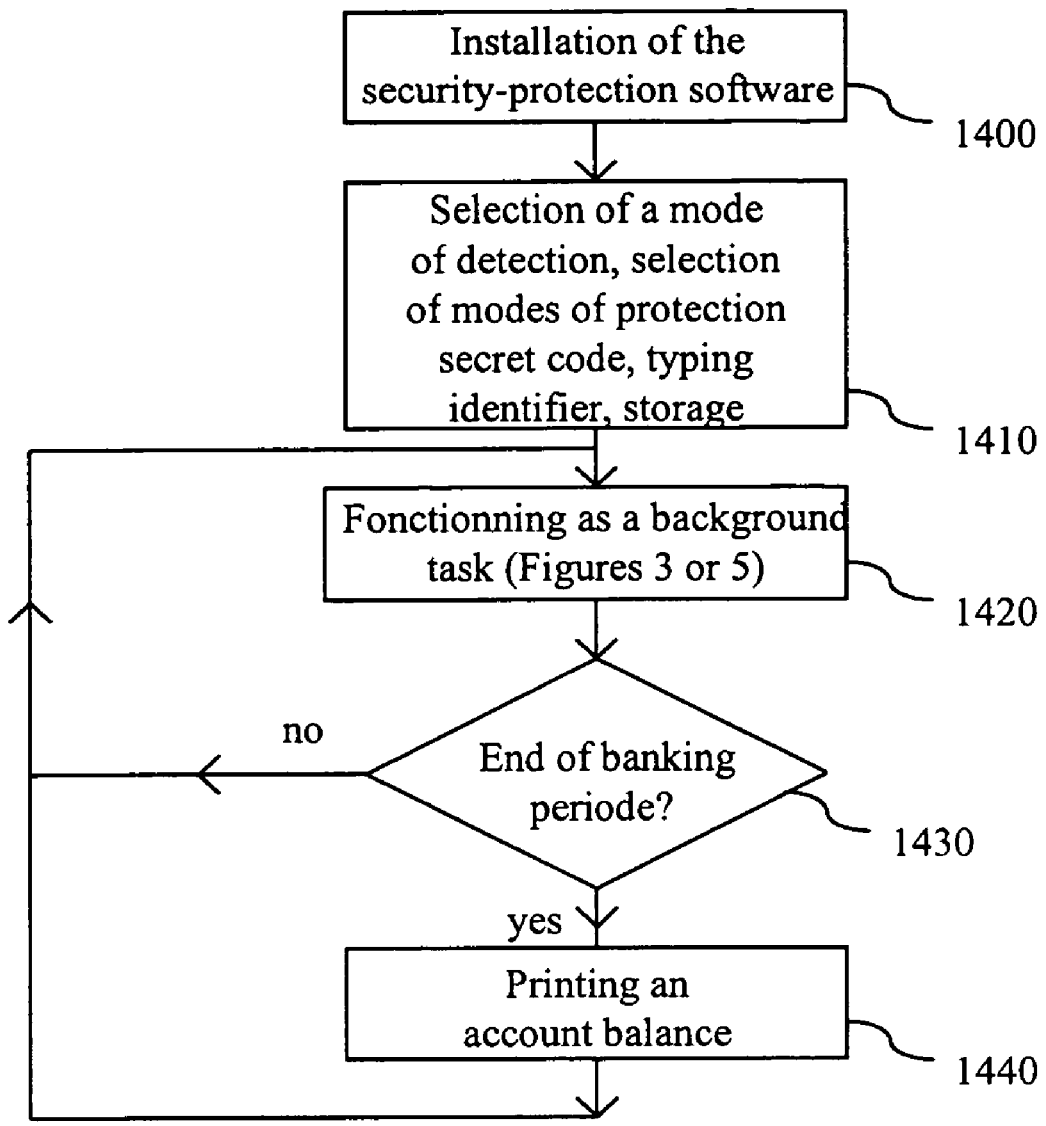
FIG. 14 represents a flowchart of the operation of each of the embodiments illustrated in FIGS. 11 and 12.

The operations carried out for implementing the method envisaged by the present invention as illustrated in FIGS. 1 to 13 and 15 are represented in FIG. 14.

In the course of an operation 1400, the software implementing the method envisaged by the present invention is installed.

In the course of operation 1410, the user selects a method of detecting preparation for payment. For example, the user gives the first four numbers of a payment card or selects any other quadruplet of sequences of four figures or a function of payment software or the selection of an icon dedicated to the payment (not represented) will be detected as preparation for an on-line payment.

In the course of operation 1410, the user also selects the functions of a security-protection operation, from among those which are set out above. The security-protection operation includes at least one operation of backing up the amount of the payment. The user can also choose a secret code, if he wishes to be authenticated upon each on-line payment. The user may also choose a confidence third party and a financial organization. The user also designates one or more browsers on a data communications network such as the Internet. The operating mode selected by the user is placed in memory.

In the course of an operation 1420, every time the terminal 100 is started up or every time one of the browsers designated in the course of operation 1410 is run, the payment-detection function and, in the event of detection, the security-protection function, are started up as a background task. Methods of implementing operation 1420 are described with regard to FIGS. 11 and 12.

In the course of a test 1430, it is detected whether a banking period, for example the invoicing period for the use of a payment card, has or has not expired. If the result of the test 1430 is negative, operation 1420 is reiterated. If the result of the test 1430 is positive, all the purchases made in the course of the banking period in question are displayed and/or printed out in the course of an operation 1440, then operation 1420 is reiterated.

It will be observed that the detection of the preparation for payment may consist of a detection of a payment, for example by detection of transmission, on the bus 109, of information relating to a means of payment or by detection of the starting-up of software or of a payment or accounting routine.

Figure 15:
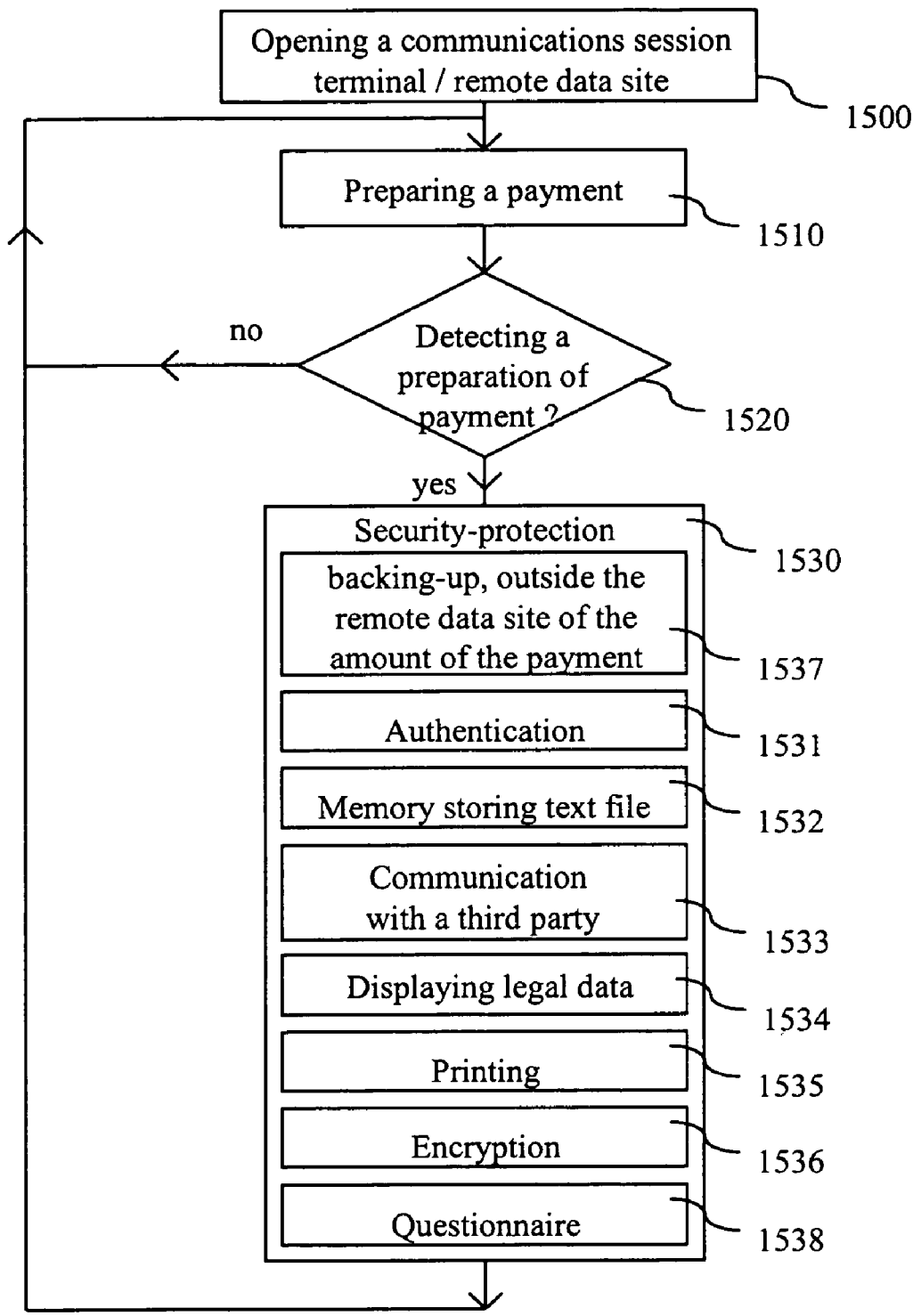
FIG. 15 represents a flowchart of the operation of a particular aspect of the present invention.

According to one of its aspects, illustrated in FIG. 15, the method which is the subject of the present invention automatically detects (operation 1520), in the course of a communications session (opened in the course of an operation 1500) between a user's computer terminal and the data site, on a network such as the Internet, that the user is preparing a payment by transmission, in the course of the session and via his terminal, of a means-of-payment identifier (operation 1510). For example, this detection is performed by recognizing, among the figures input by means of a keyboard of the terminal, all or part of a payment or credit-card number (and/or of a date of expiry of such a card, and/or of a bank account number and/or of a transaction-certificate request). When this preparation for payment is detected, an operation 1540 of security protection of the said payment is started.

This security-protection operation 1530 (i.e., for example, for protection against abusive use of the consent of the user relating to the said payment) includes at least one operation 1537 for backing-up, outside the remote data site, of the amount of the payment. The backing-up operation may be carried out by storing this amount in memory, printing it out or sending it away. The operation 1530 may, moreover, for example, include authentication of the user 1531, memory storage of the data exchanged with a "text" format in the course of the session 1532, a communication to a confidence third party, such as a bank by whom the payment has to be made, of data relating to the payment (amount, supplier) 1533, a display of legal data 1534, the printing of information relating to the transaction or of a detail of the payments already made on-line 1535, encryption of the confidential data transmission 1536, display of a questionnaire with a view to it being filled in, 1538.

This allows the user to have at least legal protection, since a record of the contractual agreement exists, and financial protection since the payment is limited to the agreed amount.

The majority of the various aspects of the present invention may be combined in order to implement a method and a device for assistance to a user of a communications network.

It will be observed that the information supplied by the protection site 170 to the terminal 100 may depend on the geographical locations of, on the one hand, the site 150 and, on the other hand, the terminal 100. For example, the laws applicable to a transaction may depend on these two pieces of geographical information.

Depending on the geographical location of the terminal 100, which its user can supply at the moment of the acquisition or of the installation of the assistance software, the offer or the advertising of a local trader close to the terminal 100 can be supplied to this terminal.

It will be observed that the confidential information or "information to be protected" may include any electronic signature, the assistance software detecting the use of a routine or of signature software resident on the terminal 100, or of a form of information received from the network 120 and representative of the use of a signature or of a particular form of sequences of symbols of an electronic signature, of a root of an electronic signature or of access to an electronic signature function.

The memory-stored data preferably identifies that data which has been displayed on the screen 104 and, if appropriate, the duration of its display.

In a variant, the payment is security protected by replacing the payment-card number by a check number which the supplier site 150 can have drawn on the user's account of that of the protection third party or of a third party providing the payment. According to this variant, the protection third party 170 preferably requests confirmation, authentication or a signature from the user, sends the site 150 confirmation of the order for payment by the said check, specifying the check number, the name of the supplier and the amount of the check. Payment is then not made until the delivery of the goods sold has actually been made, as appropriate. This variant possesses the advantage of having the money subsequestered until delivery, guaranteeing the supplier that he will be paid and of avoiding a payment-card number circulating on a network such as the Internet. It will be observed, in this case, that it is not indispensable for the third-party protection site 170 to supply a root for the check number.

Figure 18:
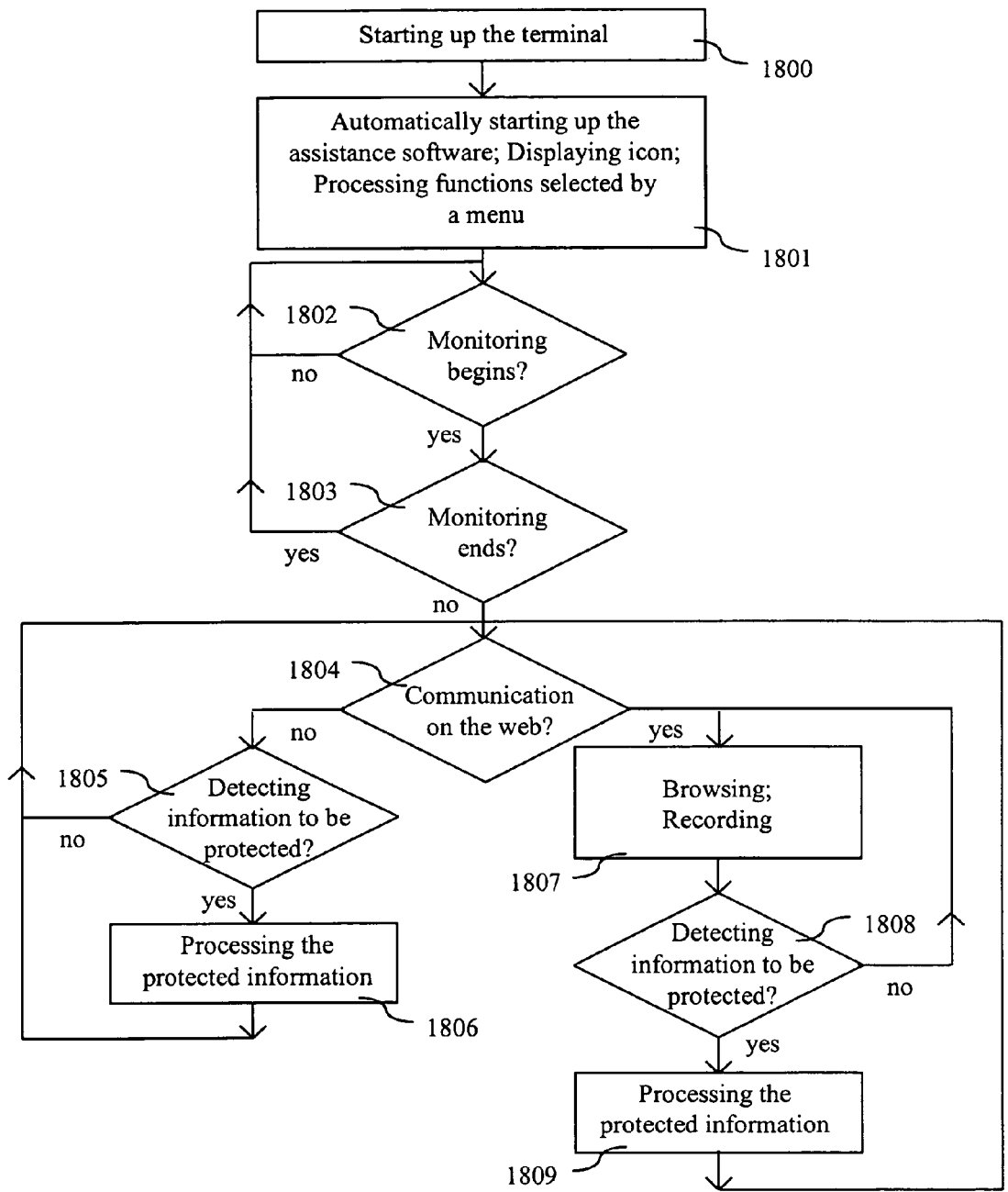
FIG. 18 represents another embodiment of the present invention, in connection with the device embodiment illustrated in FIG. 1.

In the embodiment illustrated in FIG. 18, following an operation 1800 of starting up the terminal 100, in the course of operation 1801, the assistance software is automatically started up and causes the visual-display screen 104 to display, in the tool bar, an icon specific to the said assistance software. By clicking on this icon, by virtue of a pointing device such as the mouse 103, the user brings up a menu which includes the following options:
    record the visible part of the page displayed,
    record the page displayed,
    start a recording,
    edit the records already made,
    go to the site for assistance with the transaction,
    preferences, parameter setting,
    view the information relating to a site,
    suspend the running of the assistance software, and
    quit the assistance software.

The option "record the visible part of the page displayed" causes whatever appears on the visual-display screen 104 to be placed in memory, together with a date and a time, and an integrity certificate which makes it possible to detect any subsequent alteration to the memory-stored information.

The option "record the page displayed" causes the whole of the page of which a part appears on the visual-display screen 104 to be placed in memory, together with a date and time, and the certificate of integrity which makes it possible to detect any subsequent alteration to the memory-stored information.

The option "start a recording" causes everything which appears on the visual-display screen 104 to be placed in memory, from the selection of this option up to the selection of an option "stop recording" (this option appears automatically in place of the option "start a recording" when the latter is selected) together with a date and a time, and a certificate of integrity which makes it possible to detect any subsequent alteration to the memory-stored information.

The option "edit the records already made" makes it possible to view a list of records placed in memory. For example, each row of a table corresponds to one of these records placed in memory and, from left to right:
    a symbol indicates whether this record relates to confidential information (for example, the symbol "C"), whether this record relates to a financial transaction (for example, the symbol "$"), whether this record relates to critical confidential information (for example, the symbol "X");
    an integrity certificate number, at least for the financial transactions,
    a date and time in the course of the recording, for example the start or the end of the recording,
    the duration of the recording,
    a date at which action has to be taken (in particular a delivery relating to a financial transaction) and at which the user will be questioned as to the on his satisfaction relating to the supplier of this action,
    the name of the Internet or Web site the pages of parts of pages of which are recorded, as appropriate,
    the presence or otherwise of attached information, such as HTML pages of terms and conditions, and
    the size of the file containing the record in question.

Each of these records can be selected by using the mouse 103. The table of records is displayed with buttons which can be selected by using the mouse 103 and which relate, respectively, to:
    the starting-up of the visual display of the record in question at a line selected beforehand (by default, the first one), this visual display being done with a small graphical interface representing the buttons of a video recorder (play, stop, and, possibly, return) and the scale with a cursor which can be moved in order to view the images in the sequence, the position of the cursor representing, with respect to the scale, the proportion of time elapsed between the start of the sequence and the image displayed with respect to the total duration of the sequence,
    viewing the information attached to the record,
    adding or editing comments relating to this record,
    deleting a record, and
    exporting a record to another directory of the memory 108 or of another memory.

The use of each of these functions is conditional on authentication of the user (requests for password or any other signature).

The option "go to the site for assistance with the transaction" connects the terminal 100 and the third-party protection site 170 so that the user of the terminal 100 can view the pages of the site 170.

The option "preferences/parameter setting" makes it possible to choose the operating parameters of the assistance software, and, in particular, the following parameters:
- a password for controlling the assistance software (if no password is chosen, all the controls are always accessible to any user),
- information called "financial information" including, for example, one or more of the following pieces of information:
  - payment-card numbers,
  - bankers card numbers and
  - passwords for access to payment software, payment sites or a directory/browser function for information capable of being used to make a payment, browser directory/browser function called "wallet".
- other confidential information regarded as "critical", such as social-security numbers, numbers of identity cards, girl's name, forenames of children, name of children's' school,
- other confidential information regarded as non-critical, such as postcodes, the number of the address in a street, keywords such as "boy" or "girl",
- agreement to impart (that is to say, to transmit to a database, anonymously) an indication of satisfaction and/or an indication of the punctuality of the delivery relating to an identifier of the supplier site in question,
- the way in which the assistance software reacts when it detects inputting of critical information, that is to say by requesting the password, by displaying a window warning against the dangers related to transmission of this confidential information, and/or memory storage of the record in progress when this critical information is detected,
- the way in which the assistance software reacts when it detects non-critical confidential information, by displaying a warning and/or by storing the current record in memory when this non-critical information is detected,
- where the records are to be stored, that is to say in which directory, on which memory connected to a local network, on a third-party protection site 170, on a third-party confidence site 180, etc. It will be observed that several destinations can be chosen simultaneously for these records,
- whether the records not relating to any confidential information have to be kept,
- when the monitoring of the confidential information has to take place, for example, either all the time, or whenever software for access to an Internet-access provider and/or electronic mail is used, or only when the user is connected to a Internet web site;
- an amount of memory allocated to the records of the assistance software.

The choice of each of these parameters is conditional on authentication of the user (requests for password or any other signature).
- visually displaying the information relating to a site makes it possible to display the information relating to the site on which the user is browsing, which is kept or recovered by the third-party protection site 170,
- suspending the running of the assistance software makes it possible to suspend monitoring of the information to be protected and to delete the current record, if appropriate, and
- quitting the assistance software makes it possible to cease the operation of the assistance software.

The choice of each of these last two functions is conditional on authentication of the user. When the menu is selected, however, the password is requested only once until the menu is again closed.

For reasons of simplification of the description as regards those technical functions which are well known to the person skilled in the art, the implementation of the above options is not detailed here.

Next, in the course of the operation of the assistance software, when the options of the menu of the assistance software are not displayed or used, in the course of a test 1802, it is determined whether the monitoring of information to be protected (financial, critical and non-critical information) is to commence. This test 1802 depends on the parameter setting chosen by the user as set out above or on the default parameters of the software. When the result of the test 1802 is negative, test 1802 is reiterated. When the result of the test 1802 is positive, in the course of a test 1803, it is determined whether the monitoring of information to be protected is to be completed. This test 1803 depends on the parameter setting chosen by the user or by default. When the result of the test 1803 is positive, test 802 is reiterated. When the result of test 1803 is negative, in the course of a test 1804, it is determined whether the computer 100 is connected to an Internet web site. If the result of the test 1804 is negative, test 1805 is carried out. If the result of test 1804 is positive, operation 1807 is carried out.

In the course of the test 1805, it is determined whether information to be protected is detected. Detection of the confidential information may be carried out in different ways, such as:
- by monitoring the symbols input at the keyboard 105,
- by monitoring the change to security-protected (encrypted) mode of the communication, for example by detecting the presence of the root "https" in a received-page address,
- by monitoring other information-entry means, not represented (such as a microphone and a speech-recognition card),
- by monitoring of received information (for example by optical character recognition and detection of keywords such as "signature", "order document", "credit card", "address", ">mail address", "Visa" (trademark), "MasterCard" (trademark), etc.)
- by monitoring the contents of the clipboard, and/or
- by monitoring the copy of files present in the memory 108, files which contain information to be protected (these files are detected, in a known way, at the time when new confidential information is supplied by the user by way of information to be protected in the course of a parameter-setting operation).

For example, the monitoring of information to be protected consists in the comparison of characteristics of information to be protected with characteristics of information employed at every instant or during monitoring periods and, when these characteristics correspond with each other, in considering that information to be protected has been detected.

If the result of test 1805 is negative, test 1804 is reiterated. If the result of test 1805 is positive, in the course of the operation 1806, the processing for detection of the information to be protected is carried out. Depending on the parameters chosen by the user or the default parameters of the software,
- a warning window, the content of which preferably depends on the confidential information detected, is displayed,
- the image displayed at the moment when confidential information is detected is placed in memory,
- authentication of the user is requested, for example in the form of a request for the password.

Following operation 1806, test 1804 is reiterated.

In the course of operation 1807, and while the user is browsing on the web site of the supplier of the offer 150, the assistance software carried out various operations,
- every time the user accesses a new web site, the assistance software embarks on a recording which is kept in memory 108, and the icon specific to the assistance software starts to flash in the tool bar;
- every time the user accesses a new web site, the assistance software supplies the third-party protection site 170 with an identifier of the web site 150, and awaits information in return relating to the web site 150 (level of satisfaction of previous customers, degree of punctuality observed by the previous customers, degree of respect for private life, addresses of the pages with legal content, for example page of terms and conditions, the guarantee, the conditions for reimbursement, for delivery, for handling of confidential information, country of the site, principal consumer-protection laws applicable to the transaction, etc.). While the computer 100 is awaiting the response, the icon flashes orange, if information is received from the site 170 within a predetermined period, the icon starts to flash green, and, otherwise, the icon stars to flash red;
- every time the user leaves a web site without any information to be protected having been detected, depending on the parameter setting chosen by the user or on the default parameter setting of the assistance software, either the record is destroyed, or it is kept and placed in the list of records made. In this case, depending on the variants of embodiments of the present invention, this record is or is not given a certificate of integrity.

It will be observed here that the record made preferably includes lossless image compression of what is displayed on the screen 104, for example of the sequences, when, in the course of the said second one, the aiming device (the mouse) has been used either in movement or by pressing on one of its buttons or if the keyboard or another information-input device has been employed.

For each image, the record includes the time (including minutes, second and, possibly, fractions of a second) at which it was taken or, which amounts to the same thing, how much time separates the taking of this image from the taking of the following one. In this way, the sequence of images displayed on the screen 104 can be viewed subsequently with the durations of display of each image which correspond to their initial display duration. The record may, for example, take a video format, such as the ".AVI" format well known to the person skilled in the art. this makes it possible, for example, for any device capable of reading this type of format to be able to display the record in question.

Next, in the course of the test 1808, it is determined whether information to be protected is detected. The detection of the confidential information may be carried out in different ways, such as, for example:
- by monitoring the symbols input at the keyboard 105,
- by monitoring other information-entry means, not represented (such as a microphone and a speech-recognition card),
- by monitoring the contents of the clipboard,
- by monitoring the copy of files present in the memory 108, files which contain information to be protected (these files are detected, in a known way, at the time when new confidential information is supplied by the user by way of information to be protected in the course of a parameter-setting operation)
- by monitoring the change to security-protected (encrypted) mode of the communication, for example by detecting the presence of the root "https" in a received-page address,
- by monitoring of information received by the terminal, originating from the communications network (for example by optical character recognition and detection of keywords such as "signature", "order document", "credit card", "address", "e-mail address", "Visa" (trademark), "MasterCard" (trademark), etc.), and/or
- by monitoring the copy of files present in the memory 108, files which contain information to be protected (these files are detected, in a known way, at the time when new confidential information is supplied by the user by way of information to be protected in the course of a parameter-setting operation).

If the result of test 1808 is negative, operation 1807 is continued. If the result of test 1808 is positive, in the course of operation 1809, the processing of the detection of the information to be protected is carried out. Depending on the parameters chosen by the user or the default parameters of the software:
- a warning window is displayed, the content of which preferably depends on the confidential information detected,
- the current record is placed in memory at the chosen place, as soon as the user leaves the web site 150 in question, the record being associated with a certificate of integrity, a certified recording date (since originating from the protection site 170), the contents of the pages from the said site 150 with a legal content, as appropriate (the computer 100 carries out this reading directly on the offer supplier's site 150),
- a duplicate of the integrity certificate is sent to the protection site 170, with, if appropriate, the list of the pages of the web site visited by the user, for example in order to compile a record representative of the one kept by the user but including only the addresses of the contents of the pages to the HTML format (and not the compressed image sequences as in the user's record), so as to testify, in the event that the relationship between the user of the computer 100 and the site 150 should give rise to subsequent dispute,
- as soon as the user leaves the web site 150 in question, a window asking him for a date for taking subsequent action, such as a delivery, is displayed, and the user can choose a hoped-for delivery date (see other embodiments of the invention, and FIG. 16),
- authentication is requested from the user, for example in the form of a request for the password.

Following operation 1809, test 1804 is reiterated.

It will be observed that, depending on the variants, the images stored in memory do or do not include the position of the marker (or cursor) of the mouse 103 or of a compatible pointing device. To that end, the assistance software at all times copies the screen, on the one hand, in a known way, and, on the other hand, copies the shape of the cursor of the mouse and its coordinates on the screen. The software then inserts the cursor into the image acquired at the place indicated by the said coordinates and records the resulting image.

As soon as a video recording of a financial transaction has been recorded in non-volatile RAM with a view to extended preservation (beyond the continuous duration of operation of the computer), the assistance software calculates a mathematical combination of the data of the resulting video file (for example a function known by the name of "checksum"). This mathematical combination is called certificate of integrity, since if the file is altered subsequently, the value of this mathematical combination will change so that the subsequent alteration will be detected. The terminal 100 or the assistance software then sends the third-party protection site 170 the following information:
  serial number of the assistance software,
  URL Internet address of the site 150,
  the certificate of integrity of the video file,
  the size of the video file,
  the universal time and date on the terminal 100 at the end of the transaction.

In return, the assistance software obtains, from the site 170, and stores, associated with the record in question:
  a unique number identifying the transaction on the server of the site 170,
  the date on the server of the site 170 at which the transaction was recorded,
  the date on the terminal 100 of recording of the transaction (so as to confirm that the date received is correct and to have exactly what is recorded within the server, in order to take account particularly of time-zone problems).

Upon export (a function implemented by the use of the assistance software menu and of the option of editing records), the assistance software system generates 3 types of files:
  From 1 to 10 HTML files containing the pages with a legal content from the site 150,
  A video file, for example to the AVI format,
  A certificate of integrity containing another certificate of integrity calculated on the HTML and video files as well as the size of these files.

It also contains the number of the original transaction, as well as the dates of recording of the transaction from the server of the site 170 and from the terminal 100 and the certificate of integrity of the original video file and its size. A certificate of integrity is also calculated on the main certificate of integrity. Hence, any subsequent change made to a video or HTML file or the certificate of integrity will be detected and will make the export set invalid.

By way of example, the certificates of integrity are calculated according to the method known by the name of CRC-32.

Figure 19:
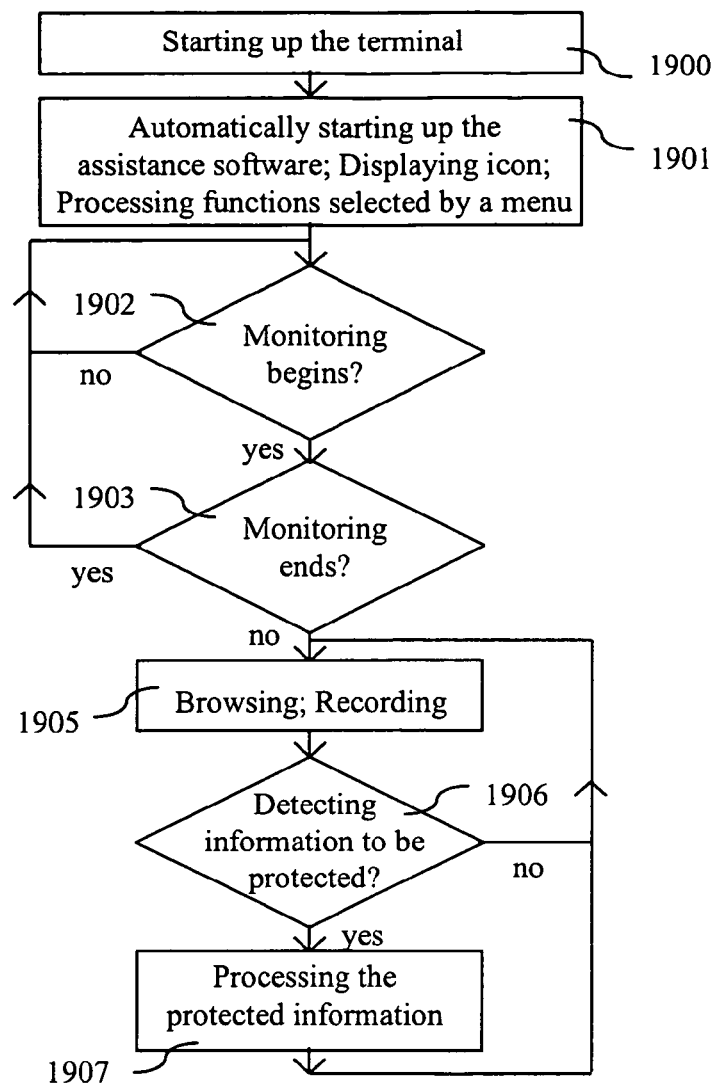
FIG. 19 represents another embodiment of the present invention, suitable, in particular, for the case of mobile terminals.

In the embodiment illustrated in FIG. 19, the user's terminal does not include any memory available for keeping the information. For example, this telephone is a mobile telephone or a pocket computer. The assistance software is then run in a computer system which receives information representative of the information received by the user's terminal. For example, the assistance software is running in the server of a gateway site or an Internet-service provider (ISP) through which the user gains access to resources of the communications network. Another part of the assistance software is employed in a terminal such as the terminal 100 and receives records made by the said server, for example in the form of files attached to electronic mail. This other part of the software may be similar to the assistance software illustrated with regard to FIGS. 1 to 18, with, moreover, a function of importing records made using a portable terminal.

For simplification, in the description which follows, only those cases where only the transactions are protected have been considered, that is to say that the confidential information to be protected is financial information, electronic signatures or information characteristic of a transaction.

Following an operation 1900 for starting up the terminal or for making contact between this terminal and the server running the assistance software, in the course of operation 1901, the assistance software is automatically started up and causes an icon specific to the said assistance software to be displayed by the visual-display screen 104. By selecting this icon, in a known way in the field of portable terminals, the user brings up a menu which includes the following options:
  start a recording,
  preferences/parameter setting,
  view the information relating to a site, and
  suspend execution of the assistance software.

The option "start a recording" causes everything which appears on the visual-display screen of the portable terminal to be placed in memory, from the moment of the selection of this option up to the moment of the selection of an option "stop recording" (this option appears automatically, in the menu, in place of the option "start a recording" when the latter is selected) together with a date and a time, and a certificate of integrity which makes it possible to detect any subsequent alteration to the memory-stored information.

The option "preferences/parameter setting" makes it possible to choose the operating parameters of the assistance software, and, in particular, the following parameters:
  a password for controlling the assistance software (if no password is chosen, all the controls are always accessible to any user),
  information called "financial information" including, for example, one or more of the following pieces of information:
    payment-card numbers,
    bankers card numbers and
    passwords for access to payment software, payment sites or a directory/browser function for information capable of being used to make a payment, directory/browser function called "wallet".
  the way in which the assistance software reacts when it detects the occurrence of a transaction, that is to say by requesting that the password be input (for example in the case in which payment for transaction is made with that one of the communications made with the portable terminal), and/or the memory-storage/keeping of the current record when the transaction is detected,
  where the records are to be stored, that is to say in which directory, on which memory connected to a local network, on a third-party protection site 170, on a third-party confidence site 180, by attaching to electronic mail intended for what e-mail address, etc. It will be observed that several destinations can be chosen simultaneously for these records,
  whether the records not relating to any confidential information have to be kept,
  when the monitoring of the confidential information has to take place, for example, either all the time, or whenever software for access to in Internet-access provider and/or electronic mail is used, or only when the user is connected to a Internet web site.

The choice of each of these parameters is conditional on authentication of the user (request for password or any other signature).

visually displaying the information relating to a site makes it possible to display the information relating to the site on which the user is browsing, which is kept or recovered by the third-party protection site 170, suspending the running of the assistance software makes it possible to suspend monitoring of the information to be protected and to delete the current record, if appropriate.

The choice of this last function is conditional on authentication of the user. When the menu is selected, however, the password is requested only once until the menu is again closed.

For reasons of simplification of the description as regards those technical functions which are well known to the person skilled in the art the implementation of the above options is not detailed here.

Next, in the course of the operation of the assistance software, when the options of the menu of the assistance software are not displayed or used, in the course of a test 1902, it is determined whether the monitoring of information to be protected (financial, critical and noncritical information) is to commence. This test 1902 depends on the parameter setting chosen by the user as set out above or on the default parameters of the software. When the result of the test 1902 is negative, test 1902 is reiterated. When the result of the test 1902 is positive, in the course of a test 1903, it is determined whether the monitoring of information to be protected is to be completed. This test 1903 depends on the parameter setting chosen by the user or by default. When the result of the test 1903 is positive, test 1902 is reiterated. When the result of test 1903 is negative, in the course of an operation 1905, and while the user is using his terminal to communicate on the network, the assistance software carries out different operations, every time the user accesses a new site, the assistance software embarks on the recording of everything which is transmitted to the user; this record is kept in the server;

every time the user accesses a new site, the assistance software indicates to the user whether he has available information relating to the site visited (level of satisfaction of previous customers, degree of punctuality observed by the previous customers, degree of respect for private life, addresses of the pages with legal content, for example page of terms and conditions, the guarantee, the conditions for reimbursement, for delivery, for handling of confidential information, country of the site, principal consumer-protection laws applicable to the transaction, etc.);

every time the user leaves a site without any information to be protected having been detected, depending on the parameter setting chosen by the user or on the default parameter setting of the assistance software, either the record is destroyed, or it is kept and placed in the location chosen by the user. In this case, depending on the variants of embodiment of the present invention, this record is or is not given a certificate of integrity.

The record, for all the information transmitted to the user terminal, while browsing, includes the time (including minutes, seconds and, possibly, fractions of a second) of the communication.

Next, in the course of test 1906, it is determined whether information to be protected is detected. The detection of the confidential information can be carried out in different ways, such as:

by monitoring of the symbols input at the keyboard of the terminal, by monitoring of other information-input means, not represented (such as a microphone), by monitoring the content of the information transmitted to this terminal, originating from the communications network.

If the result of test 1906 is negative, operation 1905 is continued with. If the result of the test 1906 is positive, in the course of operation 1907, processing for detection of the information to be protected is carried out. Depending on the parameters chosen by the user or the default parameters of the software:

the current record is placed in memory at the chosen location, as soon as the user leaves the site in question, the record being associated with a certificate of integrity, a certified recording date (since supplied by the server), the contents of the pages with a legal content of the said site, even if they have not been transmitted to the terminal, as appropriate), as soon as the user leaves the web site 150 in question, a window asking him for a date for carrying out subsequent action, such as a delivery, is displayed and the user can choose a hoped-for delivery date (see other embodiments of the invention, and FIG. 16), authentication of the user is requested, for example, in the form of a request for the password.

Following operation 1907, the test 1904 is reiterated.

It will be observed here that, for each of the embodiments of the present invention, the monitoring of the supply of information to be protected may, for example, take place continuously, only when network-communications software is running (such as software for access to an on-line access provider and/or writing of electronic mail), only when the terminal is connected to another computer system via the communications network, for example the Internet or an intranet, or only when the terminal is connected to another computer system via a security-protected connection of a communications network. This can be set by manufacture, by default or by parameter setting of the assistance software by one of its users, for example.

In a variant, implementing the operation of keeping the record in memory depends on the detection of information to be protected in the course of the communication with a site 150. For example:

if a financial transaction or a signature is detected, the record is kept in the video format and represents the sequence of images displayed on the screen 104 (the portions of pages received from the site and displayed), with the HTML pages of the pages from the site 150 with a legal content, a certified date and a certificate of integrity and keeping according to a text format in the protection site 170 of the pages received by the terminal 100 and of the pages of the site with a legal content;

otherwise, and if critical confidential information is detected, the HTML pages received from the site are kept as well as a page with legal content specifying the practice of the site as regards confidential data;

otherwise, if non-critical confidential information is detected, only the files of the pages corresponding to text are kept;

otherwise, no information is kept.

Likewise, the automatic deletion of this data, its compression, and/or an invitation to the user to delete this data, depends preferably on the type of information to be protected to which the data relates.

The reader may turn to the description of the other modes for the implementation of each technical characteristic of the embodiments set out here.

In the case of Internet access via a device possessing little available memory, the recording or the simplified recording (that is to say the recording of a part of the information received by the terminal) can be sent automatically to a given Internet address, to a document-preservation site, such as Xdrive (trademark), or as an attachment to electronic mail to an e-mail address chosen by the user.

In the case of access with a mobile telephone, the access portal may carry out the functions set out above as regards one or other of the aspects of the present invention.

Moreover, the offer-supplying site 150 may implement an aspect of the present invention according to which it keeps an identification of the pages on which the user has browsed and of the part of these pages which has actually been displayed for the user, as well as a date of the said visit.

According to one variant, not represented, in a local network, each station carries out the operations presented in one of the embodiments above and locally keeps the records which it produces. Then, at regular time intervals, for example, every night, the records are collected by a network server.

According to a variant, not represented, the triggering (detection of information to be protected, of a signature, of change to security-protected mode, etc.) causes memory storage of the information representative of the page being displayed at the moment of a triggering, but also of other pages of the site, for example the pages regarded as possibly having a legal content (in accordance with the embodiments set out above in which the protection site 170 keeps the addresses of such pages).

In what follows, the first site is generally a web site, or an offer-supplying site such as the site 150.

According to a variant, not represented, the assistance software protects the user by automatically transmitting to the site 150 or to a remote contact, additional information to the communication. That transmission or that added information is based on at least one of the following criteria:

the identity of one of the said persons, and/or
the content of the said information communicated.

According to particular features of the method according to the twenty-seventh aspect of the present invention, the said added information includes a limitation of the legal scope of the said communication. For example, the information added indicates "a communication has taken place with a member of the staff of the business, any undertaking by the company is subject to the signature of one of its company employees. The contact person for the business is responsible for verifying whether it is necessary to confirm the content of the communication which has taken place with a responsible official of the business. In order to obtain a signature, click here". The fact of selecting the word "here" causes information to be sent representative of the initial communication to a member of the management structure of the protected business so that it ratifies (by electronic signature, for example) or rejects the content of the said initial communication.

Hence, in a business using the assistance software, on the basis of the identity of a user in the business, of the identity of a contact person of this user in the business and/or of the detection of information to be protected (for example the words "prejudice", "contract", "engage", "repair", "Euros", "dollars", "free", etc.), the assistance software causes the addition, in electronic mail, or the sending, of supplementary electronic mail intended for the contact person or for a third party, in order to reduce the legal scope of the communication between the user and the contact person. The user in the business is preferably alerted to the keeping of the record and a record of the communication is certified (dated and given a certificate of integrity) and kept by the business as indicated above.

In a variant, the assistance software requests authentication from the user and, if he is not authorized to give an undertaking in the name of the business, alerts him to the dangers of the communication in progress and/or to the transmission of a trace of this communication to a responsible official of the business or a legal official of the business (these operations, well known to the person skilled in the art, will not be reiterated here).

As mentioned above, communications methods according to the present invention (according to at least its ninth aspect), such as the communications method of FIG. 18, include:

an operation of receiving a succession of pages originating from a first site of a computer network, an operation of memory storage of information representative of the said succession of pages, outside the said first site, and an operation of associating a certificate of integrity with the memory-stored information representative of the said succession of pages, the said certificate of integrity being stored in memory in association with the information representative of the said succession of pages, the said certificate of integrity making it possible to detect any alteration to the memory-stored information representative of the said succession of pages, subsequent to its being stored in memory.

The memory storage operation may be performed in one or more of the following devices: in the terminal 100, in the protection site 170, by transmitting a file to a predetermined Internet address or a predetermined e-mail address or to a confidence site 180, for example.

The memory storage operation may concern images of pages that have been displayed on the screen 104, addresses of those pages, files containing certain data formats of those pages, for example.

Moreover, according to particular features, those methods include a time-stamping operation attributing a date to at least one of the reception and memory-storage operations, the said date is stored in memory in association with the information representative of the said succession of pages and the certificate of integrity makes it possible to detect an alteration to the said date subsequent to its being stored in memory. Preferentially, such a time-stamping is performed in connection with a clock that is independent from the terminal 100.

According to particular features, those methods include an operation of determining an address of the said first site on the said network, the said address being stored in memory in association with the information representative of the said succession of pages, and the certificate of integrity makes it possible to detect an alteration to the said address subsequent to its being stored in memory. Generally speaking, that address is included in the information that is displayed during a site visit. However, it can be stored, as associated information or remotely, for example in the protection site 170. In the later case, the protection site 170 may witness the visit of the user of the terminal 100 on the site 150, without using a memory space that is too large.

According to particular features, those methods include an operation of determining a display duration for each page of the said succession, the said duration being stored in memory in association with the information representative of the said succession of pages, and the certificate of integrity makes it possible to detect an alteration to the said duration subsequent to its being stored in memory. Thus, the record may witness the chronology and timing of the communication in question.

According to particular features, those methods include, for each site of a plurality of sites of the said network, the method includes an operation of determining addresses of pages of the said site, the said memory-storage operation including memory storage of the said pages, the said pages being stored in memory in association with the information representative of the said succession of pages, and the certificate of integrity makes it possible to detect an alteration to the said pages subsequent to their being stored in memory. Thus, pages having a legal content of each one of those sites may be displayed and/or stored in order to witness the legal conditions under which the communication with the site took place.

According to particular features, those methods include an operation of displaying the pages received in the course of the receiving operation, and in the course of the memory-storage operation the parts of the pages received which are displayed in the course of the display operation are stored in memory. Thus, the record may witness what the visitor of the site had under his eyes during the visit of the site (also called communication with the site in the present application).

According to particular features, those methods include an operation of displaying the pages received in the course of the receiving operation, and, in the course of the memory-storage operation, indicators of the parts of the received pages which are displayed in the course of the display operation are stored in memory. Thus, the record may witness what the visitor of the site had under his eyes during the visit of the site (also called communication with the site in the present application) but also of the content of the pages that the visitor did not have under the eyes, while using a format that describes the whole page, that format (for example, HTML) being able to allow the storage of more compressed data than a video format, for example.

According to particular features, those methods include an operation of displaying pages received in the course of the receiving operation, and, in the course of the memory-storage operation, the parts of the received pages which are not displayed in the course of the display operation are not stored in memory. Thus the quantity of stored information is limited to that information that witnesses what was displayed under the eyes of the user.

According to particular features, in those methods, the information stored in memory in the course of the memory-storage operation includes the information, in text format, of the said succession of pages.

According to particular features, those methods include an operation of communicating with a second site of the said network and of transmitting, to the said second site, information dependent on the first site. Thus, the second site may store that information and/or return a witness used to generate the certificate of integrity or information to be transmitted to the first site (such as an identifier of means of payment) and/or transmits, by return, information concerning the first site.

According to particular features, those methods include an operation of communicating with a second site of the said network and of receiving information originating from the said second site, the information stored in memory being representative of the said information originating from the second site. Thus, the second site may return a signal which is used as a witness to generate the certificate of integrity or information to be transmitted to the first site (such as an identifier of means of payment) and/or transmits, by return, information concerning the first site.

According to particular features, those methods include an operation of communicating with a second site of the said network and of transmitting to the said second site information representative of the said pages, the memory-storage operation being carried out by the said second site. Thus, the second site store that information, which allows limiting the memory space of the terminal which is necessary to store records. Those particular features apply, in particular, to the case where online resources are accessed through terminals including no or little non volatile memory (such as mobile telephone), as compared to the size of the data to be stored for the record and the certificate of integrity.

According to particular features, those methods include an operation of communicating with a second site of the said network, the receiving operation being carried out via the said second site. Those features particularly apply to portals for communicating with portable devices such as mobile telephones.

According to particular features, those methods include an operation of detecting information characteristic of a transaction with the said first site, and an operation of deleting the memory-stored information representative of the said succession of pages of the said first site, the said delete operation depending on the said detection. Thus, the stored information (also called "records" in the present application) may be stored during a long time or a short time, depending on the fact that a transaction occurred, or not, during the communication that that record concerns.

According to particular features, those methods include an operation of detecting information characteristic of a transaction with the said first site, the said memory-storage operation depending on the said detection. Thus, the stored information, or record, may be more or less complete (i.e., representing more or less accurately the information exchanged during the communication) or more or less protected (by the certificate of integrity, by any date stamping, by copying the record in another place, by types of stored data or compression rate used, for example) depending on the existence of a transaction during the said communication.

According to particular features, those methods include an operation of detecting information characteristic of a transaction with the said first site, by determining a preparation for communication to the first site of information corresponding to information known as "information to be protected" kept in a memory.

As described in the above description, methods envisaged by the present invention (in accordance with at least its tenth aspect) include:
- an operation of receiving a succession of pages originating from a first site of a computer network,
- an operation of displaying parts of pages of the said succession of pages, an operation of memory storage of information representative of the said parts of displayed pages, outside the said first site, the said information being identified in memory as displayed and an operation of memory storage of information of parts of pages not displayed, originating from the said first site, outside the said first site, the said information being identified in memory as not displayed.

Thus, the information stored in memory may testify, on the one hand, to what has been brought to the attention of the visitor to the site and, on the other hand, to other information which may be useful in determining the conditions of the visit, such as the other information from the pages a part of which has been displayed or of information from other pages, such as pages with a legal content, for example.

All the particular features of the ninth aspect of the present invention are particular features of the tenth aspect, but to be concise, those particular features are not recopied here.

As described in the above description, methods envisaged by the present invention (in accordance with at least its eleventh aspect) include:

an operation of receiving, via a computer terminal, a succession of pages originating from a first site of a computer network, an operation of displaying, by the computer terminal, parts of pages of the said succession, and an operation of memory storage, at a second data site independent of the said terminal, of information representative of the said parts of pages displayed.

Thus, the stored information may witness the content of the said displayed parts of pages.

All the particular features of the ninth aspect of the present invention are particular features of the eleventh aspect, but to be concise, those particular features are not recopied here.

As described in the above description, methods envisaged by the present invention (in accordance with at least its twelfth aspect) include:

an operation of receiving, by a computer terminal, a succession of pages originating from a first data site, an automatic operation of receiving, by the computer terminal, originating from a second information site, contextual information depending on an identifier of the said first site, a triggering operation, and an operation of displaying the said contextual information.

The triggering operation that triggers the displaying operation may be, as described with respect of the figures (particularly FIG. 18), a detection of a piece of information to be protected, a detection of a transaction, the use of a menu or the use of an icon.

Figure 20:
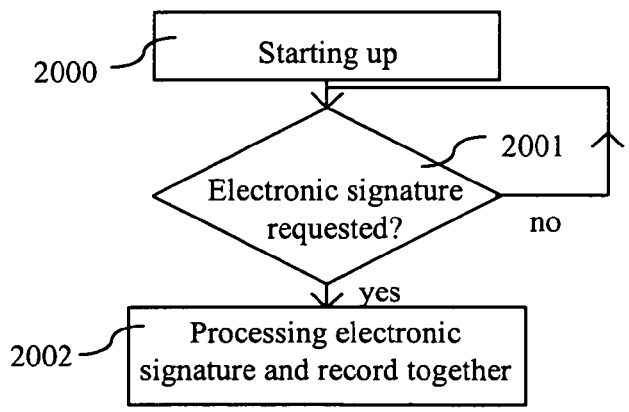
FIG. 20 represents another embodiment of the present invention, in connection with the implementation of an electronic signature.

FIG. 20 represents the implementation of the present invention in relation with an electronic signature. This implementation includes independent aspects:

the electronic signature depends on the content of a plurality of pages, the said pages are edited by the user, except for the page where the signature is requested, the electronic signature causes memory storage and keeping of information representative of a plurality of pages, detection of an electronic signature has an influence on the memory-stored information (format and/or content), the period for which it is kept, the place where it is kept, and the information which is associated with it (certificate of integrity, time stamp, supplementary information), for example.

In FIG. 20, after a terminal has been started up and when the assistance software has been initialized, operation 2000, in the course of a test 2001, it is determined whether an electronic signature is requested. For example, a software routine characteristic of the use of a signature is detected, or information received from the site is detected. When the result of the test 2001 is negative, test 2001 is reiterated. When the result of the test 2001 is positive, a graphics interface invites the user to indicate what other pages of the site, apart from the page in which the electronic signature is requested, are related to the transaction. The user can then return to the pages which he has seen so as to attach them to the document to be signed. The user can thus accept or decide that the whole record which he has seen on the site visited should serve as an annex to the signed document. Finally, the user can accept or decide that the pages having a legal content, catalogued by the protection site 170, be annexed to the signed document.

Depending on the type of electronic signature, this content to be signed is then subject to a certificate of integrity which certifies the signature or this content to be signed supplies a root for the signature to be compiled.

All the content chosen by the user or, in a variant, the record relating to the visit to the site requesting the signature, without the user being able to influence its content, are kept in a place chosen by the user and a message indicating this is transmitted to the site, operation 2002.

As described in the above description, methods envisaged by the present invention (in accordance with at least its thirteenth aspect) include:

an operation of receiving, via a computer terminal, a succession of pages originating from a first site, an operation of detecting an electronic signature, an operation of memory storage of information representative of at least one page of the said succession of pages, outside the said first site, depending on the said detection.

Thus, the detection of an electronic signature may trigger the operation of memory storage, or influence the stored information (format and/or content), how long it is stored, the place where it is stored, and the information associated to it (certificate of integrity, date stamp, additional information), for example.

According to particular features of the method according to the thirteenth aspect of the present invention, in the course of the memory-storage operation, the information stored in memory is representative of a plurality of pages of the said succession. Thus, not only an order form or a one-page document may be stored, but also a plurality of pages, for example a plurality of pages of the said succession or a plurality of pages including the pages having a legal content from the said first site.

Preferentially, in the course of the memory-storage operation, the information stored in memory is representative of at least one page at which the said electronic signature is requested. In a variant, in the course of the memory-storage operation, information stored in memory is representative of each page of the said succession.

According to particular features, the method according to the thirteenth aspect of the present invention includes an operation of determining a start of a contractual document and an operation of determining the end of a contractual document, and, in the course of the memory-storage operation, the information stored in memory is representative of each page accessed between the start of document and the end of document. Thus, the electronic signature may depend on a plurality of items of information that the user consider as contractual and that he wishes to sign.

According to particular features, the method according to the thirteenth aspect of the present invention includes an operation of associating a certificate of integrity with the memory-stored information representative of the said succession of pages, the said certificate of integrity being stored in memory in association with the information representative of at least one page of the said succession of pages, the said certificate of integrity making it possible to detect any alteration to the information stored in memory, subsequent to its being stored in memory.

According to particular features, the said signature includes a certificate of integrity stored in memory in association with the information representative of at least one page of the said succession of pages, the said certificate of integrity making it possible to detect any alteration to the information stored in memory, subsequent to its being stored in memory.

According to a fourteenth aspect, the present invention envisages a communications method characterized in that it includes:

an operation of receiving, via a computer terminal, a succession of pages originating from a first site, an operation of detecting an electronic signature, an operation of editing a plurality of pages of the said succession, the said electronic signature depending on the said plurality of pages.

For this purpose, an electronic signature software determines the electronic signature based on not only identification data of the signatory, but also on the content of the said plurality of pages. That content may be edited by the user, to, if he wants, associate pages from the site to the page that he signs. The associated pages may include a precise description or an image of object of a transaction and/or pages having a legal content (those pages may be provided as indicated with regard to FIG. 18).

According to particular features, the method according to the fourteenth aspect of the present invention includes an operation of conjoint displaying of information representative of the said plurality of pages. Thus, the signing party may visualize all the documents linked to the signature. For example, each of the pages associated with the signature is displayed, juxtaposed to other pages and with a reduced size or by a cyclical displaying of all the pages concerned by the signature.

According to particular features, the method according to the fourteenth aspect of the present invention includes an operation of transmitting information representative of the said memory-storage operation in association with an electronic-signature transmission operation. Thus, the party in remote contact, such as, for example, a merchant site; is informed that the signature is associated to a plurality of pages that it transmitted.

According to a fifteenth aspect, the present invention envisages a memory-management method characterized in that it includes:

an operation of determining at least one item of data called "data to be protected", at least two operations of communicating via a communications network, and, for each communications operation:

an operation of determining a preparation for transmission of data to be protected in the course of the said communications operation, an operation of memory storage of data received in the course of said communications operation, and of an indicator for determination or not determination of preparation for transmission of data to be protected, an operation of determining the necessity to delete certain memory-stored data, and when it is necessary to delete memory-stored data, a delete operation in the course of which the memory-stored data is treated differently on the basis of the memory-storage date and of the value of the said indicator.

According to a sixteenth aspect, the present invention envisages a memory-management method characterized in that it includes:

an operation of determining at least two levels of protection for data called "data to be protected", at least two operations of communicating via a communications network, and, for each communications operation:

an operation of determining the preparation for transmission of data to be protected in the course of the said communications operation, an operation of memory storage of data received in the course of said communications operation, and of an indicator of a level of protection of data to be protected, preparation for transmission of which has been determined, an operation of determining the necessity to delete certain memory-stored data, and when it is necessary to delete memory-stored data, a delete operation in the course of which the memory-stored data is treated differently on the basis of the memory-storage date and of the value of the said indicator.

According to particular features of the method according to the sixteenth aspect of the present invention, the necessity-determining operation includes an operation of comparing a memory space with a predetermined memory-space value.

According to a seventeenth aspect, the present invention envisages a memory-management method characterized in that it includes:

an operation of determining at least one item of data called "data to be protected", at least two operations of communicating via a communications network, and, for each communications operation:

an operation of determining the preparation for transmission of data to be protected in the course of the said communications operation, an operation of memory storage of data received in the course of said communications operation, the said memory-storage operation depending on the said determination or non-determination of preparation for transmission of data to be protected.

According to particular features of the method according to the seventeenth aspect of the present invention, the memory-storage operation includes an operation of encrypting memory-stored data.

According to an eighteenth aspect, the present invention envisages a memory-management method characterized in that it includes:

an operation of determining at least one item of data called "data to be protected", at least two operations of communicating via a communications network, and, for each communications operation:

an operation of determining a transmission of data to be protected in the course of the said communications operation, an operation of memory storage of data representative of data received in the course of said communications operation, the said memory-storage operation depending on the said determination or non-determination of transmission of data to be protected, and an operation of transmitting, to the said network, information representative of the said memory-storage operation.

According to particular features of the method according to the eighteenth aspect of the present invention, the said operation of transmitting information representative of the said operation is carried out by electronic mail.

According to a nineteenth aspect, the present invention envisages a memory-management method characterized in that it includes:

an operation of determining at least two levels of protection of data known as "data to be protected", at least two operations of communicating, via a communications network, and, for each communications operation:

an operation of determining preparation for transmission of data to be protected in the course of the said communications operation, an operation of memory storage of data received in the course of said communications operations, the said memory storage depending on the level of protection of data to be protected which is determined in the course of the said determination operation, According to particular features of the method according to the nineteenth aspect of the present invention, the memory-storage operation employs different data formats, in connection with the result of the said determination operation.

A twentieth aspect of the present invention envisages a data-protection method characterized in that it includes:

an operation of selecting software context for protection of data called "data to be protected", in the course of which a user determines in which case, among at least two of the following cases, data to be protected have to be protected;

outside communications on an international communications network, for electronic-mail communications on an international communications network, and/or for Internet web site visits;

an operation of detection of use, by a user, of data to be protected, in one of the selected software contexts; and an operation of memory storage of information representative of the said use.

A twenty-first aspect of the present invention envisages a data-storage method characterized in that it includes:

an operation of communicating, via a communications network, in the course of which data is exchanged between a terminal and the said network, an operation of memory storage of data originating from the said communications network in the course of the said communications operation, in the course of the said memory-storage operation, an operation of determining the necessity to keep the said memory-stored data, on the basis of the data sent on the said network by the said terminal in the course of the said communications operation, and an operation of keeping the said memory-stored data depending on the result of the said operation for determining the necessity to keep the said memory-stored data.

A twenty-second aspect of the present invention envisages a method for contextual information characterized in that it includes:

a first communications operation, via a communications network, in the course of which first data is exchanged between a terminal and a first remote server, a second communications operation, via the said communications network, in the course of which second data depending on the first remote server is exchanged with a second remote server, in the course of the said communications operation, an operation of determining the necessity to display the said second data, on the basis of the first data sent by the terminal in the course of the said first communications operation, and an operation of displaying the said second data depending on the result of the said operation for determining the necessity to display the said second data.

According to particular features of the method according to the twenty-second aspect of the present invention, the said second data is representative of pages supplied by the said first remote server.

According to particular features, the method according to the twenty-second aspect of the present invention includes an operation of memory storage of all or part of the said first data and of all or part of the said second data.

A twenty-third aspect of the present invention envisages a method of keeping data remotely characterized in that it includes:

a first communications operation, via a communications network, in the course of which first data is exchanged between a terminal and a first remote server, a second communications operation, via the said communications network, in the course of which second data depending on the first data is received by a second remote server, in the course of the said first communications operation, an operation of determining the necessity to keep the said second data, on the basis of the first data sent by the terminal in the course of the said first communications operation, and an operation of keeping the said second data depending on the result of the said operation for determining the necessity to keep the said second data According to particular features of the method according to the twenty-third aspect of the present invention, the said second data is page addresses supplied by the said first server and, in the course of the keeping operation, at least one type of data, for example the text data, situated at the said addresses is kept.

According to particular features of the method according to the twenty-third aspect of the present invention, the said second data includes an identifier of the first remote server, of the terminal, of the date of the first communications operation.

According to particular features of the method according to the twenty-third aspect of the present invention, the said second data is representative of the first data which is displayed on the said terminal.

A twenty-fourth aspect of the present invention envisages a method of keeping data remotely characterized in that it includes:

a first communications operation, via a communications network, in the course of which first data is exchanged between a terminal and a first remote server, a second communications operation, via the said communications network, in the course of which second data depending on the first data is received by a second remote server, in the course of the said first memory-storage operation, an operation of determining the necessity to keep the said first and second data, on the basis of the first data sent by the terminal in the course of the said first communications operation, and an operation of keeping the said first data by the said terminal and the said second data by the said second server, depending on the result of the said operation for determining the necessity to keep the said first and second data.

According to particular features of the method according to the twenty-fourth aspect of the present invention, the said first data and the said second data are not kept in the same formats.

According to a twenty-fifth aspect, the present invention envisages a method of recording data exchanged between a terminal and a remote site, characterized in that it includes the displaying of a witness on the said terminal, the said witness varying between at least two visible states when a recording is in progress and at least one of the two visible states not being displayed when the recording is not in progress.

According to a twenty-sixth aspect, the present invention envisages a method of keeping data relating to a communication on a communications network, characterized in that it includes:

an operation of placing the said data in memory, associated with a date when it was placed in memory, an operation of determining the necessity to compress the said data, depending on the date when it was placed in memory, and when the said determination operation indicates that it is necessary to compress the said data, an operation of compressing the said data and of memory storage of secondary data representative of the said primary data.

According to particular features of the method according to the twenty-sixth aspect of the present invention, the said compression operation includes an operation of optical character recognition.

According to particular features of the method according to the twenty-sixth aspect of the present invention, the said compression operation includes the selection of data formats and the elimination of data which does not have a selected format.

According to particular features, the said compression operation includes the selection of at most two images per page of data received from an Internet web site. Preferentially, the said images are either the first displayed image of the page in question or the last displayed image of the page in question.

According to a twenty-seventh aspect, the present invention envisages a communications method characterized in that it includes an operation of communicating information between at least two persons and an operation of adding information to the said communications, on the basis of at least one of the following criteria:

the identity of one of the said persons, and/or the content of the said information communicated.

According to particular features of the method according to the twenty-seventh aspect of the present invention, the said added information includes a limitation of the legal scope of the said communication.

The invention claimed is:

1. A communications method, comprising the steps of:
a user accessing a first site, via a computer network, from a first device;
during access of the first site, the user successively selecting pages from the first site and receiving, from the first site to the first device, the selected pages, the successively selected and received pages forming a succession of pages,
the selected pages being originated by the first site, the succession of pages being originated by the user's selection of pages;
storing information representative of the received succession of pages in a storage first memory located outside the first site; and
associating a certificate of integrity with the memory-stored information representative of the received succession of pages;
the certificate of integrity being permanently memory-stored in association with the information representative of the succession of pages,
the certificate of integrity enabling detection of any alteration, to the memory-stored information representative of the received succession of pages, made subsequent to the information being stored in the first memory,
the information representative of the received succession of pages documenting a content of the received succession of pages,
the first memory being a non-volatile memory,
a step of detecting information characteristic of a transaction with the first site; and
upon detection of information characteristic of a transaction with the first site, continuing to store the memory-stored information representative of the succession of pages,
upon the step of detecting information not detecting information characteristic of a transaction with the first site, a step of deleting the memory-stored information representative of the succession of pages of the first site.

2. A communications method according to claim 1, further comprising:
a time-stamping step attributing a date to at least one of the receiving and memory-storage steps,
the date being permanently memory-stored in association with the information representative of the succession of pages, and
the certificate of integrity enabling detection of an alteration to the date subsequent to the date being stored.

3. A communications method according to claim 1, further comprising:
a step of determining an address of the first site on the network, the address being permanently memory-stored in association with the information representative of the succession of pages,
the certificate of integrity enabling detection of an alteration to the address subsequent to the address being stored.

4. A communications method according to claim 1, further comprising:
a step of determining a display duration for each page of the succession, the duration being permanently memory-stored in association with the information representative of the succession of pages,
the certificate of integrity enabling detection of an alteration to the duration subsequent to the duration being stored.

5. A communications method according to claim 1, wherein said first site is one of a plurality of predetermined sites of the network, and further comprising:
a step of determining addresses of pages of said first site,
the memory-storage step including memory storage of the pages, of the first site, having the determined addresses,
the pages, having the determined addresses, being permanently memory-stored in association with the information representative of the succession of pages, and
the certificate of integrity enabling detection of an alteration to the pages subsequent to the pages being stored in the first memory.

6. A communications method according to claim 1, further comprising:
a step of displaying at least a part of each user-selected page received in the course of the receiving step, and
in the course of the memory-storage step, a step of storing the displayed parts of the selected pages.

7. A communications method according to claim 1, wherein the information permanently memory-stored in the course of the memory-storage step includes the information, in text format, of the succession of pages.

8. A communications method according to claim 1, further comprising:
a step of communicating with a second site of the network and of transmitting, to the second site, information dependent on the first site.

9. A communications method according to claim 8, further comprising:
a step of receiving, at the first device, information originating from the second site; and
a step of storing information representative of the information originating from the second site.

10. A communications method according to claim 8, further comprising:
a step of transmitting to the second site information representative of the received pages,
the memory-storage step being carried out by the second site.

11. A communications method according to claim 10, wherein,
the step of receiving the pages to the first device being carried out via the second site.

12. A communications method according to claim 8, further comprising:
a step of reading, on the first site, information of at least one page, the address of which page is based on received information originating from the second site.

13. A communications method according to claim 1, further comprising:
a step of selecting a date;
a step of storing the date;
at the date, a step of displaying a dialogue window on a visual-display screen of a terminal; and
depending on the user's answer to the displayed dialogue, a step of automatic opening of a second communications session between the terminal and a distant site.

14. A communications method according to claim 1, further comprising:
a step of displaying parts of pages of the succession of pages, other parts of the succession of pages not being displayed;
a step of automatically downloading pages of the first site not selected by the user; and
a step of memory storage of information of the non-displayed pages of the first site, outside the first site.

15. A communications method according to claim 1, further comprising:
a step of displaying, by a computer terminal, parts of pages of the succession of pages; and
a step of memory storage, at a second site independent of the terminal, of information representative of the displayed parts of pages.

16. A communications method according to claim 1, further comprising:
an automatic step of receiving, originating from a second site, contextual information depending on an identifier of the first site;
a triggering step; and
depending on the triggering step, a step of displaying the contextual information.

17. A communications method according to claim 1, further comprising:
a step of communicating, via a communications network, in the course of which communicating data is exchanged between a terminal and the network;
a further step of memory storage of data originating from the communications network in the course of the communications step;
in the course of the further memory-storage step, a step of determining the necessity to keep the memory-stored data, on the basis of the data sent on the network by the terminal in the course of the communications step; and
a step of keeping the memory-stored data depending on the result of the step for determining the necessity to keep the memory-stored data.

18. A communications method according to claim 1, further comprising:
a step of detecting an electronic signature; and
in case an electronic signature is detected, a step of memory storage of information representative of at least one page of the succession of pages, outside the first site.

19. A communications method according to claim 1, wherein, in the course of the memory-storage step, the information stored in the first memory is representative of each page of the succession of pages accessed between a start of the memory-storage step and an end of the memory-storage step.

20. A communications method according to claim 1, further comprising:
a step of detecting an electronic signature; and
a step of joining at least one page of the succession of pages to a document to be signed,
the electronic signature depending on each joined page.

21. A communications method according to claim 1, further comprising a step of detecting a change to a security-protected mode of the communication on the computer network between the first device and the first site, the step of memory storage of information representative of said succession of pages depending on the detected change.

22. A communications method according to claim 1, further comprising a step of detecting predetermined information received from the first site, the step of memory storage of information representative of the succession of pages depending on the detected information.

23. A communication device, comprising:
a device for, via a network, a user successively selecting pages from a first site and receiving to the device the selected pages, the selected pages being originated by the first site, the successively selected and received pages forming a succession of pages, the succession of pages being originated by the user's selection of pages;
a non-volatile memory for storing information representative of the succession of pages, outside the first site; and
means for associate a certificate of integrity with the memory-stored information representative of the succession of pages,
the certificate of integrity being stored in the memory in association with the information representative of the succession of pages,
the certificate of integrity enabling detection of any alteration made to the memory-stored information made subsequent to the memory-stored information being stored in the memory;
a step of detecting information characteristic of a transaction with the first site; and upon detection of information characteristic of a transaction with the first site, continuing to store the memory-stored information representative of the succession of pages, upon the step of detecting information not detecting information characteristic of a transaction with the first site, a step of deleting the memory-stored information representative of the succession of pages of the first site.

24. An internet communication validation method, comprising the steps of:

from a first communication device, a user internet accessing a first web site;

during access of the first site, selecting at least one web pages from the first site and receiving the selected page, from the first site to the first device, each selected page being originated by the first site;

storing information representative of each received page in a first non-volatile memory of the first communication device; and associating a certificate of integrity with the memory-stored information representative of each received page, the certificate of integrity being permanently memory-stored in association with the information representative of each received page, the certificate of integrity enabling detection of any alteration, to the memory-stored information representative of each received page, made subsequent to the information being stored in the first memory, the stored information representative of the received page together with the certificate of integrity, enabling verification of a content of each received page, a step of detecting information characteristic of a transaction with the first site; and upon detection of information characteristic of a transaction with the first site, continuing to store the memory-stored information representative of the succession of pages, upon the step of detecting information not detecting information characteristic of a transaction with the first site, a step of deleting the memory-stored information representative of the succession of pages of the first site.

25. A communications method according to claim 1, wherein, the first device is a computer, the succession of pages are selected from publicly-available pages, and the certificate of integrity is stored in the storage first memory.

\* \* \* \* \*